United States Patent
Hirai

(10) Patent No.: US 9,080,100 B2
(45) Date of Patent: Jul. 14, 2015

(54) POLYMERIZABLE LIQUID CRYSTAL COMPOSITION

(71) Applicants: JNC CORPORATION, Tokyo (JP); JNC PETROCHEMICAL CORPORATION, Tokyo (JP)

(72) Inventor: Yoshiharu Hirai, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 224 days.

(21) Appl. No.: 13/894,593

(22) Filed: May 15, 2013

(65) Prior Publication Data

US 2014/0002773 A1    Jan. 2, 2014

(30) Foreign Application Priority Data

Jun. 27, 2012   (JP) .................................. 2012-144298
Mar. 14, 2013   (JP) .................................. 2013-052002

(51) Int. Cl.

| C09K 19/38 | (2006.01) |
|---|---|
| C09K 19/32 | (2006.01) |
| G02B 5/30 | (2006.01) |
| G02F 1/1337 | (2006.01) |
| C09K 19/54 | (2006.01) |
| G02F 1/1335 | (2006.01) |
| G02F 1/139 | (2006.01) |
| G02B 5/32 | (2006.01) |
| C09K 19/04 | (2006.01) |
| C09K 19/20 | (2006.01) |

(52) U.S. Cl.
CPC ............. *C09K 19/3809* (2013.01); *C09K 19/32* (2013.01); *C09K 19/3852* (2013.01); *G02F 1/1395* (2013.01); *G02F 1/133528* (2013.01); *C09K 2019/0448* (2013.01); *C09K 2019/2078* (2013.01); *C09K 2219/03* (2013.01); *G02B 5/3033* (2013.01); *G02B 5/32* (2013.01); *G02F 2001/133726* (2013.01); *G02F 2001/133742* (2013.01)

(58) Field of Classification Search
CPC ........... C09K 19/3809; C09K 19/3858; C09K 19/32; C09K 2019/0448; C09K 2019/2078; C09K 2219/03; G02F 1/1395; G02F 1/133528; G02F 2001/133726; G02F 2001/133742; G02B 5/3033; G02B 5/32
See application file for complete search history.

(56) References Cited

U.S. PATENT DOCUMENTS

| 5,863,457 | A | 1/1999 | Hasebe et al. |
|---|---|---|---|
| 2005/0128395 | A1 | 6/2005 | Coates et al. |
| 2005/0224754 | A1 | 10/2005 | Hirai et al. |
| 2006/0114392 | A1 | 6/2006 | Tanaka |
| 2006/0182900 | A1 | 8/2006 | Kim et al. |
| 2008/0014374 | A1 | 1/2008 | Hirai |
| 2008/0241431 | A1 | 10/2008 | Hirai |
| 2010/0151154 | A1* | 6/2010 | Hirai .............................. 428/1.2 |
| 2010/0258764 | A1* | 10/2010 | Sakamoto et al. ....... 252/299.64 |

FOREIGN PATENT DOCUMENTS

| JP | 7-294735 | 11/1995 |
|---|---|---|
| JP | 10-319408 | 12/1998 |
| JP | 2002-243942 | 8/2002 |
| JP | 2004-198478 | 7/2004 |
| JP | 2000-514202 | 2/2005 |
| JP | 2005-196221 | 7/2005 |
| JP | 2006-126757 | 5/2006 |
| JP | 2008-266550 | 11/2008 |
| JP | 2008-266632 | 11/2008 |
| WO | 98/00475 | 1/1998 |
| WO | 2004/072699 | 8/2004 |
| WO | 2005/038517 | 4/2005 |

OTHER PUBLICATIONS

Yu et al., "A New Polarizer with Wide Viewing Angle and Low Color Shift Characteristics designed for In-Plane-Switching Liquid Crystal Display (IPS-LCD)", FMC8-4, Jpn. J. Appl. Phys., vol. 37, 1998, pp. 655-658.
Nakata et al., "P-58: Novel Optical Compensation Films for IPS-LCDs", SID 06 Digest, 2006, pp. 420-423.

\* cited by examiner

*Primary Examiner* — Shean C Wu
(74) *Attorney, Agent, or Firm* — Wenderoth, Lind & Ponack, L.L.P.

(57) ABSTRACT

To provide a polymerizable liquid crystal composition showing good coating properties even when a support substrate has a low solvent resistance, and having uniform alignment properties. A polymerizable liquid crystal composition is prepared by containing as components an acrylate polymerizable liquid crystal compound, a compound represented by formula (3), and a non-liquid crystalline compound having an acryloyl group or a methacryloyl group as a reactive moiety, and having a functional group including a hydroxyl group as a reactive dilution solvent in one molecule. When the polymerizable liquid crystal composition is applied onto the support substrate, dried and irradiated with light, the polymerizable liquid crystal composition showing good coating properties even when the support substrate has the low solvent resistance, and having the uniform alignment properties can be obtained.

14 Claims, No Drawings

POLYMERIZABLE LIQUID CRYSTAL COMPOSITION

TECHNICAL FIELD

The invention relates to a polymerizable liquid crystal composition and a liquid crystal film obtained from the same. The invention also relates to an optical compensation film using the film, an optical device and a liquid crystal display unit.

BACKGROUND ART

A polymerizable liquid crystal compound having a liquid crystal phase yields a polymer having a function such as optical compensation by polymerization. The reason is that alignment of the liquid crystal compound is immobilized by polymerization. In order to utilize such a function of the polymer, various kinds of polymerizable liquid crystal compounds are developed. However, a sufficient function is not presumably satisfied by a single polymerizable liquid crystal compound. Therefore, an attempt has been made for preparing a composition from several polymerizable liquid crystal compounds to polymerize the composition (see Patent literature Nos. 1 to 4).

With regard to an alignment state of the liquid crystal compound, the liquid crystal compound showing homogeneous alignment, tilted alignment, homeotropic alignment, twisted alignment or the like may be occasionally described simply as "having homogeneous alignment," "having tilted alignment," "having homeotropic alignment," "having twisted alignment" or the like.

In a polymer having homeotropic alignment, a direction of an optical axis is in an $n_z$ direction, and a refractive index in the optical axis direction is larger than a refractive index in a direction perpendicular thereto. Therefore, the polymer is classified into a positive C-plate according to an index ellipsoid. When the positive C-plate is combined with any other film having an optical function, the positive C-plate can be applied to improvement of optical compensation of a homogeneously aligned liquid crystal mode such as a so-called in-plane switching (IPS) mode, for example, improvement of viewing angle characteristics of a polarizing plate (see Non-patent literature No. 1, Non-patent literature No. 2, Patent literature No. 5 or Patent literature No. 6).

In the application described above, a polymerizable liquid crystal material may be occasionally laminated onto a support substrate such as a glass substrate or a plastic substrate. Examples of materials used as the plastic substrate include polymers such as triacetylcellulose (TAC), polycarbonate, PET and cycloolefin resins.

In order to allow the polymerizable liquid crystal compound to have homeotropic alignment, when the support substrate is a glass substrate, specific methods include a method for selecting a structure of a polymerizable liquid crystal compound to develop a smectic phase (see Patent literature No. 7), and a method for applying lecithin onto a glass substrate as a homeotropic alignment film (see Patent literature No. 8). Moreover, when a plastic substrate is used as the support substrate, an alignment film is required to be formed onto the support substrate (see Patent literature No. 1 or Patent literature No. 9). So far, the present inventors have found out a polymerizable liquid crystal composition allowing formation of uniform homeotropic alignment on the glass substrate or the plastic substrate even without forming the alignment film onto the support substrate from the polymerizable liquid crystal compound, and having an excellent adhesion (Patent literature No. 10, 11 or 12). However, the compositions are used by mixing with an organic solvent in many cases, and when a support substrate has a significantly weak solvent resistance, a poor coating may be occasionally caused. Therefore, a desire has been expressed for a polymerizable liquid crystal composition allowing a uniform coating without damaging the support substrate having the significantly weak solvent resistance, in which a polymerizable liquid crystal compound uniformly has homeotropic alignment.

CITATION LIST

Patent Literature

Patent literature No. 1: JP H10-319408 A.
Patent literature No. 2: JP 2004-198478 A.
Patent literature No. 3: JP 2002-243942 A.
Patent literature No. 4: JP 2005-196221 A.
Patent literature No. 5: WO 2005/38517 A.
Patent literature No. 6: US 2006/182900 A.
Patent literature No. 7: JP 2000-514202 A.
Patent literature No. 8: JP H7-294735 A.
Patent literature No. 9: WO 2004/72699 A.
Patent literature No. 10: JP 2006-126757 A.
Patent literature No. 11: JP 2008-266550 A.
Patent literature No. 12: JP 2008-266632 A.

Non-Patent Literature

Non-patent literature No. 1: M. S. Park et al, IDW '04 FMCS-4.
Non-patent literature No. 2: M. Nakata et al, SID '06 P-58.

DESCRIPTION OF THE INVENTION

Technical Problem

An object of the invention is to provide a polymerizable liquid crystal composition showing good coating properties without giving solvent damage when a plastic substrate having a significantly weak solvent resistance is used as a support substrate, and having uniform homeotropic alignment properties even without a homeotropic alignment film having a long-chain alkyl group or the like, or without surface treatment by means of an inorganic material. Another object of the invention is to provide a liquid crystal layer formed of the polymerizable liquid crystal composition and having controlled alignment, a liquid crystal film obtained by polymerizing the polymerizable liquid crystal composition, and an optical compensation film using the film. A further object of the invention is to provide an image display unit including the optical compensation film, such as a liquid crystal display unit, an organic EL display unit and a PDP.

Solution to Problem

The present inventors have found that, when a non-liquid crystalline polymerizable compound having a functional group including a hydroxyl group, and having an acryloyl group or a methacryloyl group in one molecule is simultaneously used as a component of a polymerizable liquid crystal composition containing a compound represented by formula (3), the liquid crystal composition can be uniformly coated without a solvent damage even when a support substrate has a significantly weak solvent resistance, and homeotropic alignment of a polymerizable liquid crystal compound can be uniformly obtained, and thus have completed the invention. The compound represented by formula (3) is a generic term for compounds represented by formula (3-1) to formula (3-6), as shown below. The compounds represented by formula (3) have at least one acryloyloxy group, and can be polymerized in a manner similar to the polymerizable liquid crystal compound. A polymer obtained from the polymerizable liquid crystal composition shows uniform homeotropic alignment properties, and when the polymerizable liquid crystal composition is applied onto a support substrate subjected to mechanical surface treatment by rubbing or the like, or chemical surface treatment, a similar effect is obtained. The polymerizable liquid crystal composition of the invention is described in items 1 to 3 below.

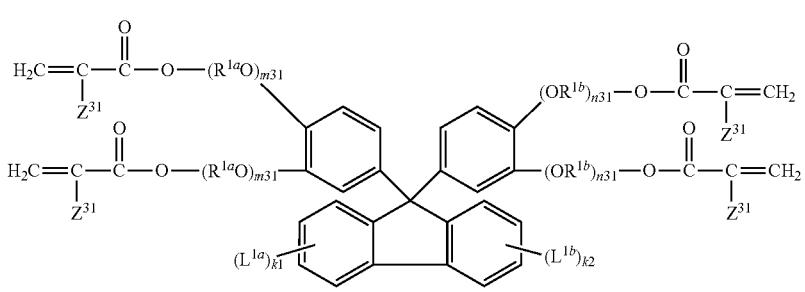
(3-1)

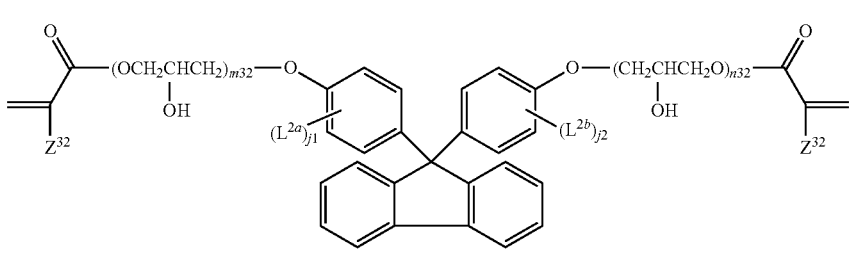
(3-2)

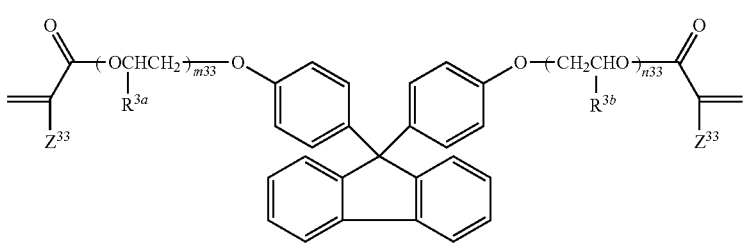
(3-3)

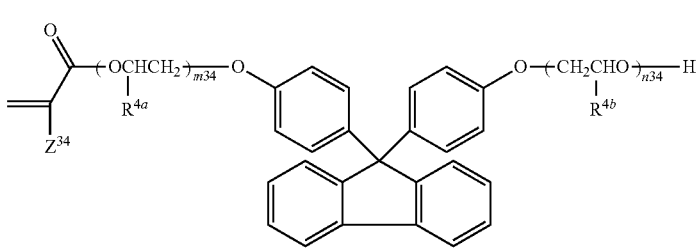
(3-4)

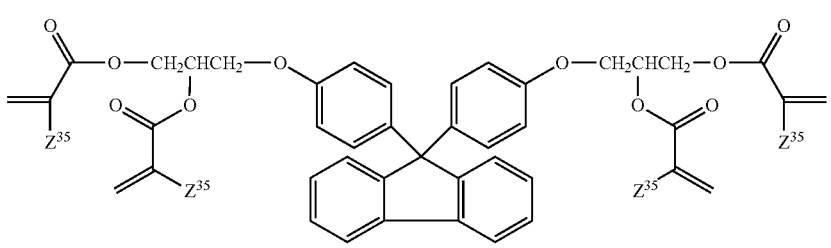
(3-5)

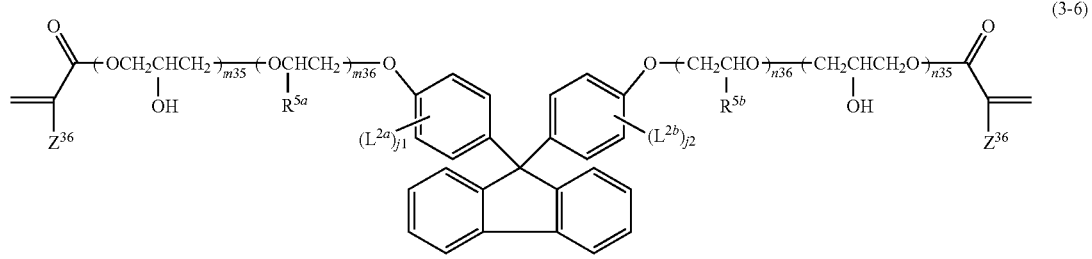
(3-6)

wherein, in formula (3-1), $L^{1a}$ and $L^{1b}$ are independently alkyl having 1 to 4 carbons; $R^{1a}$ and $R^{1b}$ are independently alkylene having 2 to 4 carbons; $Z^{31}$ is independently hydrogen or methyl; k1 and k2 are independently an integer from 0 to 4; m31 and n31 are independently an integer from 0 to 6:

in formula (3-2), $Z^{32}$ is independently hydrogen or methyl; m32 and n32 are independently an integer from 1 to 3; $L^{2a}$ and $L^{2b}$ are independently alkyl having 1 to 6 carbons, phenyl or fluorine; and j1 and j2 are independently an integer from 0 to 4:

in formula (3-3), $Z^{33}$ is independently hydrogen or methyl; $R^{3a}$ and $R^{3b}$ are independently hydrogen, methyl or ethyl; m33 and n33 are independently an integer from 0 to 3:

in formula (3-4), $Z^{34}$ is hydrogen or methyl; $R^{4a}$ and $R^{4b}$ are independently hydrogen or alkyl having 1 to 6 carbons; m34 and n34 are independently an integer from 0 to 10:

in formula (3-5), $Z^{35}$ is independently hydrogen or methyl: and in formula (3-6), $Z^{36}$ is independently hydrogen or methyl; $R^{5a}$ and $R^{5b}$ are independently hydrogen or alkyl having 1 to 6 carbons; $L^{2a}$ and $L^{2b}$ are independently alkyl having 1 to 6 carbons, phenyl or fluorine; j1 and j2 are independently an integer from 0 to 4; m35 and n35 are independently an integer from 1 to 3; and m36 and n36 are independently an integer from 1 to 3.

Item 1. A polymerizable liquid crystal composition containing a non-liquid crystalline polymerizable compound having an acryloyl group or a methacryloyl group as a reactive moiety, and having a functional group including a hydroxyl group as a reactive dilution solvent in one molecule.

Item 2. The polymerizable liquid crystal composition according to item 1, containing component (A) being at least one compound selected from the group of compounds represented by each of formula (1-1), formula (1-2) and formula (1-3), component (B) being at least one compound selected from the group of compounds represented by each of formula (2-1), formula (2-2) and formula (2-3), component (C) being at least one compound selected from the group of compounds represented by each of formula (3-1) to formula (3-6), and component (E) being a non-liquid crystalline polymerizable compound having a functional group including a hydroxyl group, and having an acryloyl group or a methacryloyl group in one molecule, wherein the polymerizable liquid crystal composition may contain component (D) being at least one compound selected from the group of compounds represented by each of formula (4-1) and formula (4-2):

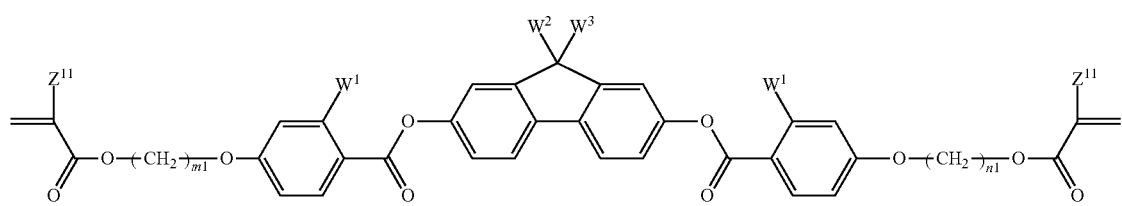
(1-1)

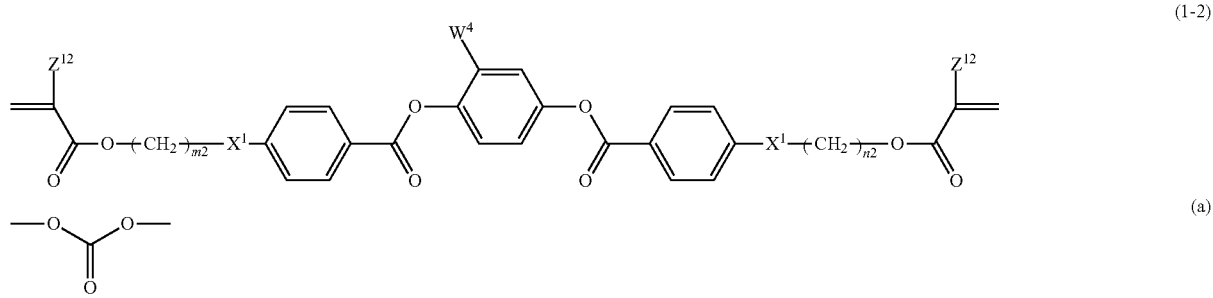
(1-2)

(a)

-continued (1-3)

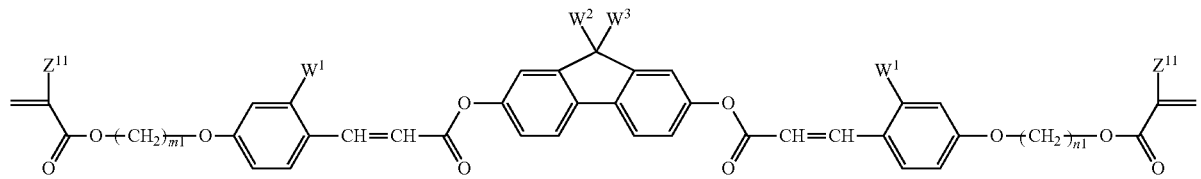

wherein, $Z^{11}$ is independently hydrogen, fluorine, methyl or trifluoromethyl; $W^1$ is independently hydrogen or fluorine; $W^2$ and $W^3$ are independently hydrogen or methyl; $Z^{12}$ is independently hydrogen, fluorine, methyl or trifluoromethyl; $W^4$ is hydrogen, methyl, straight-chain alkyl having 1 to 7 carbons, branched alkyl having 1 to 7 carbons, alkoxycarbonyl (—COOR$^a$; wherein R$^a$ is straight-chain alkyl having 1 to 7 carbons) or alkylcarbonyl (—COR$^b$; wherein R$^b$ is straight-chain alkyl having 1 to 15 carbons); $X^1$ is independently —O— or a group represented by formula (a); and m1, m2, n1 and n2 are independently an integer from 2 to 15:

(2-1)

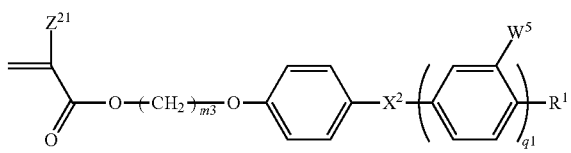

(2-2)

(2-3)

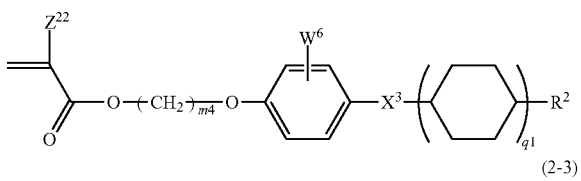

wherein, $Z^{21}$ is hydrogen or methyl; $R^1$ is cyano, trifluoromethoxy, alkyl having 1 to 10 carbons or alkoxy having 1 to 10 carbons; $W^5$ is hydrogen or fluorine; $X^2$ is a single bond, —COO— or —OCO—; m3 is an integer from 2 to 15; $Z^{22}$ is hydrogen or methyl; m4 is an integer from 2 to 15; $W^6$ is hydrogen, fluorine or methoxy; $X^3$ is a single bond, —COO—, —OCO—, —CH$_2$CH$_2$—COO— or —CH=CH—COO—, q1 is 1 or 2, and $R^2$ is alkyl having 1 to 10 carbons; and $X^4$ is —COO—, —OCO—, —CH$_2$CH$_2$—COO— or —CH=CH—COO—:

(3-1)

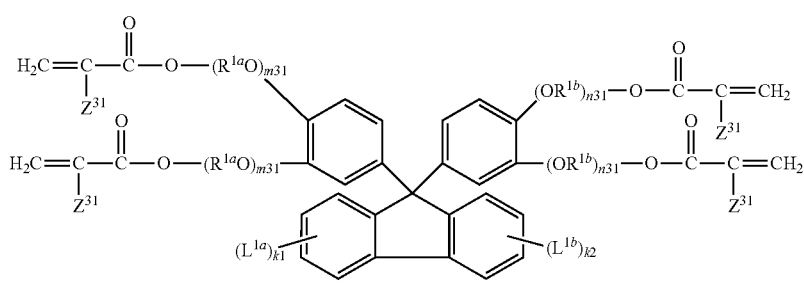

(3-2)

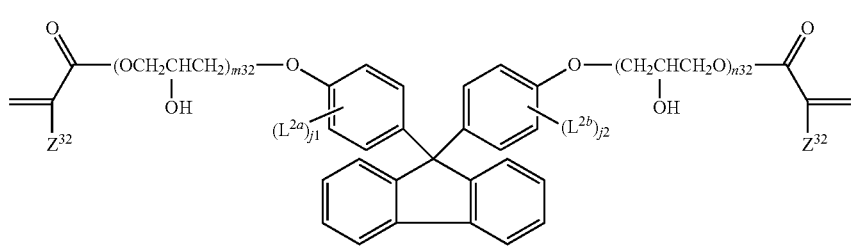

-continued

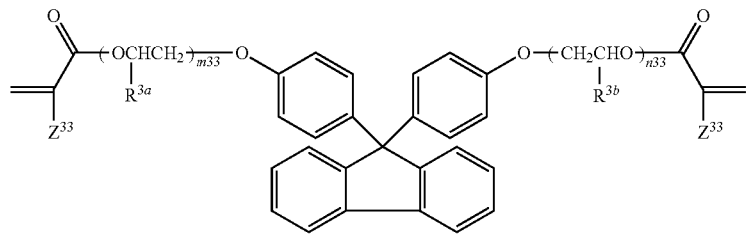

(3-3)

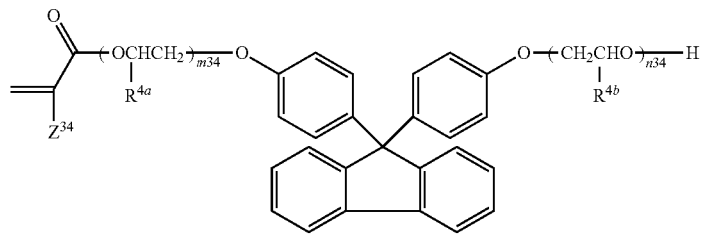

(3-4)

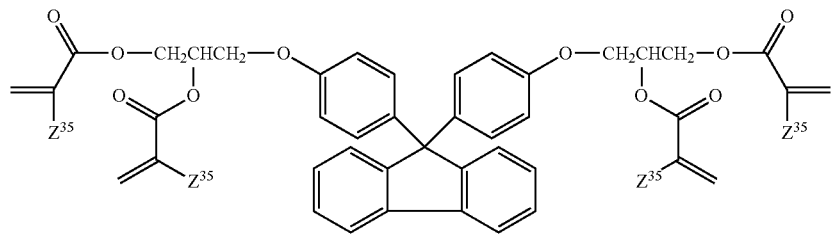

(3-5)

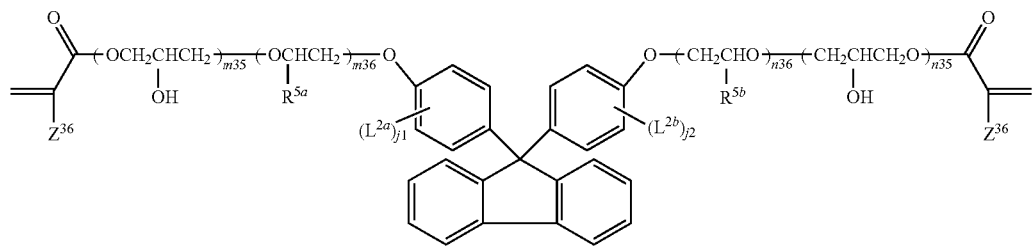

(3-6)

wherein,
in formula (3-1), $L^{1a}$ and $L^{1b}$ are independently alkyl having 1 to 4 carbons; $R^{1a}$ and $R^{1b}$ are independently alkylene having 2 to 4 carbons; $Z^{31}$ is independently hydrogen or methyl; k1 and k2 are independently an integer from 0 to 4; and m31 and n31 are independently an integer from 0 to 6:
in formula (3-2), $Z^{32}$ is independently hydrogen or methyl; m32 and n32 are independently an integer from 1 to 3; $L^{2a}$ and $L^{2b}$ are independently alkyl having 1 to 6 carbons, phenyl or fluorine; and j1 and j2 are independently an integer from 0 to 4:
in formula (3-3), $Z^{33}$ is independently hydrogen or methyl; $R^{3a}$ and $R^{3b}$ are independently hydrogen, methyl or ethyl; and m33 and n33 are independently an integer from 0 to 3:

in formula (3-4), $Z^{34}$ is hydrogen or methyl; $R^{4a}$ and $R^{4b}$ are independently hydrogen or alkyl having 1 to 6 carbons; and m34 and n34 are independently an integer from 0 to 10:

in formula (3-5), $Z^{35}$ is independently hydrogen or methyl: and in formula (3-6), $Z^{36}$ is independently hydrogen or methyl; $R^{5a}$ and $R^{5b}$ are independently hydrogen or alkyl having 1 to 6 carbons; $L^{2a}$ and $L^{2b}$ are independently alkyl having 1 to 6 carbons, phenyl or fluorine; j1 and j2 are independently an integer from 0 to 4; m35 and n35 are independently an integer from 1 to 3; and m36 and n36 are independently an integer from 1 to 3:

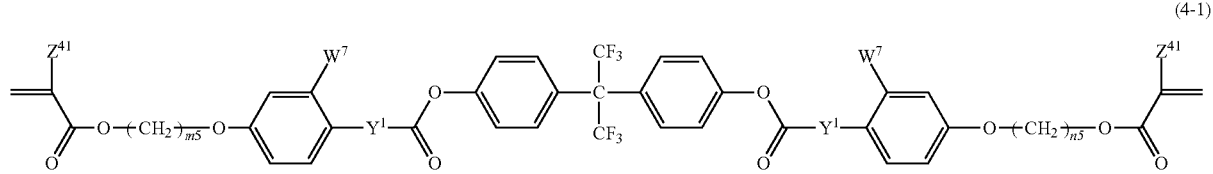

(4-1)

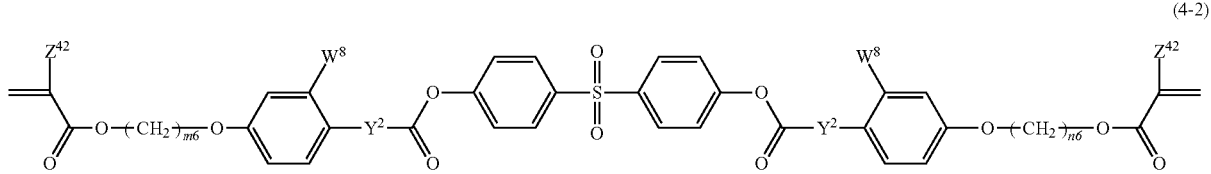

(4-2)

wherein, $Z^{41}$ and $Z^{42}$ are independently hydrogen or methyl; $Y^1$ and $Y^2$ are independently a single bond, —$(CH_2)_2$— or —CH=CH—; $W^7$ and $W^8$ are independently hydrogen or fluorine; and m5, m6, n5 and n6 are independently an integer from 2 to 15.

Item 3. The polymerizable liquid crystal composition according to item 1, containing
component (A) being at least one compound selected from the group of compounds represented by each of formula (1-1) and formula (1-2),
component (B) being at least one compound selected from the group of compounds represented by each of formula (2-1) and formula (2-2),
component (C) being at least one compound selected from the group of compounds represented by each of formula (3-1) to formula (3-6), and
component (E) being a non-liquid crystalline polymerizable compound having a functional group including a hydroxyl group, and having an acryloyl group or a methacryloyl group in one molecule,
wherein the polymerizable liquid crystal composition may contain component (D) being at least one compound selected from the group of compounds represented by each of formula (4-1) and formula (4-2):

group represented by formula (a); and m1, m2, n1 and n2 are independently an integer from 2 to 15:

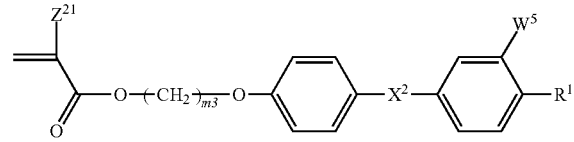

(2-1)

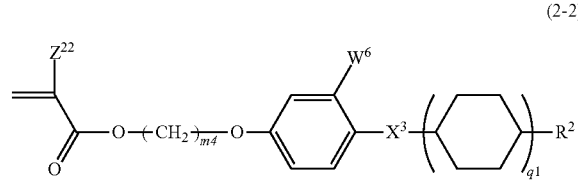

(2-2)

wherein, $Z^{21}$ is hydrogen or methyl; $R^1$ is cyano, trifluoromethoxy, alkyl having 1 to 10 carbons or alkoxy having 1 to 10 carbons; $W^5$ is hydrogen or fluorine; $X^2$ is a single bond, —COO— or —OCO—; m3 is an integer from 2 to 15; $Z^{22}$ is hydrogen or methyl; m4 is an integer from 2 to 15; $W^6$ is hydrogen or fluorine; and $X^3$ is a single bond, —COO—, —OCO—, —$CH_2CH_2$—COO— or —CH=CH—COO—, q1 is 1 or 2, and $R^2$ is alkyl having 1 to 10 carbons:

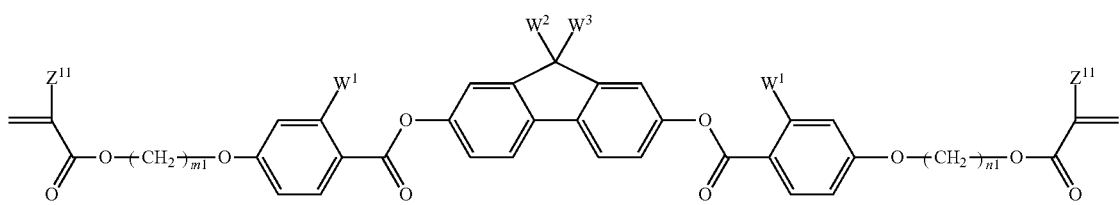

(1-1)

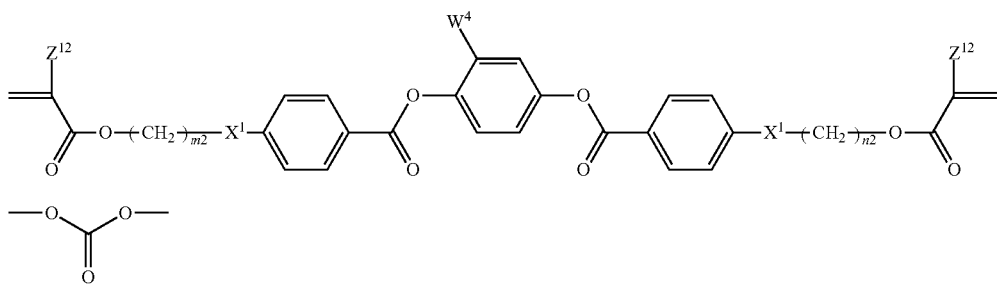

(1-2)

(a)

wherein, $Z^{11}$ is independently hydrogen, fluorine, methyl or trifluoromethyl; $W^1$ is independently hydrogen or fluorine; $W^2$ and $W^3$ are independently hydrogen or methyl; $Z^{12}$ is independently hydrogen, fluorine, methyl or trifluoromethyl; $W^4$ is hydrogen or methyl; $X^1$ is independently —O— or a

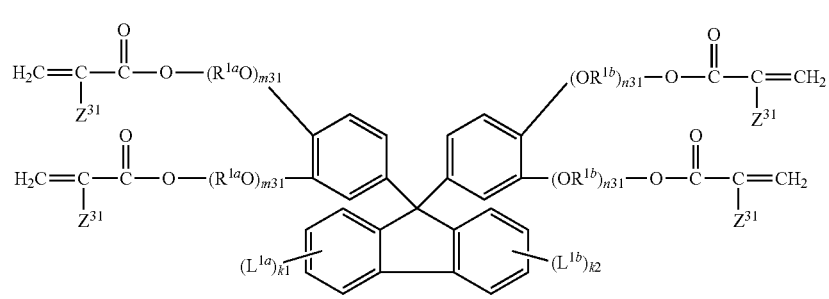

(3-1)

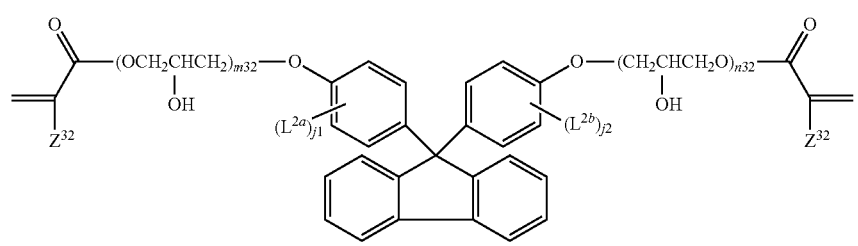

(3-2)

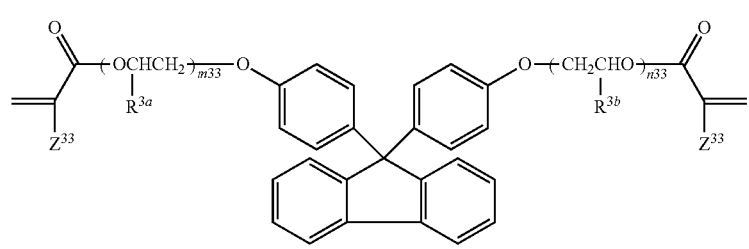

(3-3)

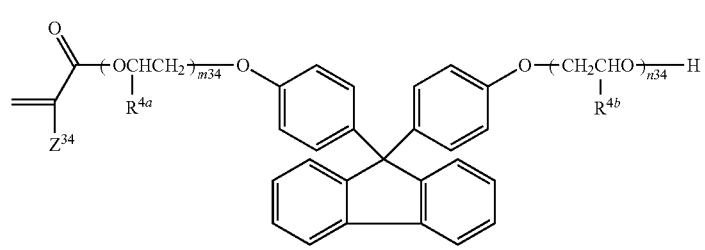

(3-4)

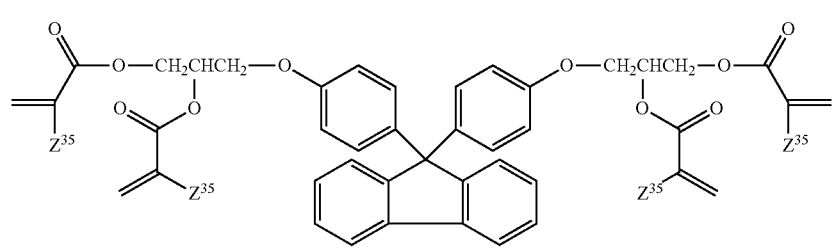

(3-5)

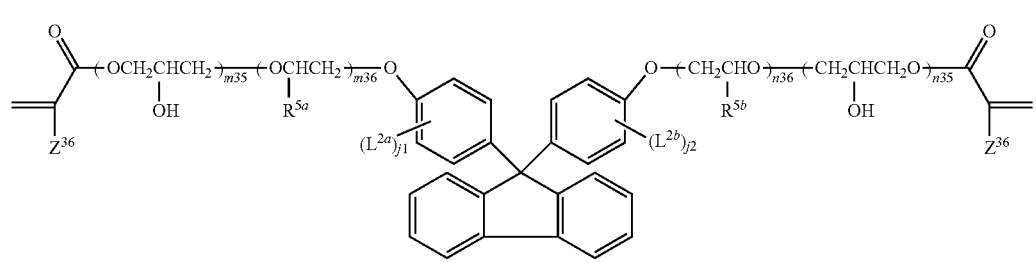

(3-6)

wherein, in formula (3-1), $L^{1a}$ and $L^{1b}$ are independently alkyl having 1 to 4 carbons; $R^{1a}$ and $R^{1b}$ are independently alkylene having 2 to 4 carbons; $Z^{31}$ is independently hydrogen or methyl; k1 and k2 are independently an integer from 0 to 4; and m31 and n31 are independently an integer from 0 to 6:

in formula (3-2), $Z^{32}$ is independently hydrogen or methyl; m32 and n32 are independently an integer from 1 to 3; $L^{1a}$ and $L^{2b}$ are independently alkyl having 1 to 6 carbons, phenyl or fluorine; and j1 and j2 are independently an integer from 0 to 4:

in formula (3-3), $Z^{33}$ is independently hydrogen or methyl; $R^{3a}$ and $R^{3b}$ are independently hydrogen, methyl or ethyl; and m33 and n33 are independently an integer from 0 to 3:

in formula (3-4), $Z^{34}$ is hydrogen or methyl; $R^{4a}$ and $R^{4b}$ are independently hydrogen or alkyl having 1 to 6 carbons; and m34 and n34 are independently an integer from 0 to 10:

in formula (3-5), $Z^{35}$ is independently hydrogen or methyl: and in formula (3-6), $Z^{36}$ is independently hydrogen or methyl; $R^{5a}$ and $R^{5b}$ are independently hydrogen or alkyl having 1 to 6 carbons; $L^{2a}$ and $L^{2b}$ are independently alkyl having 1 to 6 carbons, phenyl or fluorine; j1 and j2 are independently an integer from 0 to 4; m35 and n35 are independently an integer from 1 to 3; and m36 and n36 are independently an integer from 1 to 3:

strate has a significantly weak solvent resistant, the liquid can be uniformly coated without a solvent damage, and homeotropic alignment of the polymerizable liquid crystal compound is uniformly obtained. Moreover, a polymerizable liquid crystal composition having excellent coating properties onto the support substrate is obtained. Furthermore, a liquid crystal film obtained from the polymerizable liquid crystal composition according to the invention shows uniform homeotropic alignment properties even without a homeotropic alignment film having a long-chain alkyl group or the like, or without surface treatment by means of an inorganic material.

DESCRIPTION OF EMBODIMENTS

Usage of terms herein is as described below. A liquid crystal compound is a generic term for a compound having a liquid crystal phase, and a compound having no liquid crystal

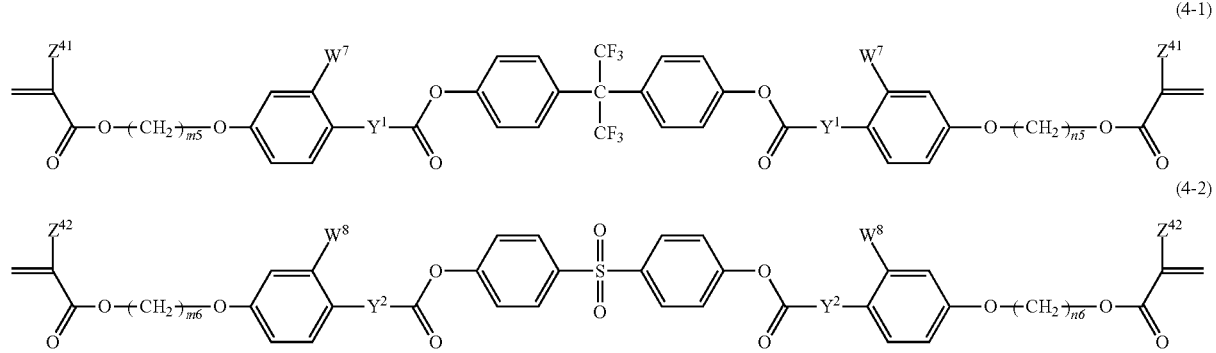

wherein, $Z^{41}$ and $Z^{42}$ are independently hydrogen or methyl; $Y^1$ and $Y^2$ are independently a single bond, $-(CH_2)_2-$ or $-CH=CH-$; $W^7$ and $W^8$ are independently hydrogen or fluorine; and m5, m6, n5 and n6 are independently an integer from 2 to 15.

The invention also concerns a polymerizable liquid crystal layer, obtained by directly applying the polymerizable liquid crystal composition onto a support substrate.

The invention further concerns a liquid crystal film, obtained by polymerizing the polymerizable liquid crystal layer.

The invention further concerns an optical compensation device having the liquid crystal film.

The invention still further concerns an optical device having the liquid crystal film and a polarizing plate.

The invention still further concerns a liquid crystal display unit having the optical compensation device on an inner surface or an external surface of a liquid crystal cell.

The invention still further concerns a liquid crystal display unit having the optical device on an external surface of a liquid crystal cell.

Advantageous Effects of Invention

When a compound represented by formula (3) and a non-liquid crystalline compound having a functional group including a hydroxyl group, and having an acryloyl group or a methacryloyl group in one molecule are added to a polymerizable liquid crystal compound, a compatibilized liquid without causing precipitation of the polymerizable liquid crystal compound is obtained, and even when a support subphase but being useful as a component of a liquid crystal composition. The liquid crystal phase includes a nematic phase, a smectic phase and a cholesteric phase, and means the nematic phase in many cases. Polymerizability means a capability of polymerizing a monomer by a means such as light, heat or a catalyst to yield a polymer. A compound represented by formula (1-1) may be occasionally described as compound (1-1). A same rule applies to any other compound represented by any other formula. In addition, component (E) may be occasionally described as compound (E). (Meth)acrylate represents one of or both of acrylate and methacrylate. In a chemical formula, a substituent of a benzene ring when a bonding hand is expressed without bonding to any of carbon atoms constituting the benzene ring represents that a bonding position of the bonding hand is arbitrary. A functional group including a hydroxyl group represents a functional group having at least one hydroxyl group, such as a hydroxyl group, a carboxyl group, a sulfonate group and a phosphate group.

In the invention, the polymerizable liquid crystal composition is explained in the form of a system without containing a solvent for convenience in order to facilitate clear specification of a ratio of components of the composition. Then, a solution including the polymerizable liquid crystal composition and the solvent is described as the solution of the polymerizable liquid crystal composition. When the polymerizable liquid crystal composition contains the solvent, the solution of the polymerizable liquid crystal composition is prepared by dissolving each component of the polymerizable liquid crystal composition into the solvent.

Alignment in the liquid crystal compound is classified, based on magnitude of a tilted angle or the like, into homogeneous alignment, homeotropic alignment, tilted alignment, twisted alignment and so forth. The tilted angle is expressed by an angle of an incline between a support substrate and an alignment state of the liquid crystal compound. "Homogeneous" means a state in which the alignment state is parallel to the substrate, and aligned in one direction. Examples of the tilted angles in homogeneous alignment include 0 degrees to 5 degrees. "Homeotropic" means a state in which the alignment state is perpendicular to the substrate. Examples of the tilted angles in homeotropic alignment include 85 degrees to 90 degree. "Tilted" means a state in which the alignment state rises up perpendicularly from parallel as the alignment state is further separated from the substrate. Examples of the tilted angles in tilted alignment include 5 degrees to 85 degrees. "Twisted" means a state in which the alignment state is in parallel to the substrate, but twisted stepwise on a helical axis. Examples of the tilted angle in twisted alignment include 0 degrees to 5 degrees.

The invention is constituted of items 1 to 3 as described above, and items 4 to 15 as described below.

Item 4. The polymerizable liquid crystal composition according to item 2 or 3, wherein component (E) is butanediol monoacrylate, a reaction product between butyl glycidyl ether and (meth)acrylic acid, 3-chloro-2-hydroxypropyl methacrylate, glycerol methacrylate, glycerol acrylate, glycerol dimethacrylate, glycerol triacrylate, 2-hydroxyethyl acrylate, 2-hydroxyethyl methacrylate, 2-hydroxypropyl acrylate, 2-hydroxypropyl methacrylate, caprolactone-modified 2-hydroxyethyl acrylate, caprolactone-modified 2-hydroxyethyl methacrylate, phenoxyhydroxypropyl acrylate, 2-hydroxy-3-acryloyloxypropyl methacrylate, bispropenoic acid [1,6-hexanediylbis[oxy(2-hydroxy-3,1-propanediyl)]] ester, triglycerol diacrylate, pentaerythritol tri(meth)acrylate, dipentaerythritolmonohydroxy penta(meth)acrylate, polyethylene glycol mono(meth)acrylate having a polymerization degree of 2 to 20, polypropylene glycol mono(meth)acrylate having a polymerization degree of 2 to 20, poly(ethylene glycol-propylene glycol)mono(meth)acrylate, polyethylene glycol-polypropylene glycol mono(meth)acrylate, poly(ethylene glycol-tetramethylene glycol)mono(meth)acrylate, poly(propylene glycol-tetramethylene glycol)mono(meth)acrylate, propylene glycol polybutylene glycol mono(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloyloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyethyl-1-yloxy)benzoic acid, 4-(3-acryloyloxy-n-prop-1-yloxy)benzoic acid, 4-(2-methacryloyloxyethyl-1-yloxy)benzoic acid, 4-(4-acryloyloxy-n-buty-1-yloxy)benzoic acid, 4-(6-acryloyloxy-n-hexy-1-yloxy)benzoic acid, 4-(6-acryloyloxy-n-hexy-1-yloxy)-2-methylbenzoic acid, 4-(6-methacryloyloxy-n-hexy-1-yloxy)benzoic acid, 4-(10-acryloyloxy-n-deci-1-yloxy)benzoic acid, 2-acryloyloxyethyl acid phosphate and 2-methacryloyloxyethyl acid phosphate.

Item 5. The polymerizable liquid crystal composition according to item 2 or 3, wherein component (E) is butanediol monoacrylate, a reaction product between butyl glycidyl ether and (meth)acrylic acid, 3-chloro-2-hydroxypropyl methacrylate, glycerol methacrylate, glycerol acrylate, glycerol dimethacrylate, glycerol triacrylate, 2-hydroxyethyl acrylate, 2-hydroxyethyl methacrylate, 2-hydroxypropyl acrylate, 2-hydroxypropyl methacrylate, caprolactone-modified 2-hydroxyethyl acrylate, caprolactone-modified 2-hydroxyethyl methacrylate, phenoxyhydroxypropyl acrylate, 2-hydroxy-3-acryloyloxypropyl methacrylate or bispropenoic acid [1,6-hexanediylbis[oxy(2-hydroxy-3,1-propanediyl)]]ester.

Item 6. The polymerizable liquid crystal composition according to item 4 or 5, wherein, in formula (1-1), formula (1-2) and formula (1-3), $Z^{11}$ is independently hydrogen, fluorine, methyl or trifluoromethyl; $Z^{12}$ is independently hydrogen, fluorine, methyl or trifluoromethyl; $W^1$ is hydrogen; $W^2$ is hydrogen; $W^3$ is methyl; $W^4$ is hydrogen, methyl, straight-chain alkyl having 1 to 7 carbons, tert-butyl, alkoxycarbonyl (—COOR$^a$; wherein R$^a$ is straight-chain alkyl having 1 to 7 carbons) or alkylcarbonyl (—COR$^b$; wherein R$^b$ is straight-chain alkyl having 1 to 15 carbons); $X^1$ is independently —O— or a group represented by formula (a); and m1, m2, n1 and n2 are independently an integer from 2 to 10:

in formula (2-1), formula (2-2) and formula (2-3), $Z^{21}$ is hydrogen or methyl; $R^1$ is cyano, alkyl having 1 to 8 carbons or alkoxy having 1 to 8 carbons; $W^5$ is hydrogen; $X^2$ is a single bond, —COO— or —OCO—; m3 is an integer from 2 to 10; $Z^{22}$ is hydrogen or methyl; m4 is an integer from 2 to 10; $X^3$ is a single bond, —COO—, —OCO— or —CH$_2$CH$_2$—COO—, q1 is 1 or 2, and $R^2$ is alkyl having 1 to 10 carbons; $X^4$ is —COO—, —OCO—, —CH$_2$CH$_2$—COO— or —CH=CH—COO—; and $W^6$ is hydrogen, fluorine or methoxy:

in formula (3-1), k1 and k2 are each 0; $R^{1a}$ and $R^{1b}$ are independently alkylene having 2 to 4 carbons; $Z^{31}$ is independently hydrogen or methyl; and m31 and n31 are independently an integer from 0 to 6:

in formula (3-2), $Z^{32}$ is independently hydrogen or methyl; m32 and n32 are independently an integer from 1 to 3; $L^{2a}$ and $L^{2b}$ are independently methyl, phenyl or fluorine; and j1 and j2 are independently an integer from 0 to 4:

in formula (3-3), $Z^{33}$ is independently hydrogen or methyl; $R^{3a}$ and $R^{4b}$ are independently hydrogen, methyl or ethyl; and m33 and n33 are independently an integer from 0 to 3:

in formula (3-4), $Z^{34}$ is hydrogen or methyl; $R^{4a}$ and $R^{4b}$ are independently hydrogen or alkyl having 1 to 6 carbons; and m34 and n34 are independently an integer from 0 to 10:

in formula (3-5), $Z^{35}$ is independently hydrogen or methyl: and in formula (3-6), $Z^{36}$ is independently hydrogen or methyl; $R^{5a}$ and $R^{5b}$ are each hydrogen; m35 and n35 are independently an integer from 1 to 3; m36 and n36 are independently an integer from 1 to 3; and j1 and j2 are each 0:

component (E) is a non-liquid crystalline polymerizable compound having a functional group including a hydroxyl group, and having an acryloyl group or a methacryloyl group in one molecule: and component (A) is in the range of 25 to 97% by weight, component (B) is in the range of 3 to 75% by weight, and component (D) is in the range of 0 to 25% by weight, in a ratio based on the total weight of component (A), component (B) and component (D), and component (C) is in the range of 0.01 to 0.20, and component (E) is in the range of 0.01 to 6.00, in a weight ratio based on the total weight of component (A), component (B) and component (D).

Item 7. The polymerizable liquid crystal composition according to item 4 or 5, wherein, in formula (1-1), formula (1-2) and formula (1-3), $Z^{11}$ is independently hydrogen or methyl; $Z^{12}$ is independently hydrogen, fluorine, methyl or trifluoromethyl; $W^1$ is hydrogen; $W^2$ is hydrogen; $W^3$ is methyl; $W^4$ is hydrogen, methyl, tert-butyl, straight-chain alkyl having 1 to 7 carbons, alkoxycarbonyl (—COOR$^a$; wherein R$^a$ is straight-chain alkyl having 1 to 7 carbons) or alkylcarbonyl (—COR$^b$; wherein R$^b$ is straight-chain alkyl having 1 to 7 carbons); $X^1$ is independently —O— or a group represented by formula (a); and m1, m2, n1 and n2 are independently an integer from 2 to 10:

in formula (2-1), formula (2-2) and formula (2-3), $Z^{21}$ is hydrogen or methyl; $R^1$ is cyano, alkyl having 1 to 8 carbons or alkoxy having 1 to 8 carbons; $W^5$ is hydrogen; $X^2$ is single bond, —COO— or —OCO—; m3 is an integer from 2 to 10; $Z^{22}$ is hydrogen or methyl; m4 is an integer from 2 to 10; $X^3$ is a single bond, —COO—, —OCO— or —CH$_2$CH$_2$—COO—, q1 is 1 or 2, and $R^2$ is alkyl having 1 to 10 carbons; $X^4$ is —COO—, —OCO—, —CH$_2$CH$_2$—COO— or —CH=CH—COO—; and $W^6$ is hydrogen, fluorine or methoxy:

in formula (3-1), k1 and k2 are each 0; $R^{1a}$ and $R^{1b}$ are independently alkylene having 2 to 4 carbons; $Z^{31}$ is hydrogen; and m31 and n31 are independently an integer from 0 to 6:

in formula (3-2), $Z^{32}$ is hydrogen; m32 and n32 are independently an integer from 1 to 3; $L^{2a}$ and $L^{2b}$ are independently methyl or phenyl; and j1 and j2 are independently an integer from 0 to 2:

in formula (3-3), $Z^{33}$ is hydrogen; $R^{4a}$ and $R^{4b}$ are hydrogen; and m33 and n33 are independently an integer from 0 to 3:

in formula (3-4), $Z^{34}$ is hydrogen; $R^{4a}$ and $R^{4b}$ are each hydrogen; and m34 and n34 are independently an integer from 0 to 10:

in formula (3-5), $Z^{35}$ is hydrogen: and in formula (3-6), $Z^{36}$ is hydrogen; $R^{5a}$ and $R^{5b}$ are each hydrogen; m35 and n35 are independently an integer from 1 to 3; m36 and n36 are independently an integer from 1 to 3; and j1 and j2 are each 0:

component (E) is a non-liquid crystalline polymerizable compound having a functional group including a hydroxyl group, and having an acryloyl group or a methacryloyl group in one molecule: and component (A) is in the range of 35 to 97% by weight, component (B) is in the range of 3 to 65% by weight, and component (D) is in the range of 0 to 20% by weight, in a ratio based on the total weight of component (A), component (B) and component (D), and component (C) is in the range of 0.01 to 0.20 and component (E) is in the range of 0.01 to 4.00, in a weight ratio based on the total weight of component (A), component (B) and component (D).

Item 8. A polymerizable liquid crystal layer, obtained by directly applying the polymerizable liquid crystal composition according to any one of items 1 to 7 onto a support substrate.

Item 9. The polymerizable liquid crystal layer according to item 8, wherein the support substrate is a glass substrate or a plastic substrate.

Item 10. The polymerizable liquid crystal layer according to any one of items 8 to 9, wherein a surface of the support substrate is subjected to rubbing treatment, corona treatment or plasma treatment.

Item 11. The polymerizable liquid crystal layer according to any one of items 8 to 10, wherein an alignment state of a liquid crystal compound in the polymerizable liquid crystal layer includes homeotropic alignment.

Item 12. A liquid crystal film, obtained by polymerizing the polymerizable liquid crystal layer according to any one of items 8 to 11.

Item 13. An optical compensation device having the liquid crystal film according to item 12.

Item 14. An optical device having the liquid crystal film according to item 12 and a polarizing plate.

Item 15. A liquid crystal display unit having the optical compensation device according to item 13 on an inner surface or an external surface of a liquid crystal cell.

Item 16. A liquid crystal display unit having the optical device according to item 14 on an external surface of a liquid crystal cell.

The composition of the invention contains at least one compound selected from the group of compounds represented by each of formula (1-1), formula (1-2) and formula (1-3) as component (A).

(1-1)

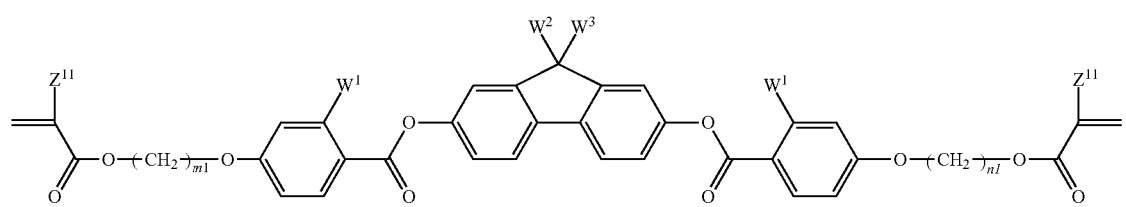

(1-2)

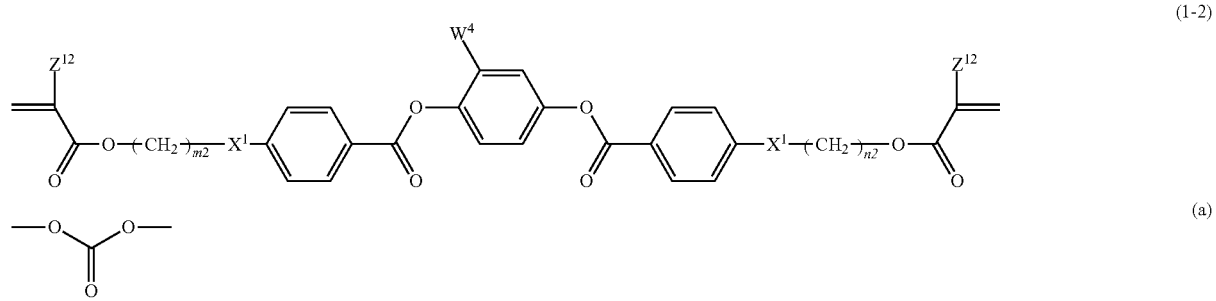

(a)

(1-3)

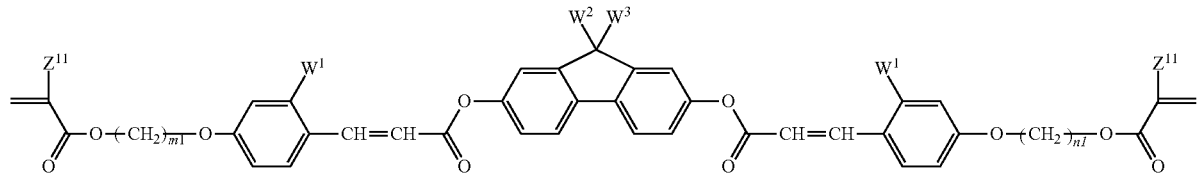

In formula (1-1), formula (1-2) and formula (1-3), $Z^{11}$ and $Z^{12}$ are independently hydrogen, fluorine, methyl or trifluoromethyl, preferably, hydrogen, fluorine or methyl preferably, further preferably, hydrogen or methyl. $W^1$ is independently hydrogen or fluorine, preferably, hydrogen. $W^2$ and $W^3$ are independently hydrogen or methyl. $W^4$ is hydrogen, methyl, straight-chain alkyl having 1 to 7 carbons, branched alkyl having 1 to 7 carbons, alkoxycarbonyl (—COO$R^a$; wherein $R^a$ is straight-chain alkyl having 1 to 7 carbons) or alkylcarbonyl (—CO$R^b$; wherein $R^b$ is straight-chain alkyl having 1 to 15 carbons), preferably, hydrogen, methyl, straight-chain alkyl having 1 to 7 carbons, tert-butyl, alkoxycarbonyl (—COO$R^a$; wherein $R^a$ is straight-chain alkyl having 1 to 7 carbons) or alkylcarbonyl(—CO$R^b$; wherein $R^b$ is straight-chain alkyl having 1 to 15 carbons), further preferably, hydrogen, methyl, tert-butyl, straight-chain alkyl having 1 to 7 carbons, alkoxycarbonyl (—COO$R^a$; wherein $R^a$ is straight-chain alkyl having 1 to 7 carbons) or alkylcarbonyl (—CO$R^b$; wherein $R^b$ is straight-chain alkyl having 1 to 7 carbons), still further preferably, hydrogen, methyl, tert-butyl or straight-chain alkyl having 1 to 7 carbons, particularly preferably, $W^4$ is hydrogen or methyl.

$X^1$ is independently —O— or a group represented by formula (a). Then, m1, m2, n1 and n2 are independently an integer from 2 to 15, preferably, an integer from 2 to 10, further preferably, an integer from 2 to 8, still further preferably, an integer from 4 to 6.

The composition of the invention contains component (B) being is at least one compound represented by each of formula (2-1), formula (2-2) and formula (2-3).

(2-1)

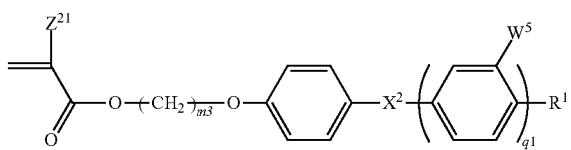

(2-2)

(2-3)

In formula (2-1), formula (2-2) and formula (2-3), $Z^{21}$ is hydrogen or methyl. $R^1$ is cyano, trifluoromethoxy, alkyl having 1 to 10 carbons or alkoxy having 1 to 10 carbons, preferably, cyano, alkyl having 1 to 8 carbons or alkoxy having 1 to 8 carbons, further preferably, cyano. $W^5$ is hydrogen or fluorine, preferably, hydrogen. $X^2$ is single bond, —COO— or —OCO—. Then, m3 is an integer from 2 to 15, preferably, an integer from 2 to 10, further preferably, an integer from 2 to 8, still further preferably, an integer from 4 to 6. $Z^{22}$ is independently hydrogen or methyl. Then, m4 is an integer from 2 to 15, preferably, an integer from 2 to 10, further preferably, an integer from 2 to 8, still further preferably, an integer from 4 to 6. $W^6$ is hydrogen, fluorine or methoxy, preferably, hydrogen or fluorine, further preferably, fluorine. $X^3$ is a single bond, —COO—, —OCO—, —CH$_2$CH$_2$—COO— or —CH=CH—COO—, preferably, —COO—, —OCO— or —CH$_2$CH$_2$—COO—. Then, q1 is 1 or 2. $R^2$ is alkyl having 1 to 10 carbons, preferably, alkyl having 1 to 7 carbons. $X_4$ is —COO—, —OCO—, —CH$_2$CH$_2$—COO— or —CH=CH—COO—, preferably, —COO—, —OCO— or —CH=CH—COO—.

The composition of the invention contains component (C) being at least one compound selected from the group of compounds represented by each of formula (3-1), formula (3-2), formula (3-3), formula (3-4), formula (3-5) and formula (3-6).

(3-1)

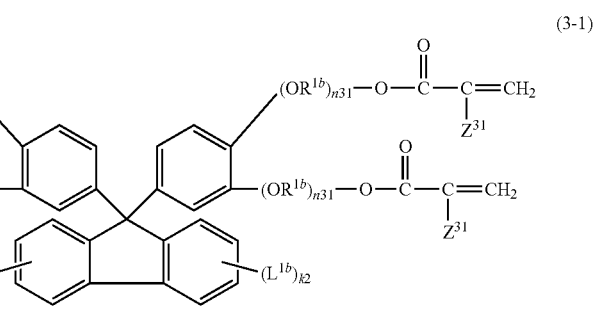

In formula (3-1), $L^{1a}$ and $L^{1b}$ are independently alkyl having 1 to 4 carbons. $R^{1a}$ and $R^{1b}$ are independently alkylene having 2 to 4 carbons, preferably, alkylene having 2 carbons, more specifically, ethylene. $Z^{31}$ is independently hydrogen or methyl, preferably, hydrogen. Then, k1 and k2 are independently an integer from 0 to 4, preferably, 0. Then, m31 and n31 are independently an integer from 0 to 6, preferably, an integer from 1 to 4, further preferably, 1.

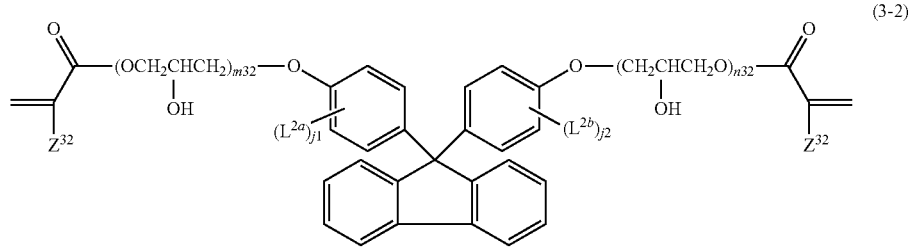

(3-2)

In formula (3-2), $Z^{32}$ is independently hydrogen or methyl, preferably, hydrogen. Then, m32 and n32 are independently an integer from 1 to 3, preferably, 1. $L^{2a}$ and $L^{2b}$ are independently alkyl having 1 to 6 carbons, phenyl or fluorine, preferably, methyl, phenyl or fluorine, further preferably, methyl or phenyl. Then, j1 and j2 are independently an integer from 0 to 4, preferably, an integer from 0 to 2, further preferably, 0.

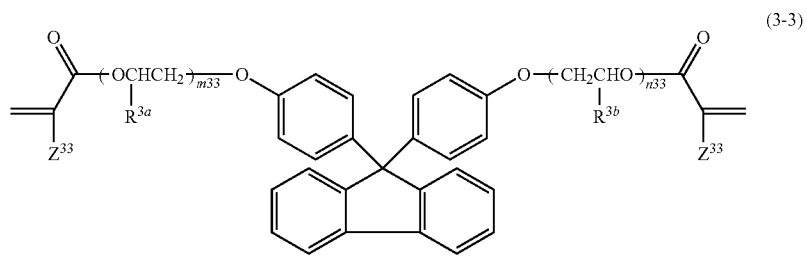

(3-3)

In formula (3-3), $Z^{33}$ is independently hydrogen or methyl, preferably, hydrogen. $R^{3a}$ and $R^{3b}$ are independently hydrogen, methyl or ethyl, preferably, hydrogen. Then, m33 and n33 are independently an integer from 0 to 3, preferably, an integer from 1 to 3.

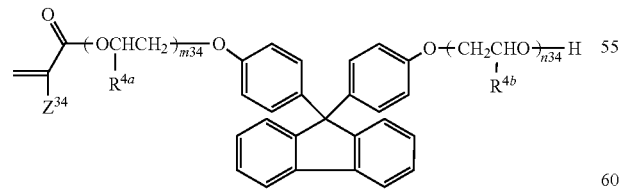

(3-4)

In formula (3-4), $Z^{34}$ is hydrogen or methyl, preferably, hydrogen. $R^{4a}$ and $R^{4b}$ are independently hydrogen or alkyl having 1 to 6 carbons, preferably, hydrogen. Then, m34 and n34 are independently an integer from 0 to 10, preferably, an integer from 0 to 5, further preferably, an integer from 0 to 2.

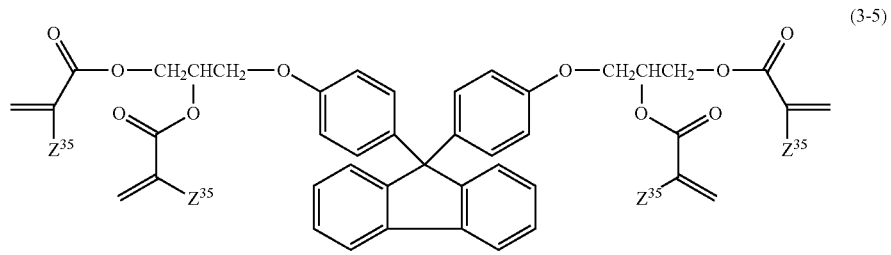

(3-5)

In formula (3-5), $Z^{35}$ is independently hydrogen or methyl, preferably, hydrogen.

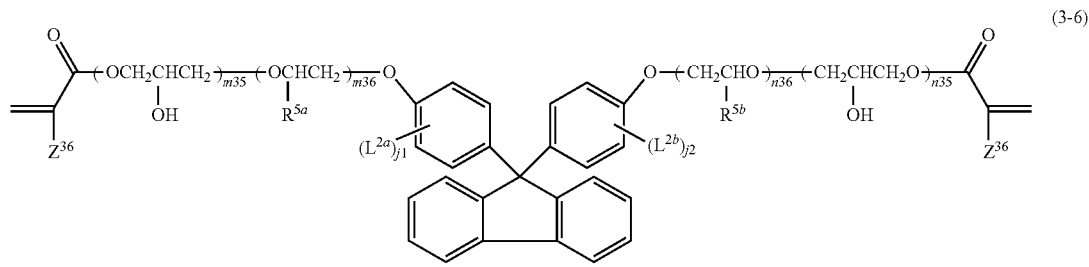

(3-6)

In formula (3-6), $Z^{36}$ is independently hydrogen or methyl, preferably, hydrogen. $R^{5a}$ and $R^{5b}$ are independently hydrogen or alkyl having 1 to 6 carbons, preferably, hydrogen. $L^{2a}$ and $L^{2b}$ are independently alkyl having 1 to 6 carbons, phenyl or fluorine, preferably, methyl, phenyl or fluorine, further preferably, methyl or phenyl. Then, m35 and n35 are independently an integer from 1 to 3, preferably, 1. Then, m36 and n36 are independently an integer from 1 to 3, preferably, 1. Then, j1 and j2 are independently an integer from 0 to 4, preferably, an integer from 0 to 2, further preferably, 0.

The composition of the invention contains component (E) being at least one compound selected from the non-liquid crystalline compounds having the functional group including the hydroxyl group, and having the acryloyl group or the methacryloyl group in one molecule. Preferred examples of component (E) include a non-liquid crystalline compound having 1 to 4 functional groups each including a hydroxyl group, and having an acryloyloxy group or a methacryloyloxy group in one molecule. On the occasion, the preferred number of functional groups each including the hydroxyl group of the compound is 1 to 2. The preferred number of the acryloyloxy groups or methacryloyloxy groups of the compound is 1 to 4 in one molecule, and the further preferred number is 1 in one molecule.

The composition of the invention contains component (D) being at least one compound selected from the group of compounds represented by each of formula (4-1) and formula (4-2) as an arbitrary component.

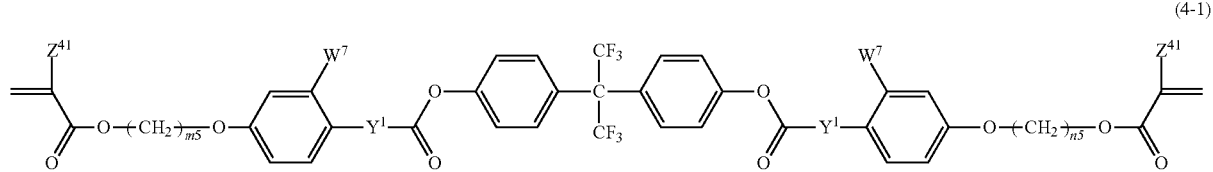

(4-1)

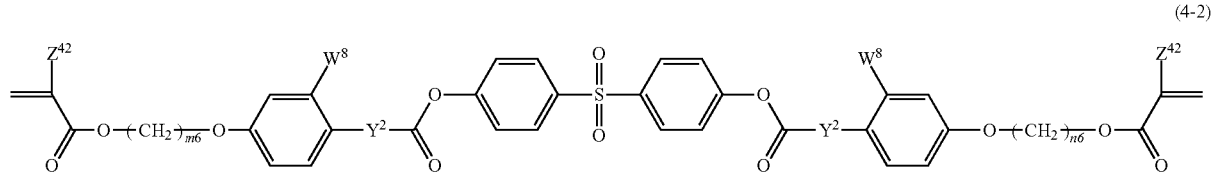

(4-2)

In formula (4-1) and formula (4-2), $Z^{41}$ and $Z^{42}$ are independently hydrogen or methyl. $Y^1$ and $Y^2$ are independently a single bond, —$(CH_2)_2$— or —CH=CH—. $W^7$ and $W^8$ are independently hydrogen or fluorine. Then, m5, m6, n5 and n6 are independently an integer from 2 to 15, preferably, an integer from 2 to 10, further preferably, an integer from 2 to 8, still further preferably, an integer from 4 to 6.

Each preferred embodiment of the component in the composition of the invention is explained as described above. The items 4 to 15 represent examples of combinations of the components according to preferred embodiments.

The composition of the invention has the nematic phase at room temperature, and is homeotropically aligned on the plastic substrate, or support substrate of which surface is coated with a plastic thin film, or on the glass substrate. The composition of the invention strongly tends to be homeotropically aligned on a support substrate having a polar group such as —COOH, —$NH_2$ and —OH on a surface, and requires no special alignment film (alignment film having long-chain alkyl, for example) for causing homeotropic alignment.

The compound used for the composition of the invention will be explained.

Compound (1-1), compound (1-2), and compound (1-3) each have a liquid crystal compound and two polymerizable groups. A polymer of the polymerizable compound can form a three-dimensional structure, and therefore yields a harder polymer in comparison with a compound having one polymerizable group. Compound (1-1), compound (1-2) and compound (1-3) are easily homogeneously aligned, although a degree depends on conditions of a support substrate, an additive or the like. Moreover, compound (1-1), compound (1-2) and compound (1-3) shows the liquid crystal phase in a wide temperature range.

Compound (2-1), compound (2-2) and compound (2-3) each have one polymerizable group. Compound (2-1), compound (2-2) and compound (2-3) have properties for increasing a tilted angle of other liquid crystal compounds, or decreasing a melting point thereof. Compound (3-1) to compound (3-6) are not liquid crystalline. Compound (3-1) to compound (3-6) have a fluorene structure and a phenoxide structure in one molecule. Moreover, compound (3-1) to compound (3-6) are effective in homeotropically aligning a liquid crystal compound. In the explanation below, a term "compound (3)" may be occasionally used as a generic term for compound (3-1) to compound (3-6).

Compound (4-1) and compound (4-2) have a bisphenol skeleton and two polymerizable groups. A polymer of the polymerizable compound can form a three-dimensional structure, and therefore yields a harder polymer in comparison with a compound having one polymerizable group. Compound (4-1) and compound (4-2) may show liquid crystallinity, or needs to show no liquid crystallinity. Compound (4-1) and compounds (4-2) are effective in decreasing a melting point of the polymerizable liquid crystal composition. When compound (4-1) and compound (4-2) are simultaneously used with other polymerizable liquid crystal compositions, compound (4-1) and compound (4-2) are easily homeotropically aligned, although a degree depends on a support substrate, an additive or the like. Compound (E) is a non-liquid crystalline compound having a functional group including a hydroxyl group, and having 1 to 4 acryloyl groups or methacryloyl groups in one molecule. When the polymerizable compound is used, the polymerizable compound can be uniformly coated even when the support substrate has a significantly weak solvent resistance, and uniform homeotropic alignment can also be simultaneously obtained. Moreover, improvement in adhesion with the support substrate can be expected due to an effect of the functional group including the hydroxyl group.

The composition of the invention may contain any other polymerizable compound different from compound (1-1), compound (1-2), compound (1-3), compound (2-1) to compound (2-3), compound (3-1) to compound (3-6), compound (E), and compound (4-1) to compound (4-2). The composition may further contain an additive such as a surfactant in order to form a thin paint film, but the surfactant is not always required for the purpose of controlling types of alignment. The composition may contain an additive such as a polymerization initiator and a photosensitizer suitable for a polymerization reaction. The composition may contain an additive such as an ultraviolet light absorber, an antioxidant, a radical scavenger and a light stabilizer in order to improve characteristics of the polymer. The composition may contain an organic solvent that can sufficiently dissolve the polymerizable liquid crystal composition without damaging the support substrate. The organic solvent is useful for forming a paint film having a uniform thickness. Moreover, the composition may contain a dichroic dye for providing the polymer (liquid crystal film) with polarizing characteristics.

A ratio of each component in the composition of the invention will be explained.

A preferred ratio of component (A) is in the range of approximately 25 to approximately 97% by weight based on the total weight of component (A), component (B) and component (D). A further preferred ratio is in the range of approximately 35 to approximately 97% by weight. A still further preferred ratio is in the range of approximately 35 to approximately 95% by weight. A particularly preferred range is in the range of approximately 40 to approximately 90% by weight. A significantly preferred range is in the range of approximately 45 to approximately 90% by weight.

A preferred ratio of component (B) is in the range of approximately 3 to approximately 75% by weight based on the total weight of component (A), component (B) and component (D). A further preferred ratio is in the range of approximately 3 to approximately 65% by weight. A still further preferred ratio is in the range of approximately 5 to approximately 65% by weight. A particularly preferred range is in the range of approximately 10 to approximately 60% by weight. A most preferred range is in the range of approximately 10 to approximately 55% by weight.

A preferred ratio of component (D) is in the range of approximately 0 to approximately 25% by weight based on the total weight of component (A), component (B) and component (D). A further preferred ratio is in the range of approximately 0 to approximately 20% by weight. A still further preferred ratio is in the range of approximately 0 to approximately 15% by weight.

A preferred ratio of component (C) is in the range of approximately 0 to approximately 0.01 to approximately 0.20 in a weight ratio based on the total weight of component (A), component (B) and component (D). A further preferred weight ratio is in the range of approximately 0.03 to approximately 0.15.

A preferred ratio of component (E) is in the range of approximately 0.01 to approximately 6.00 in a weight ratio based on the total weight of component (A), component (B) and component (D). A further preferred weight ratio is in the range of approximately 0.01 to approximately 4.00. A still further preferred weight ratio is in the range of approximately 0.03 to approximately 3.00. A particularly preferred weight ratio is in the range of approximately 0.03 to approximately 2.50.

A preferred amount of addition of any other polymerizable compound is in the range of approximately 0 to approximately 0.20 in a weight ratio based on the total weight of component (A), component (B) and component (D). A further preferred weight ratio is in the range of approximately 0 to approximately 0.10. When the additive such as the surfactant and the polymerization initiator is used, an amount of use of the additive may be a minimum for achieving the purpose.

The combination of each component in the composition of the invention will be explained.

A preferred combination includes a combination of component (A), component (B), component (C) and component (E). When adjusting a melting point, a combination of component (A), component (B), component (C), component (E) and component (D) is preferred. Any other polymerizable compound may be further combined for each combination.

Next, a process for synthesizing the compound will be explained. The compound to be used for the invention can be prepared by suitably combining synthesis methods in organic chemistry as described in Houben Wyle, Methoden der Organischen Chemie, Georg Thieme Verlag, Stuttgart, Organic Reactions (John Wily & Sons, Inc.), Organic Syntheses (John Wily & Sons, Inc.), Comprehensive Organic Synthesis (Pergamon Press) and New Experimental Chemistry Course (Shin Jikken Kagaku Koza in Japanese) (Maruzen Co. Ltd.).

A method for synthesizing compound (1-1) is described in JP 2003-238491 A. A method for synthesizing compound (1-2) is described in Makromol. Chem., 190, 3201-3215 (1998), WO 97/00600 A or the like. As for a method for synthesizing compound (1-3), a method according to U.S. Pat. No. 5,770,107 B can be applied as a reference. Although α-fluoroacrylic acid or α-fluoroacrylic acid chloride can also be used as a method for introducing α-fluoroacryloyloxy ($CH_2$=CF—COO—), a method for acting α-fluoroacrylic acid fluoride ($CH_2$=CFCOOF) is useful. A process for synthesizing α-fluoroacrylic acid fluoride is described in J. Org. Chem., 1989, 54, 5640, JP S60-158137 A, JP S61-85345 A, or the like, and can be prepared according to the methods. When the compounds are used as a starting material, compound (1-1) and compound (1-2) can be prepared. Methods for synthesizing compound (2-1) and compound (2-2) can be applied, as described in Macromolecules, 26, 6132-6134 (1993), Makromol. Chem. 183, 2311-2321 (1982) and WO 97/34862A, by combining the methods described in WO 97/34862 A and JP 2006-307150 A.

Methods for synthesizing compound (3) are described in literatures as described below.

Compound (3-1): WO 2005/33061 A.
Compound (3-2) to compound (3-4): JP 2005-338550 A.
Compound (3-4): JP 2002-293762 A.
Compound (3-5): JP 2005-272485 A.
Precursor of compound (3-6) (epoxy-acrylate precursor): JP 2002-348357 A.

Methods for synthesizing compound (4-1) and compound (4-2) are described in JP 2007-16213 A.

Next, examples of component compounds will be shown. Preferred examples of compound (1-1) are shown below.

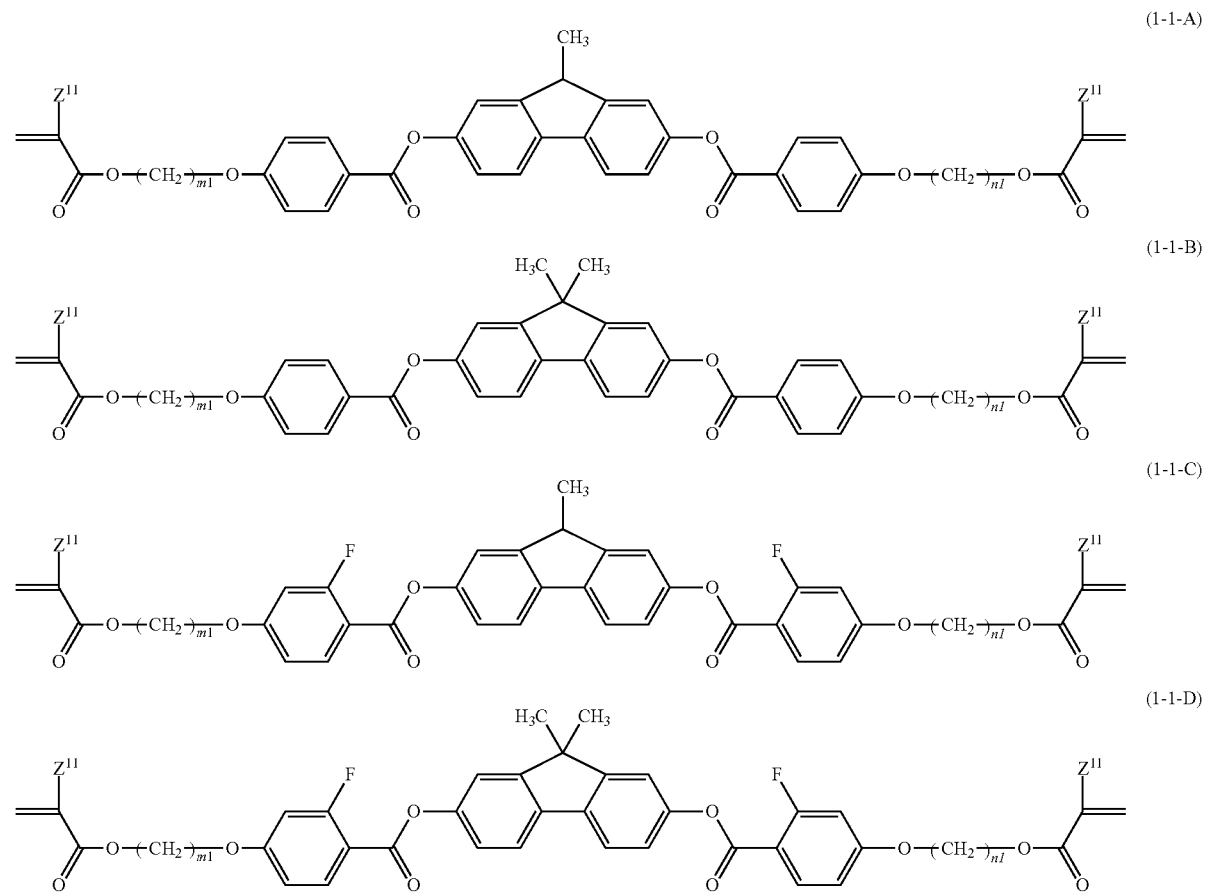

In formulas (1-1-A) to (1-1-D), $Z^{11}$ is independently hydrogen, fluorine, methyl or trifluoromethyl, and m1 and n1 are an integer from 2 to 15.
Preferred examples of compound (1-2) are shown below.
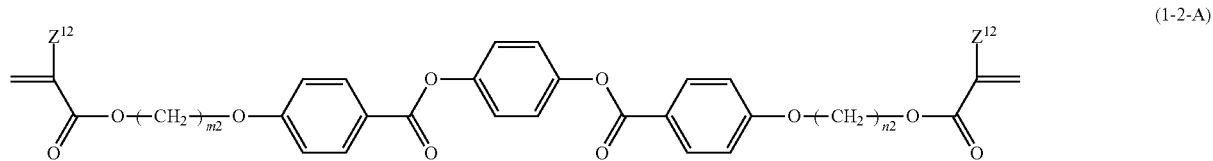
(1-2-A)
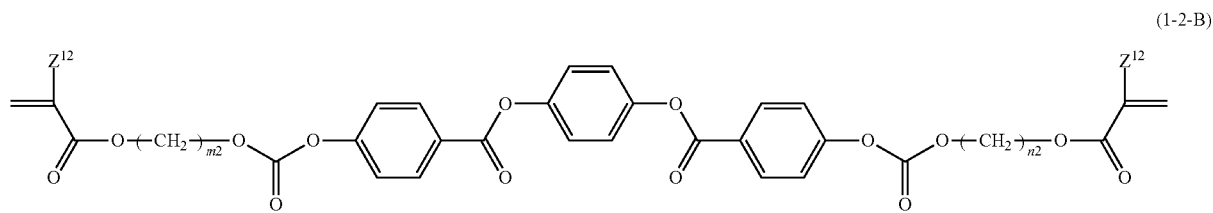
(1-2-B)
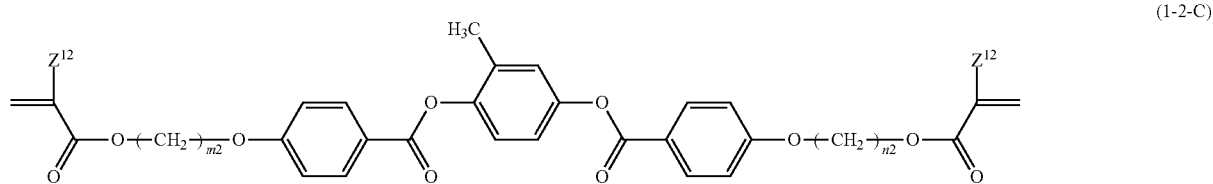
(1-2-C)
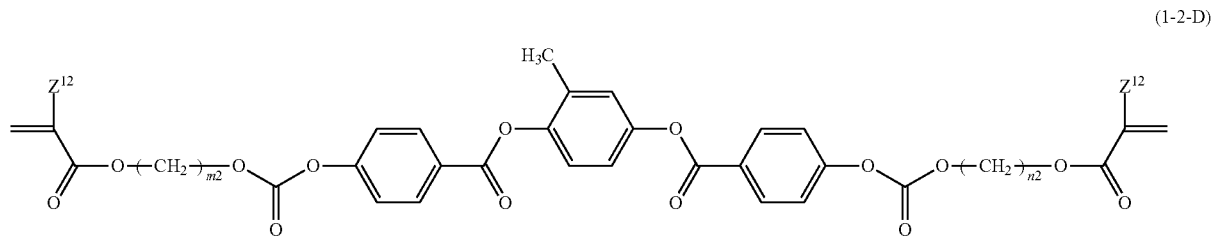
(1-2-D)
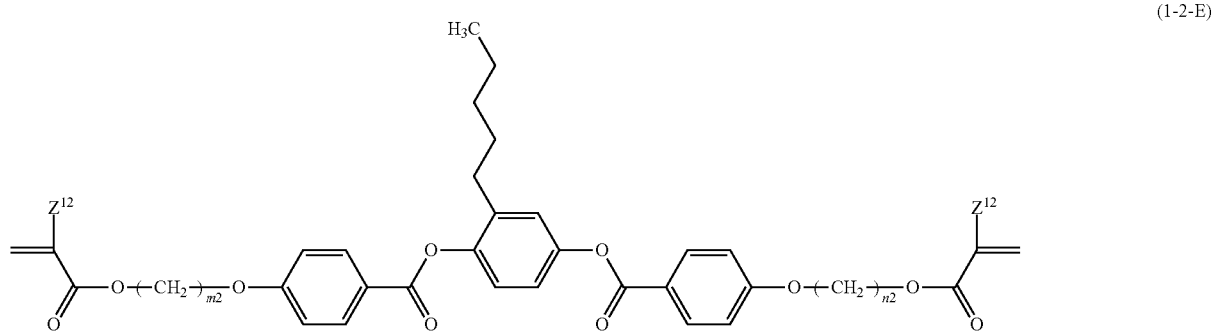
(1-2-E)
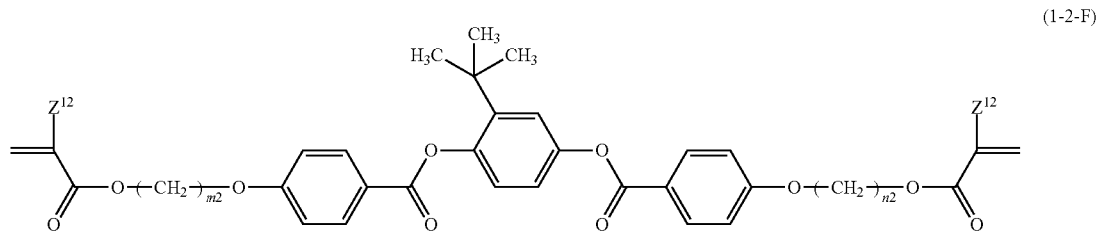
(1-2-F)

-continued
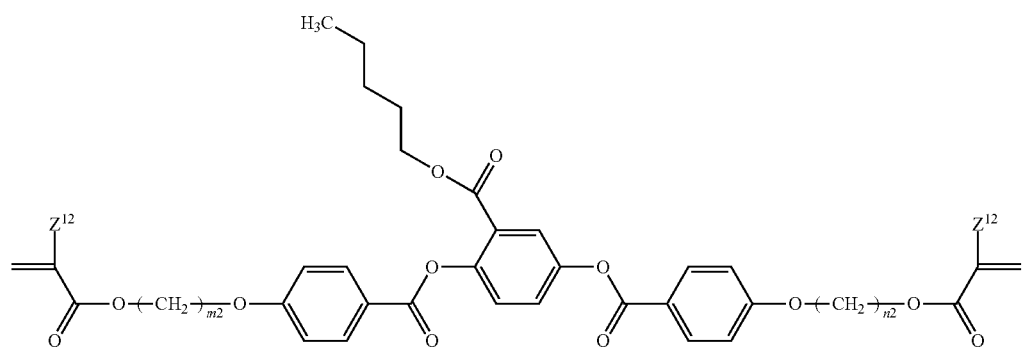
(1-2-G)
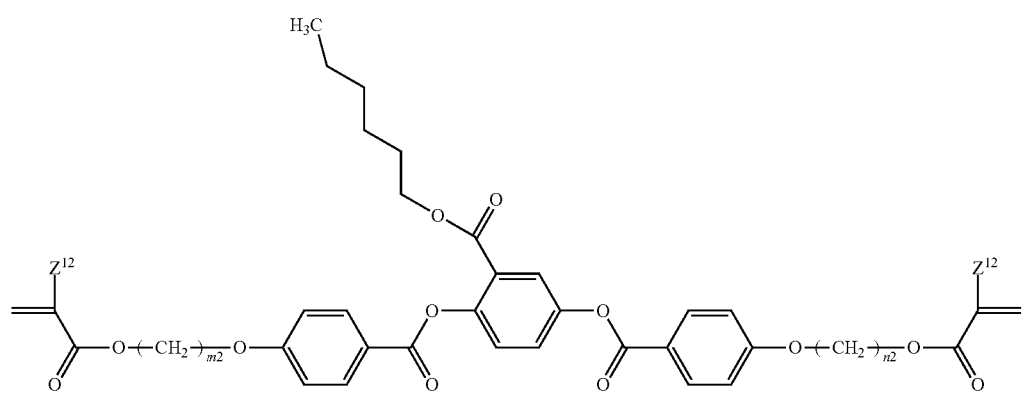
(1-2-H)
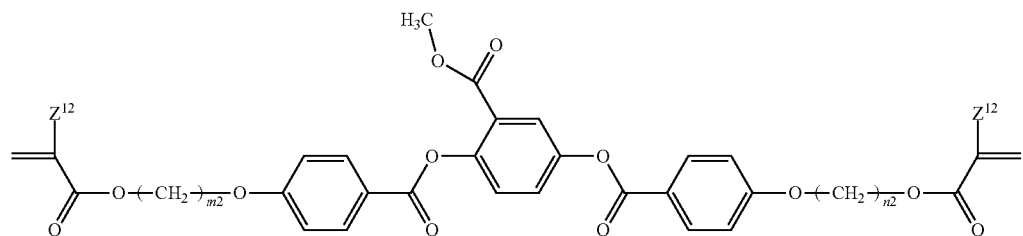
(1-2-I)
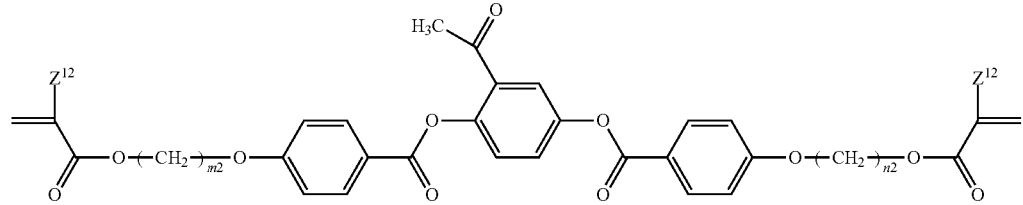
(1-2-J)
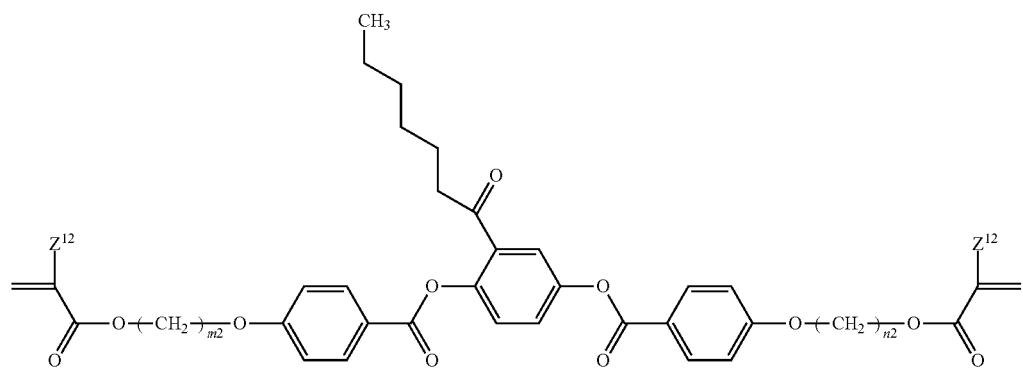
(1-2-K)

(1-2-L)

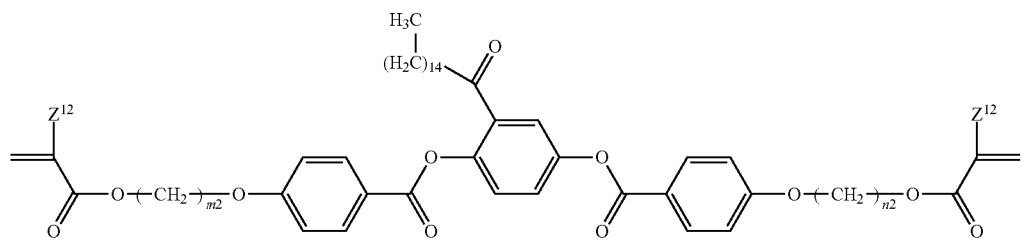

In formulas (1-2-A) to (1-2-L), $Z^{12}$ is independently hydrogen, fluorine, methyl or trifluoromethyl, and m2 and n2 are an integer from 2 to 15.

Preferred examples of compound (1-3) are shown below.

(1-3-A)

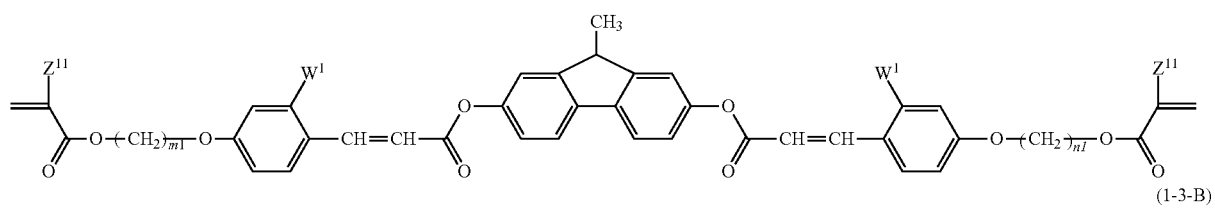

(1-3-B)

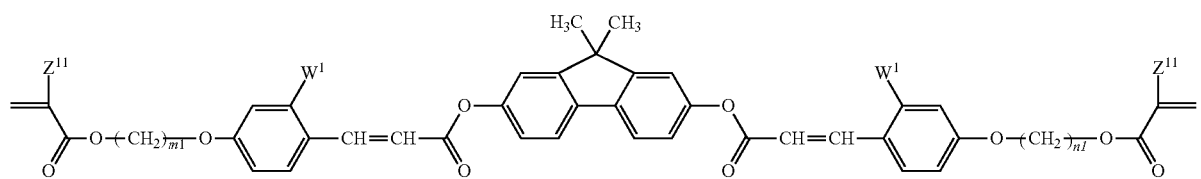

In formulas (1-3-A) to (1-3-B), $Z^{11}$ is independently hydrogen, fluorine, methyl or trifluoromethyl, $W^1$ is independently hydrogen or fluorine, and m1 and n1 are an integer from 2 to 15.

Preferred examples of compound (2-1) are shown below.

(2-1-A)

(2-1-B)

(2-1-C)

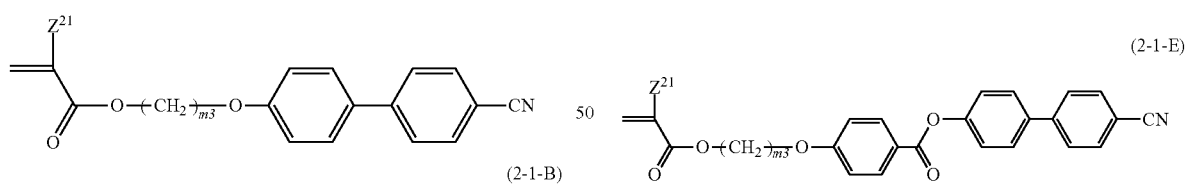

(2-1-D)

(2-1-E)

(2-1-F)

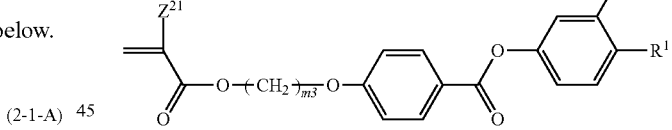

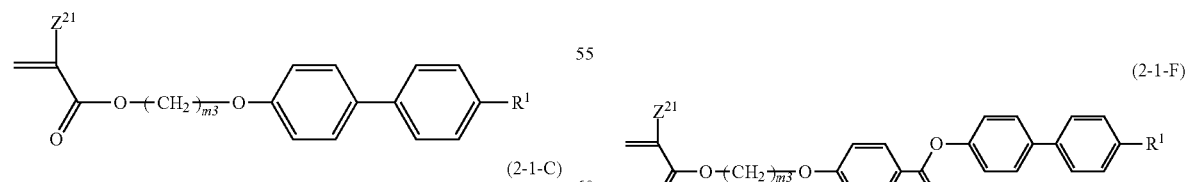

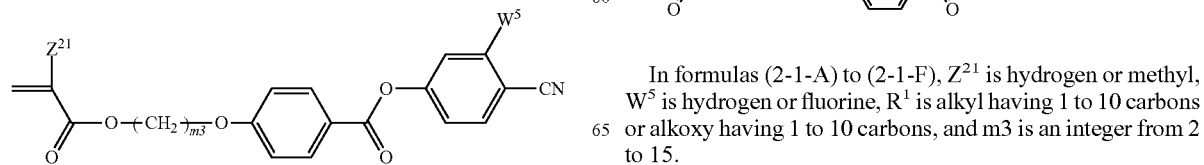

In formulas (2-1-A) to (2-1-F), $Z^{21}$ is hydrogen or methyl, $W^5$ is hydrogen or fluorine, $R^1$ is alkyl having 1 to 10 carbons or alkoxy having 1 to 10 carbons, and m3 is an integer from 2 to 15.

Preferred examples of compound (2-2) are shown below.

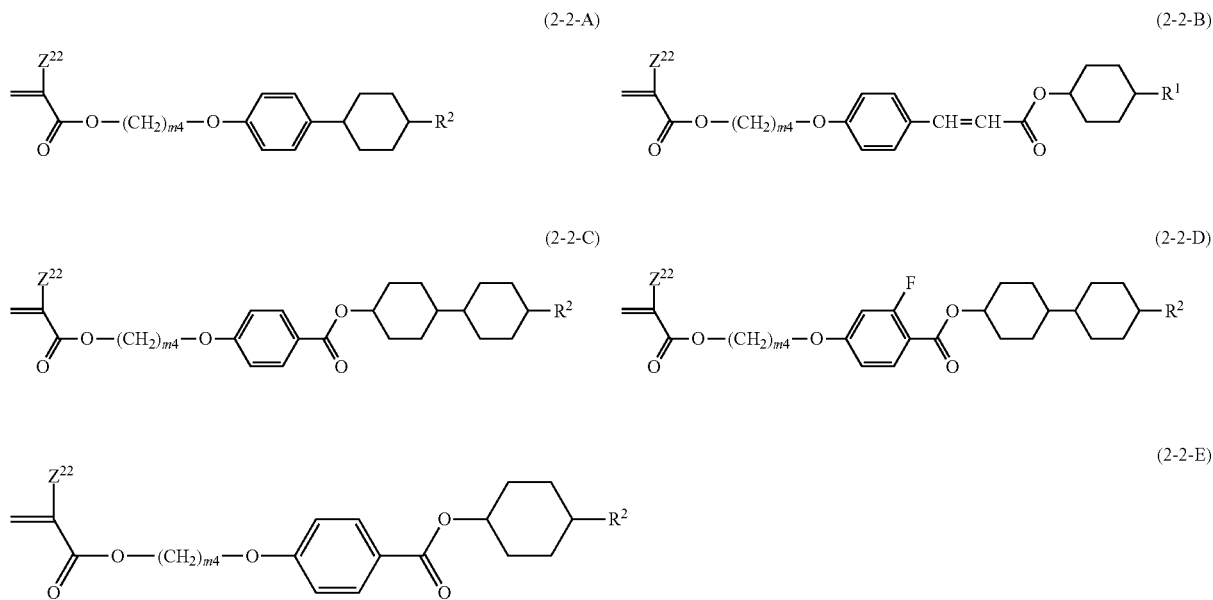

In formulas (2-2-A) to (2-2-F), $Z^{22}$ is hydrogen or methyl, $R^1$ is cyano, trifluoromethoxy, alkyl having 1 to 10 carbons or alkoxy having 1 to 10 carbons, $R^2$ is alkyl having 1 to 10 carbons, and m4 is an integer from 2 to 15.

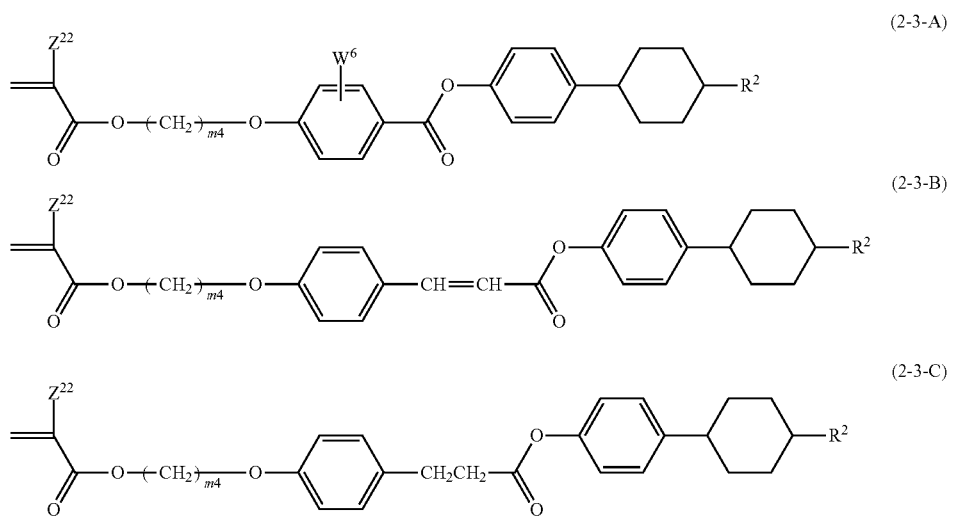

In formulas (2-3-A) to (2-3-C), $Z^{22}$ is hydrogen or methyl, $R^2$ is alkyl having 1 to 10 carbons, $W^6$ is hydrogen, fluorine or methoxy, and m4 is an integer from 2 to 15.

Preferred examples of compound (3-1) to compound (3-6) are shown below:

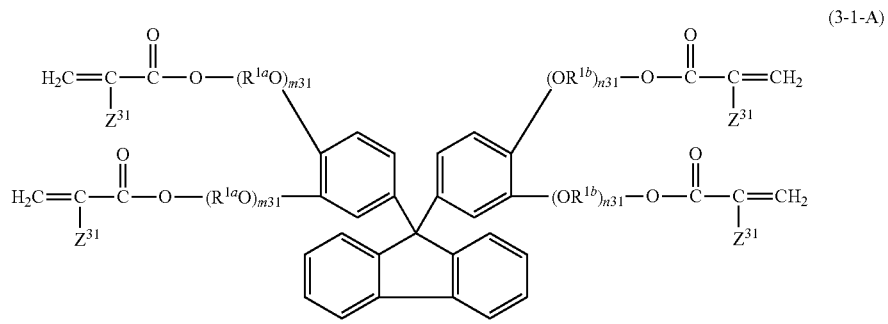
(3-1-A)

wherein, $Z^{31}$ is independently hydrogen or methyl, $R^{1a}$ and $R^{1b}$ are independently alkylene having 2 to 4 carbons, and m31 and n31 are independently an integer from 0 to 6.

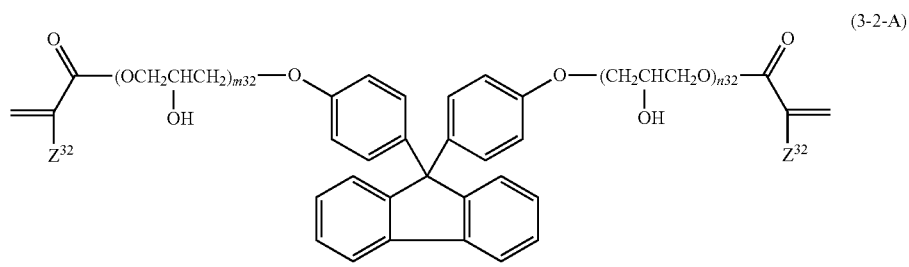
(3-2-A)

wherein, $Z^{32}$ is independently hydrogen or methyl, and m32 and n32 are independently an integer from 1 to 3.

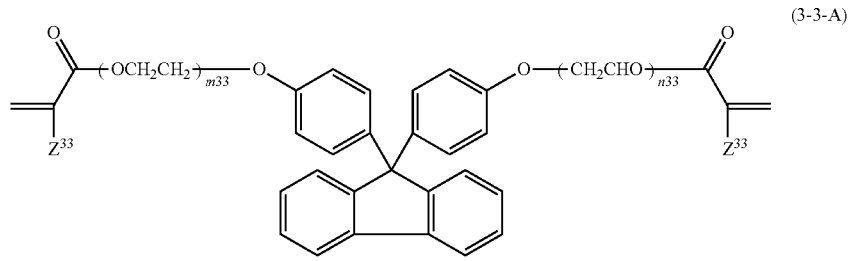
(3-3-A)

wherein, $Z^{33}$ is independently hydrogen or methyl here, and m33 and n33 are independently integers from 0 to 3.

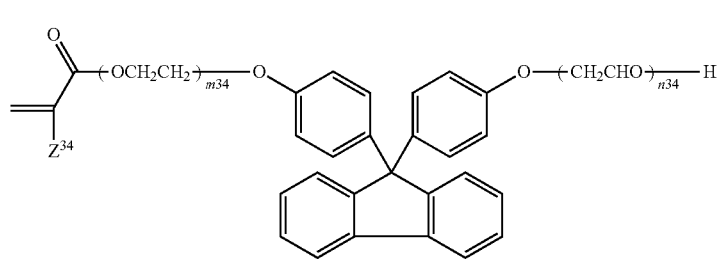
(3-4-A)

wherein, $Z^{34}$ is hydrogen or methyl here, and m34 and n34 are independently an integer from 0 to 10.

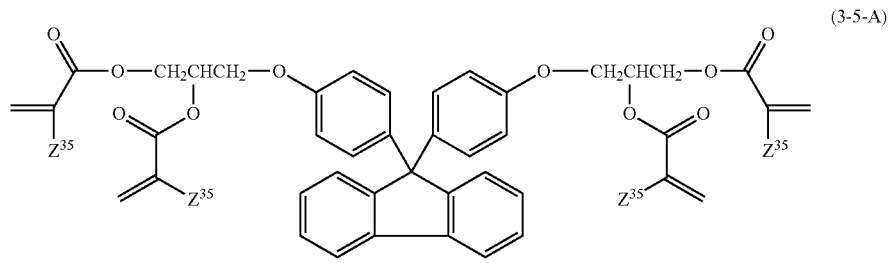
(3-5-A)
wherein, $Z^{35}$ is independently hydrogen or methyl.
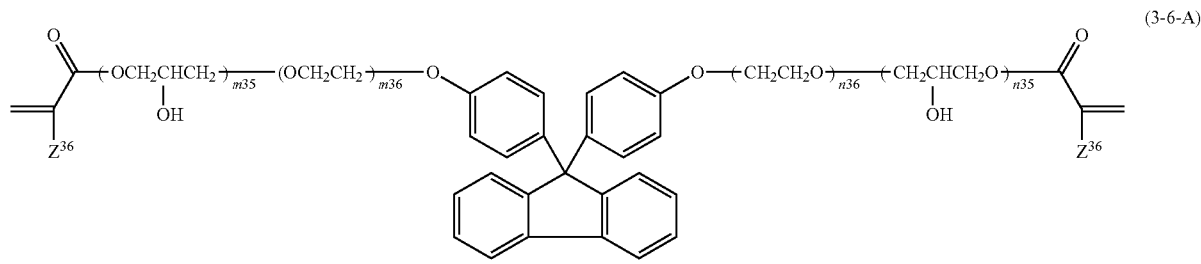
(3-6-A)
wherein, $Z^{36}$ is independently hydrogen or methyl, m35 and n35 are independently an integer from 1 to 3, and m36 and n36 are independently an integer from 1 to 3.
Preferred examples of compound (4-1) and compound (4-2) are shown below.
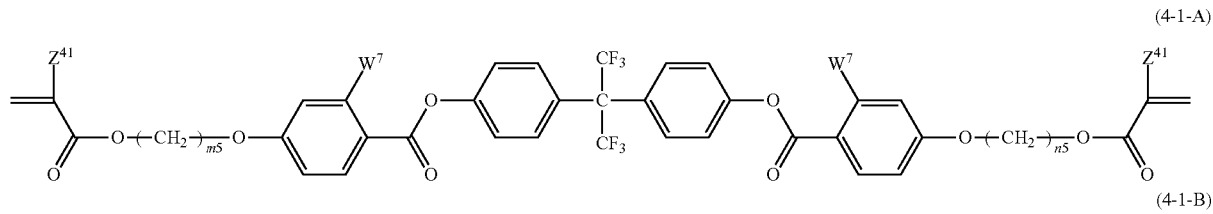
(4-1-A)
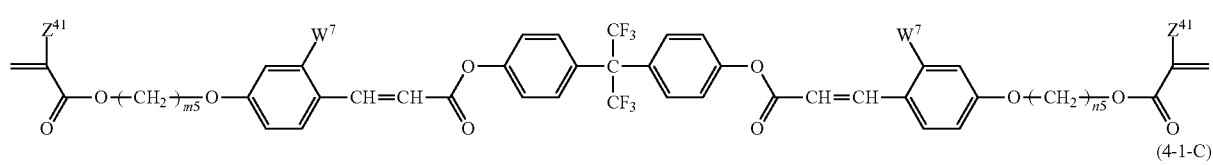
(4-1-B)
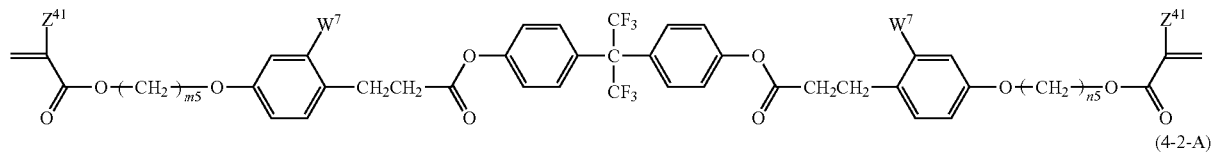
(4-1-C)
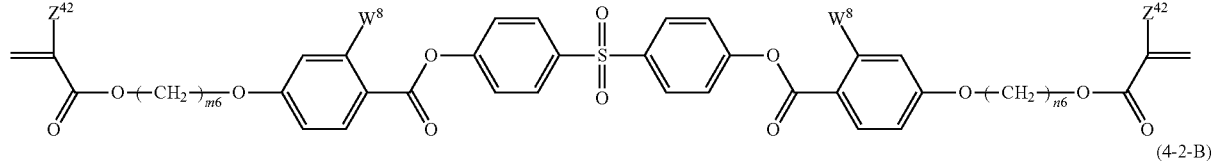
(4-2-A)
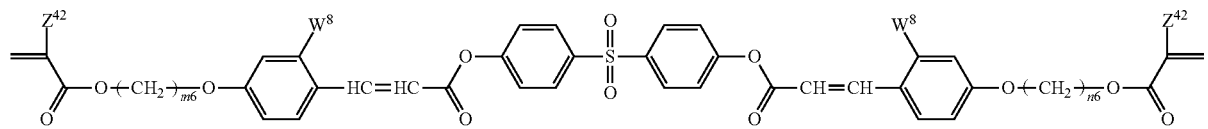
(4-2-B)

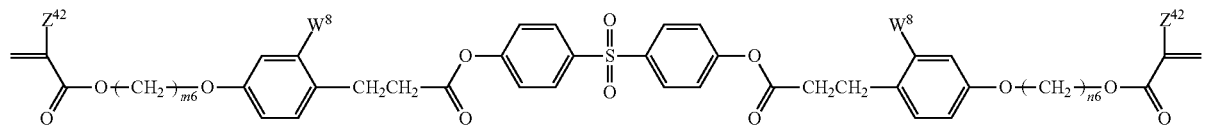

(4-2-C)

In formulas (4-1-A) to formula (4-1-C), $Z^{41}$ is independently hydrogen or methyl, $W^7$ is independently hydrogen or fluorine, and m5 and n5 are independently an integer from 2 to 15. In formulas (4-2-A) to formula (4-2-C), $Z^{42}$ is independently hydrogen or methyl, $W^8$ is independently hydrogen or fluorine, and m6 and n6 are independently an integer from 2 to 15.

Specific examples of compound (1-1) to compound (1-3), compound (2-1) to compound (2-3), compound (3-1) to compound (3-6), compound (4-1), compound (4-2), and compound (E) are shown below.

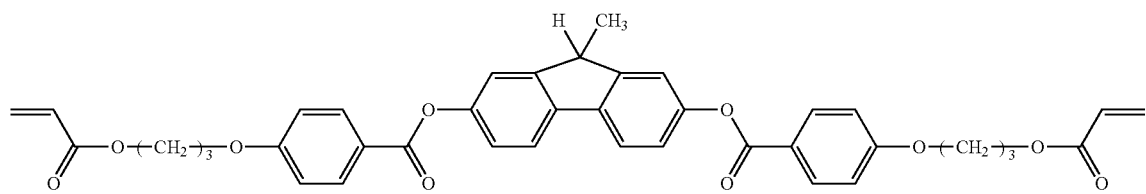

(1-1-1)

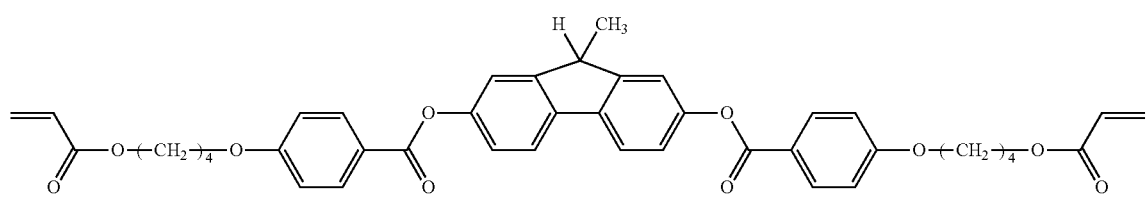

(1-1-2)

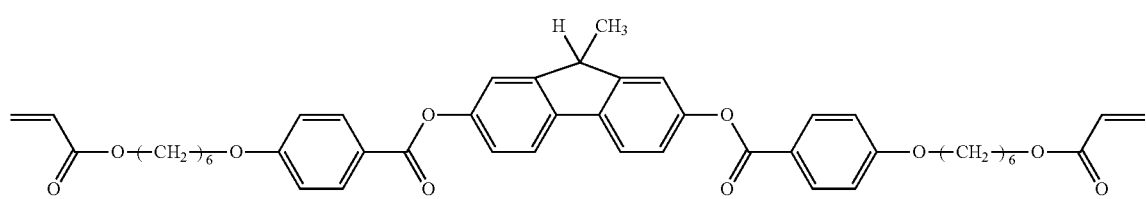

(1-1-3)

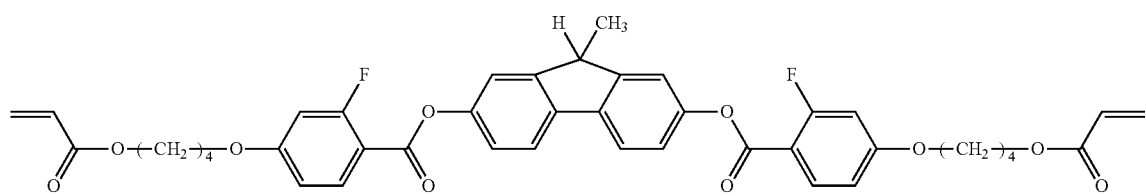

(1-1-4)

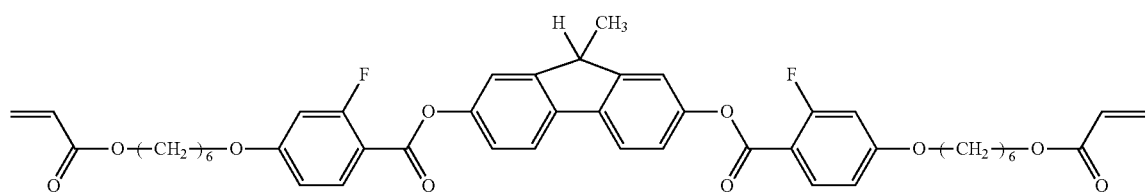

(1-1-5)

-continued
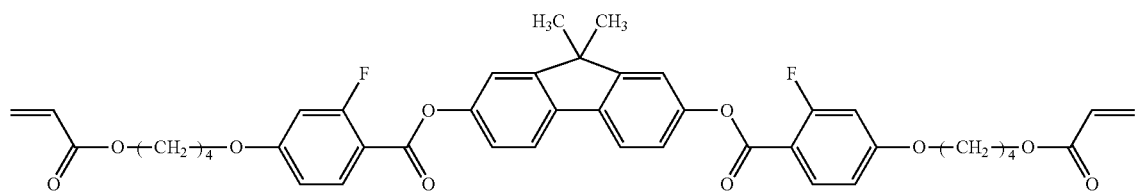
(1-1-6)
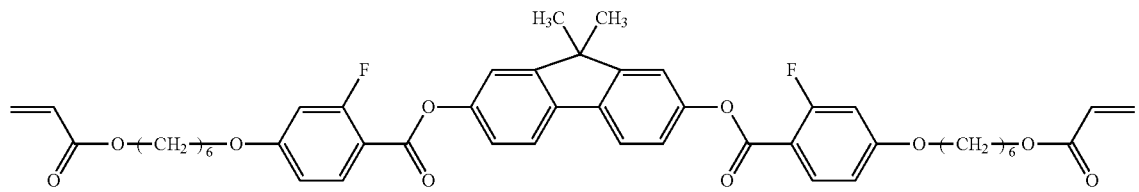
(1-1-7)
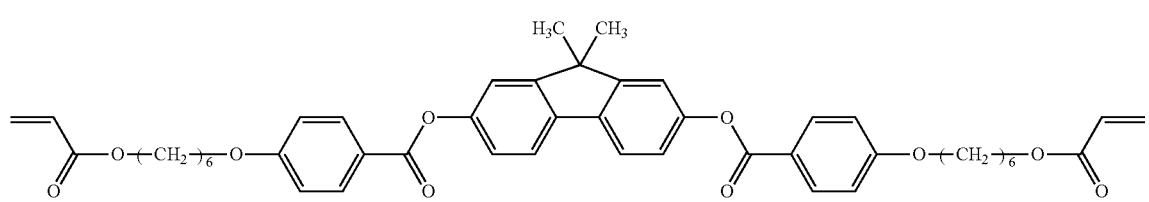
(1-1-8)
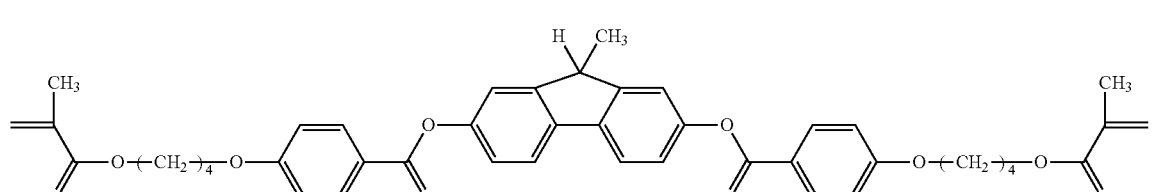
(1-1-9)
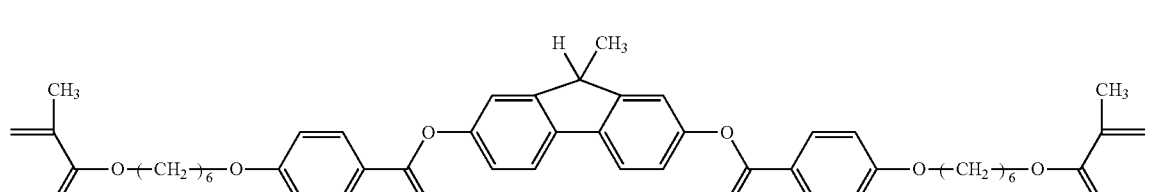
(1-1-10)
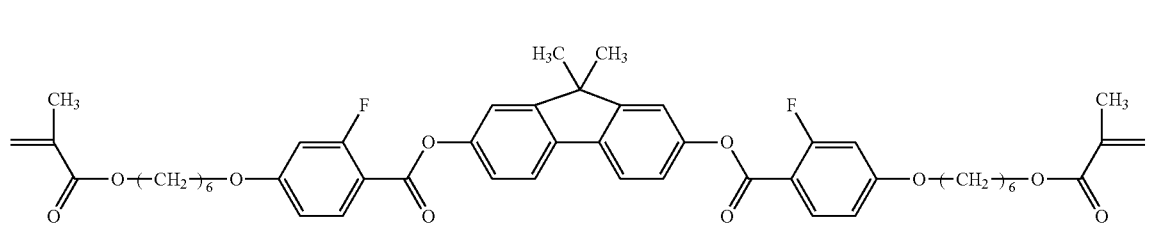
(1-1-11)
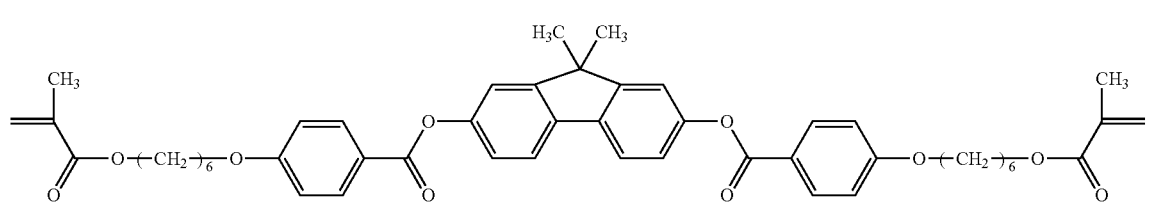
(1-1-12)
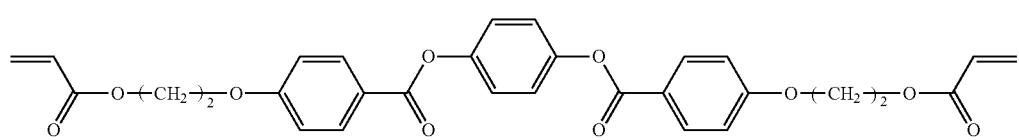
(1-2-1)

-continued
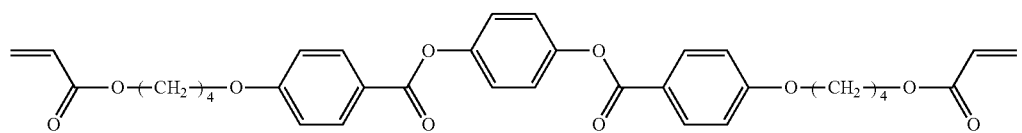
(1-2-2)
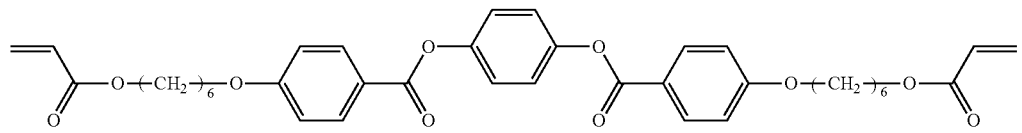
(1-2-3)
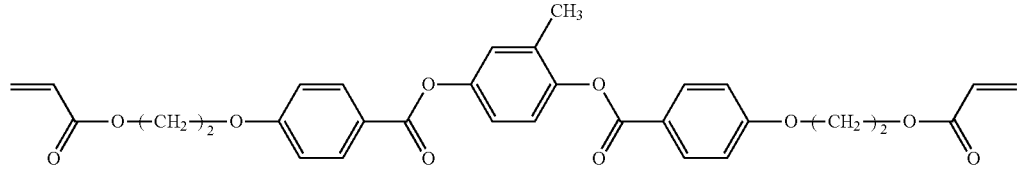
(1-2-4)
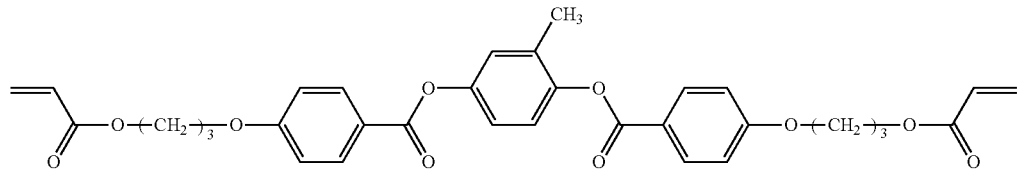
(1-2-5)
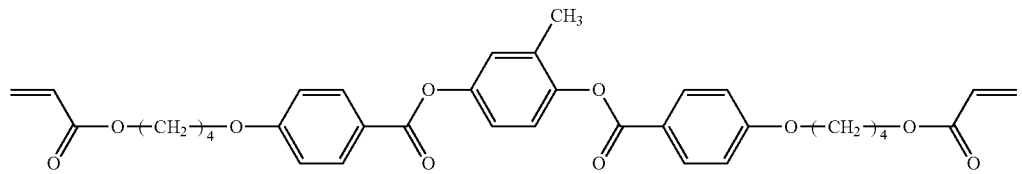
(1-2-6)
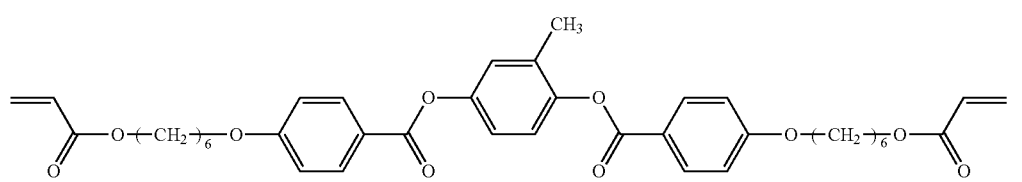
(1-2-7)
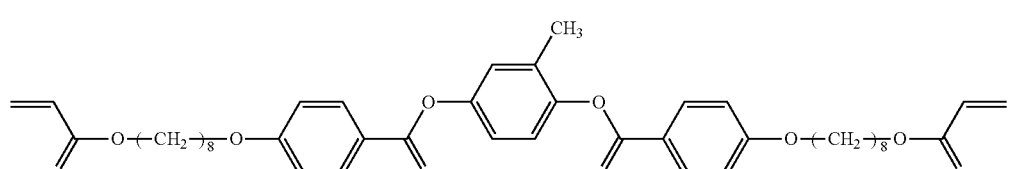
(1-2-8)
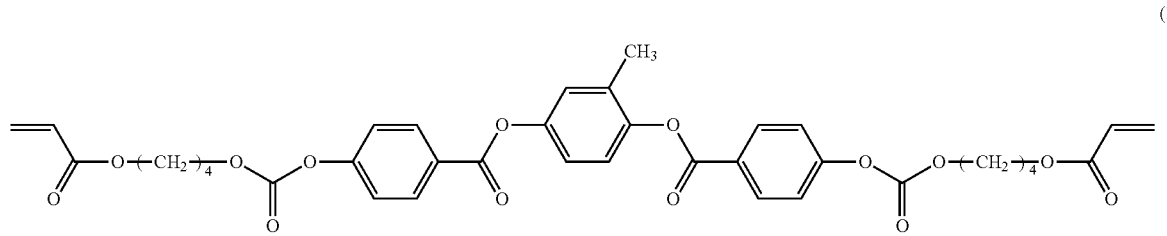
(1-2-9)
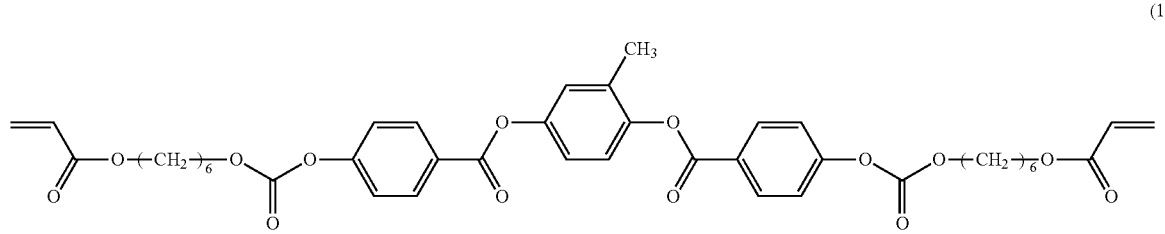
(1-2-10)

-continued
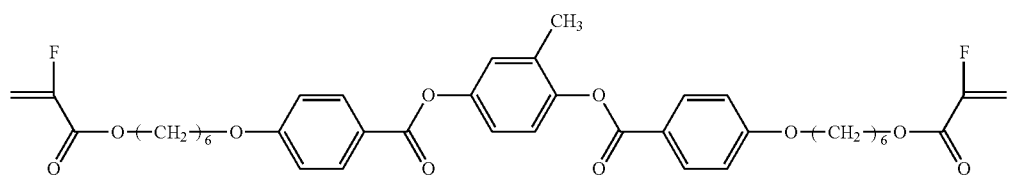
(1-2-11)
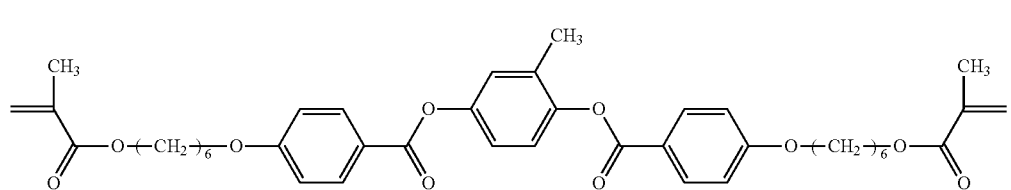
(1-2-12)
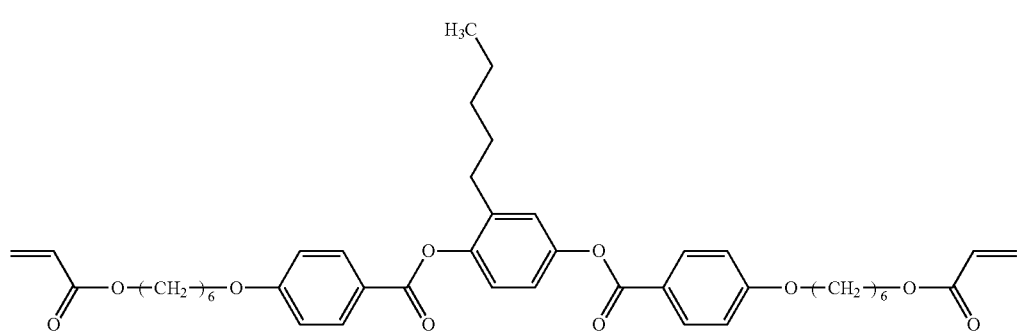
(1-2-13)
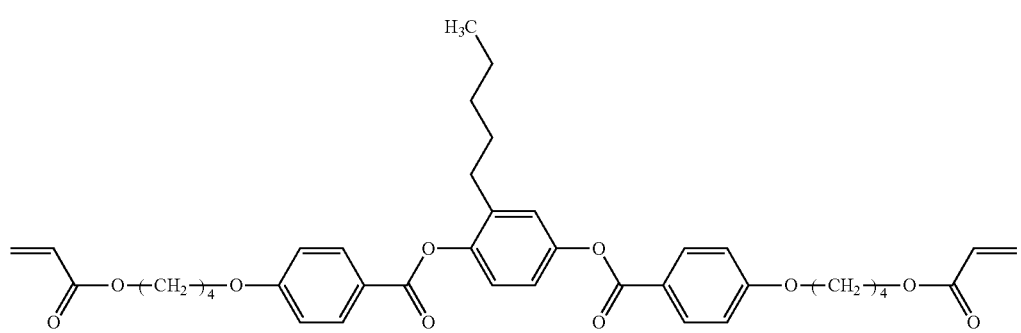
(1-2-14)
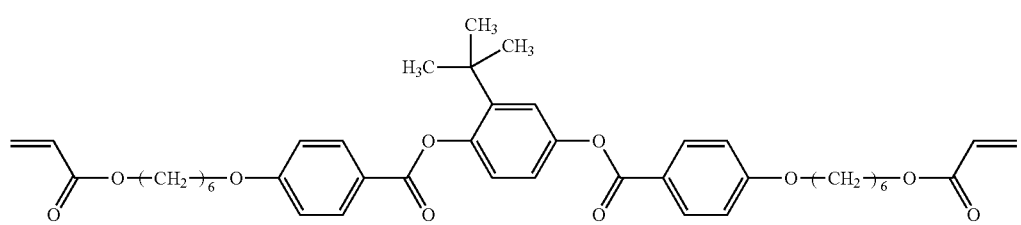
(1-2-15)
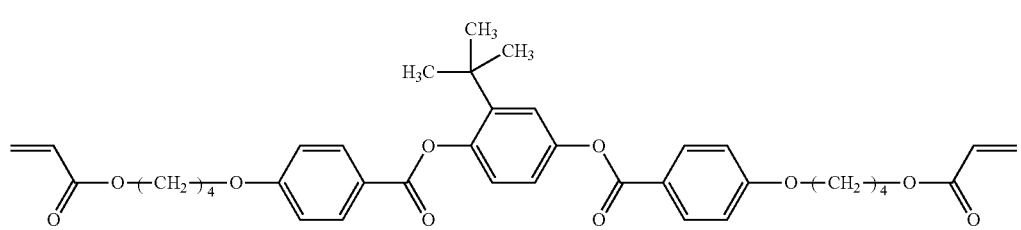
(1-2-16)

-continued
(1-2-17)
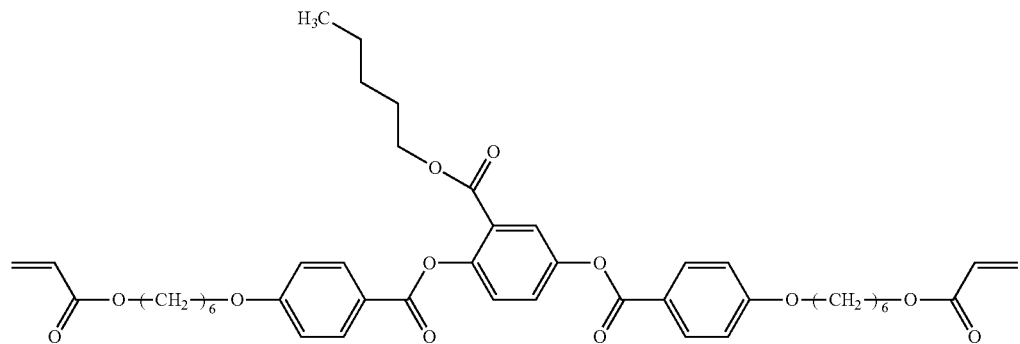
(1-2-18)
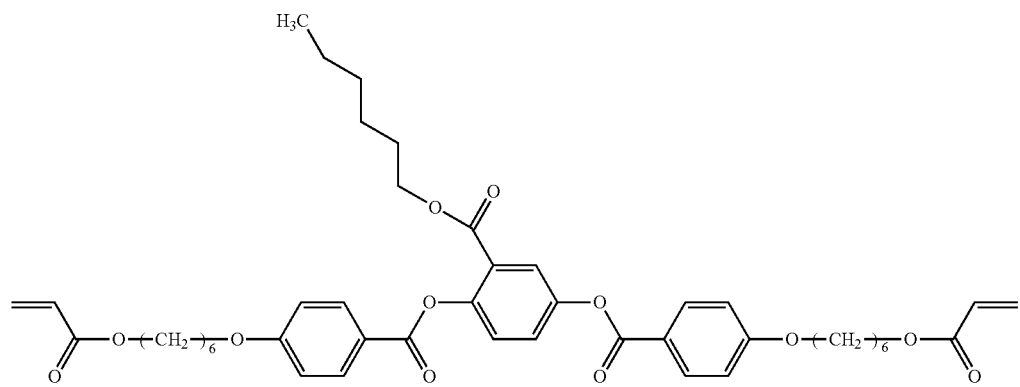
(1-2-19)
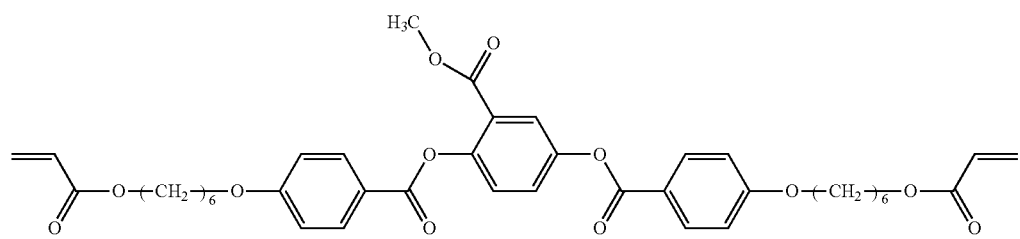
(1-3-A-1)
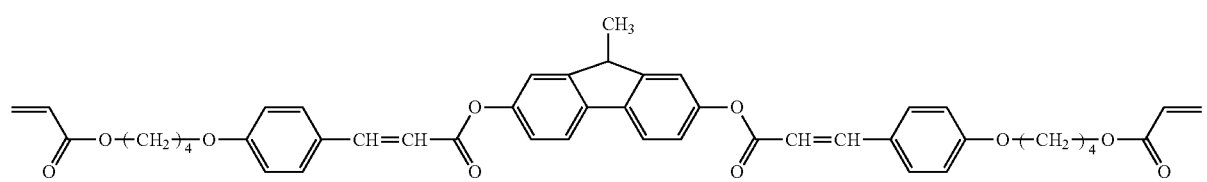
(1-3-A-2)
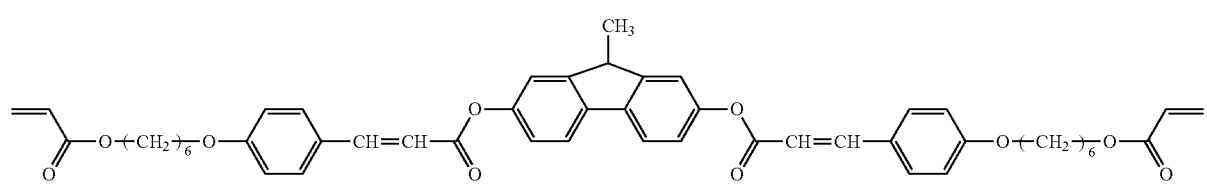
(1-3-A-3)
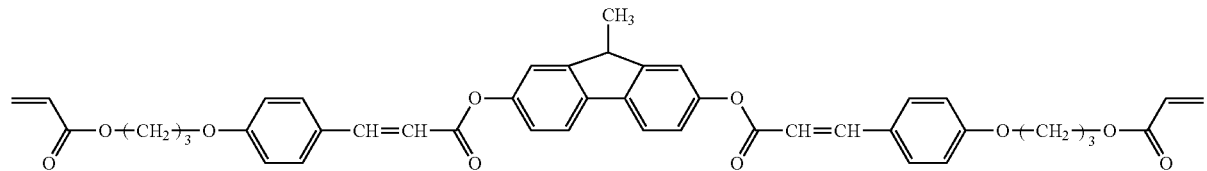

-continued
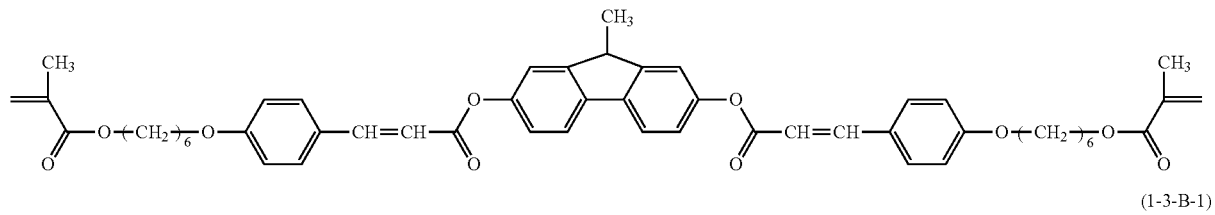
(1-3-A-4)
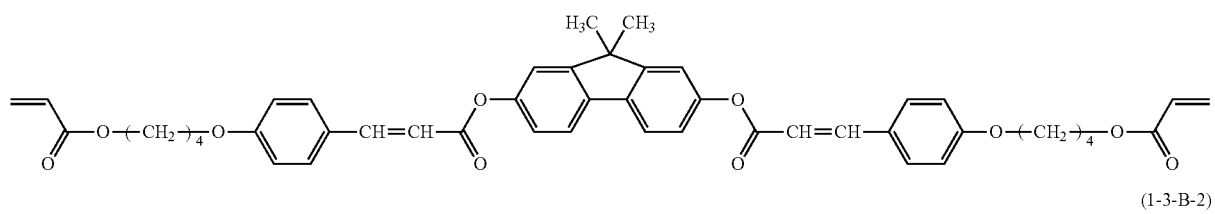
(1-3-B-1)
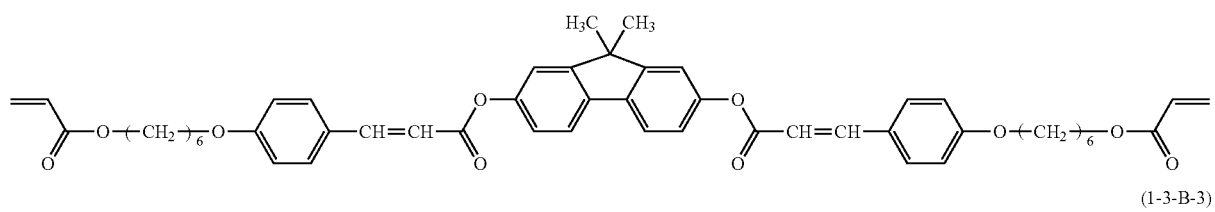
(1-3-B-2)
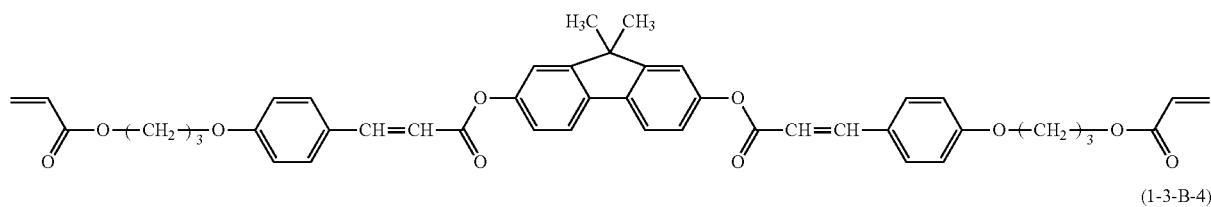
(1-3-B-3)
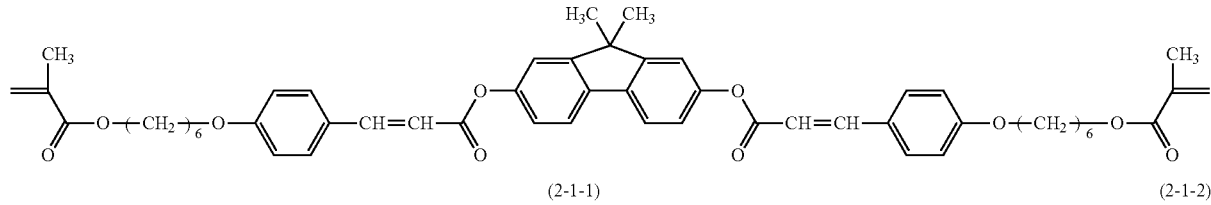
(1-3-B-4)
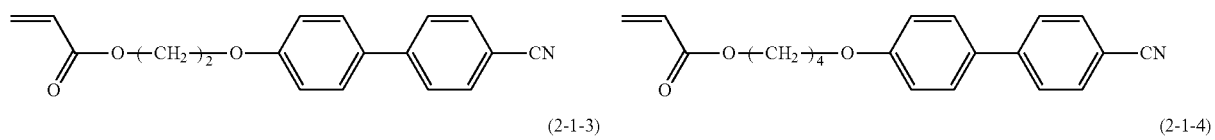
(2-1-1) (2-1-2)
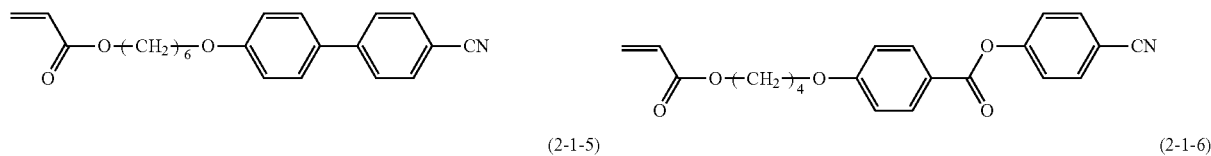
(2-1-3) (2-1-4)
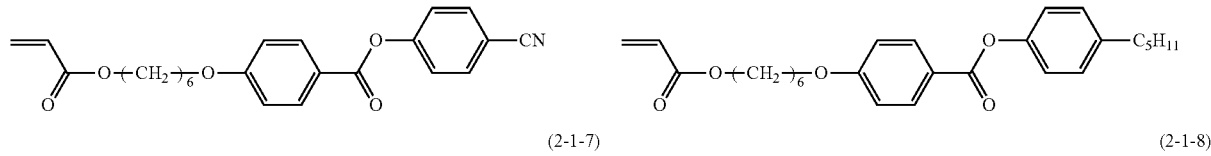
(2-1-5) (2-1-6)
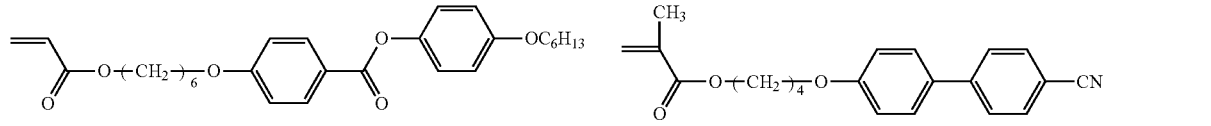
(2-1-7) (2-1-8)

(2-1-9)
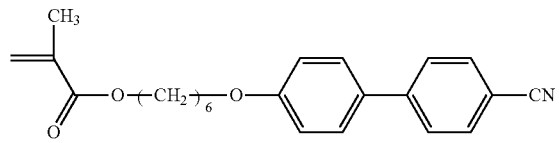
(2-1-10)
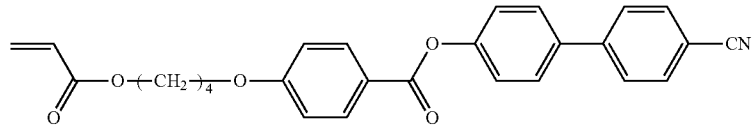
(2-1-11)
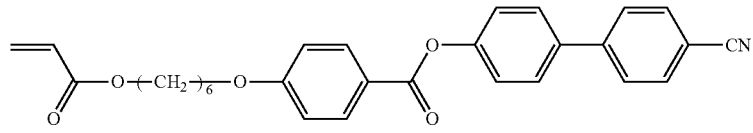
(2-1-12)
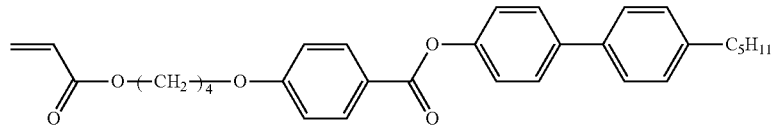
(2-1-13)
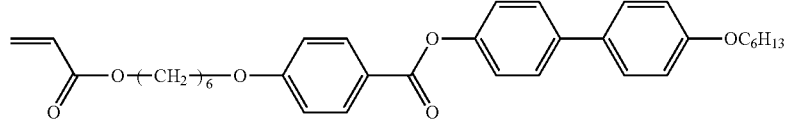
(2-1-14)
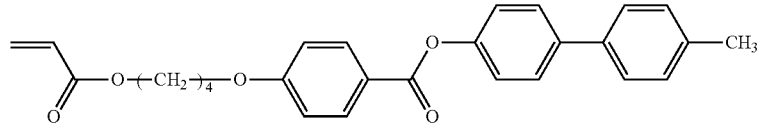
(2-1-15)
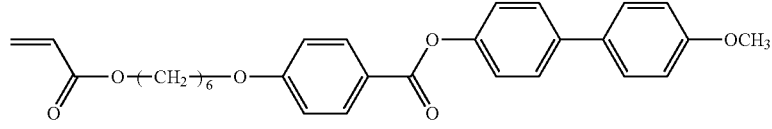
(2-2-1)
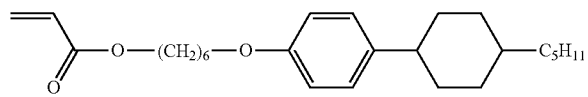
(2-2-2)
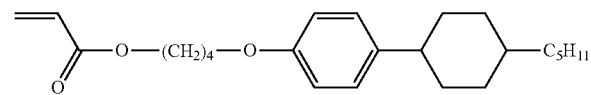
(2-2-3)
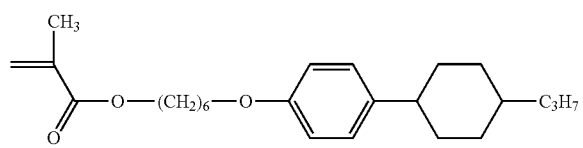
(2-2-4)
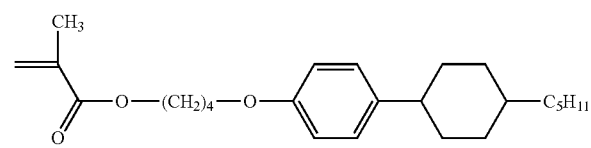
(2-2-5)
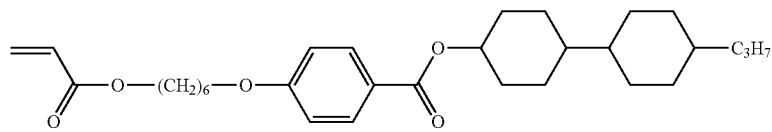
(2-2-6)
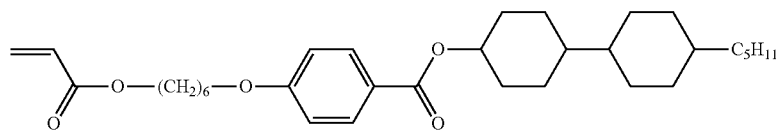

-continued
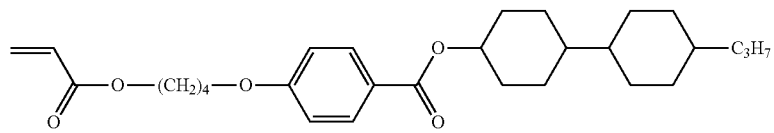 (2-2-7)
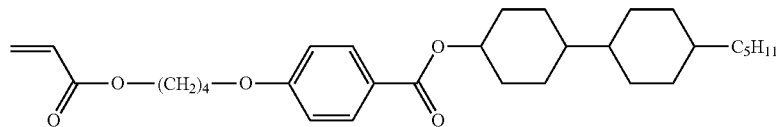 (2-2-8)
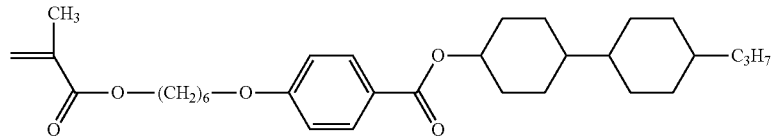 (2-2-9)
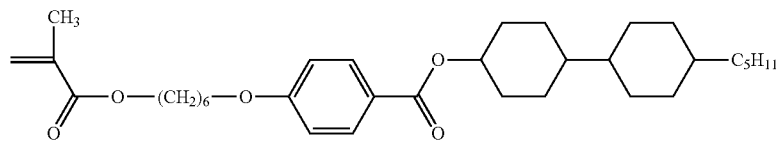 (2-2-10)
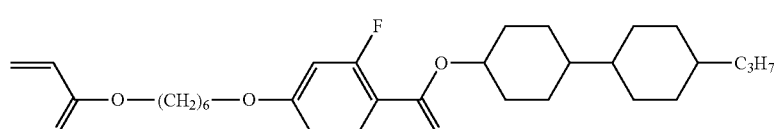 (2-2-11)
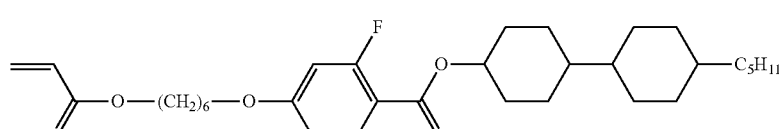 (2-2-12)
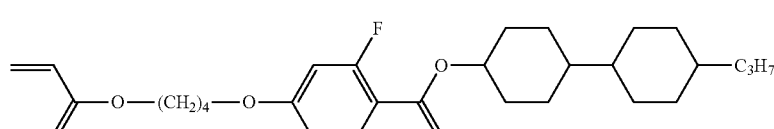 (2-2-13)
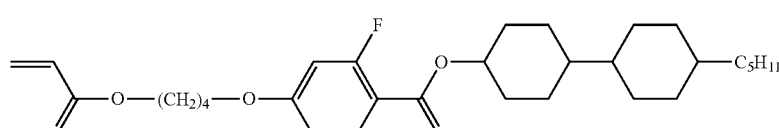 (2-2-14)
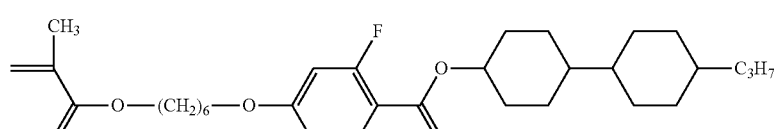 (2-2-15)
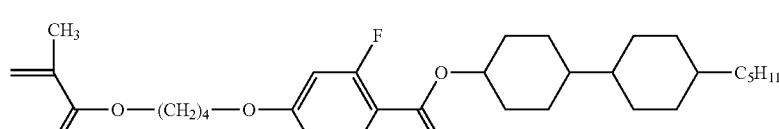 (2-2-16)
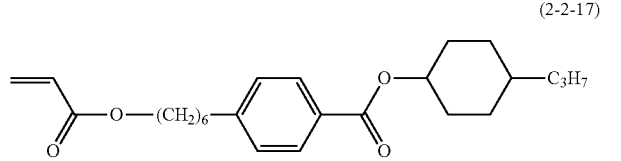 (2-2-17)
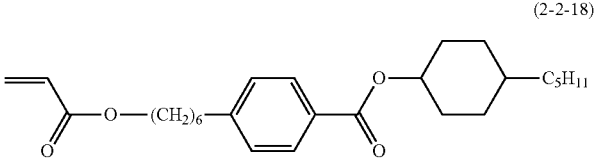 (2-2-18)

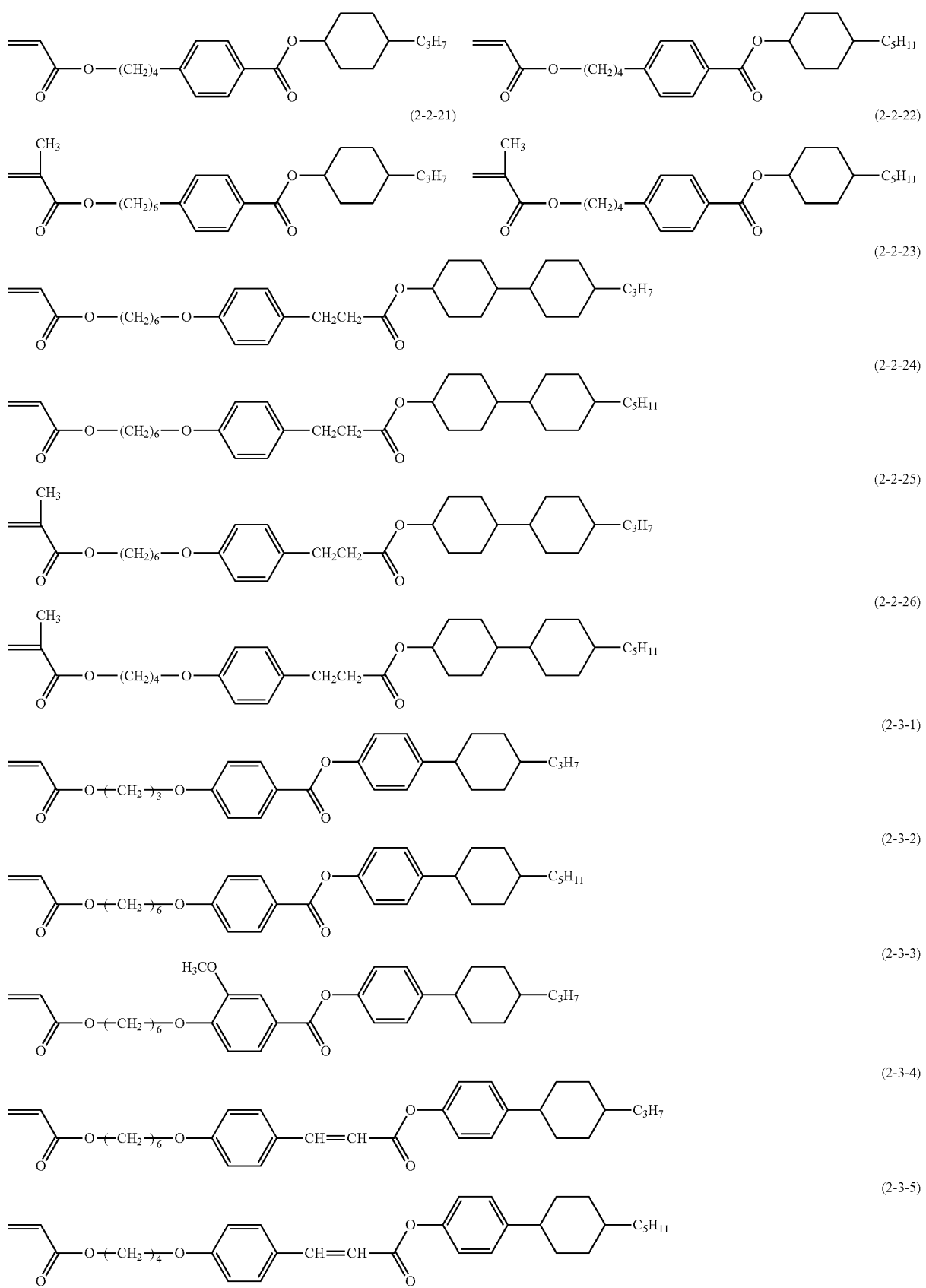

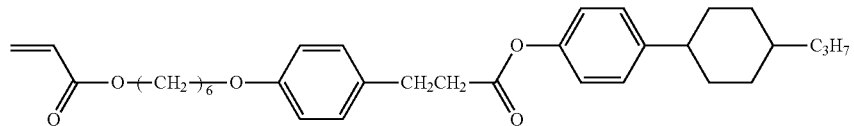
(2-3-6)
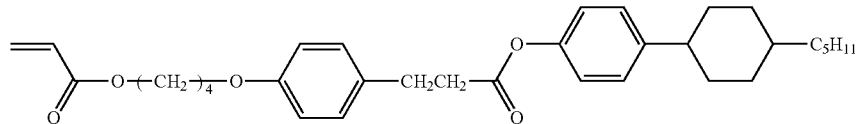
(2-3-7)
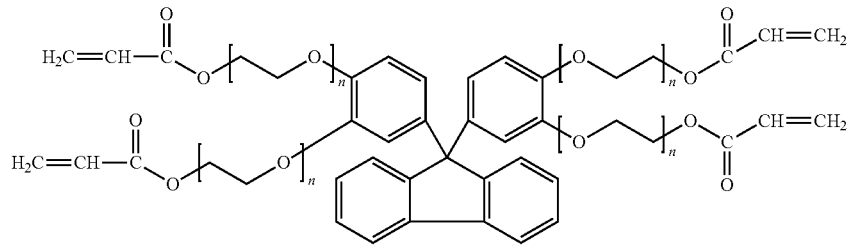
(3-1-1)
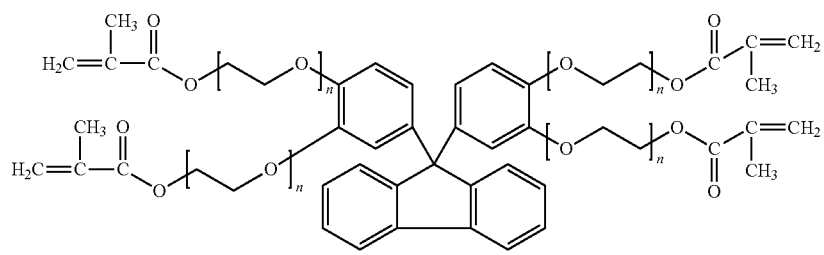
(3-1-2)
Specific examples of compound (3) are shown below.
In the formulas, n is an integer from 1 to 4.
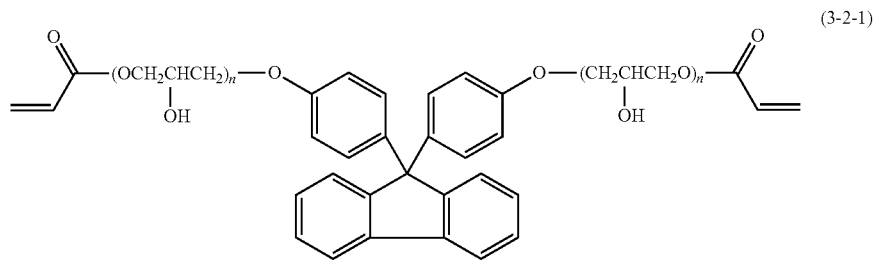
(3-2-1)
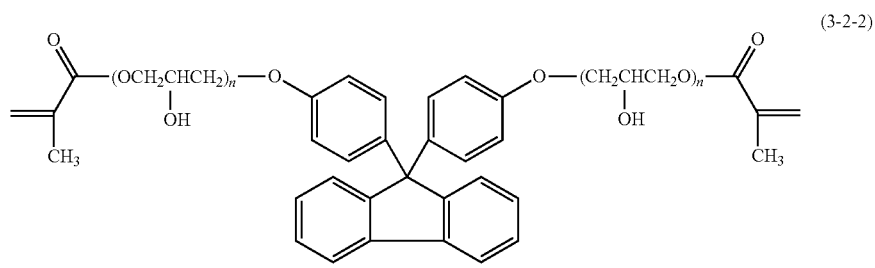
(3-2-2)
In the formulas, n is an integer from 1 to 3.

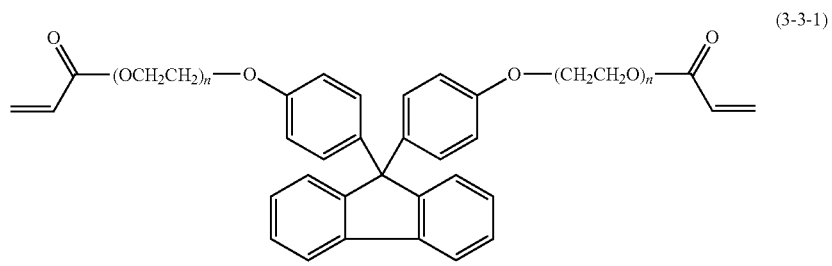
(3-3-1)
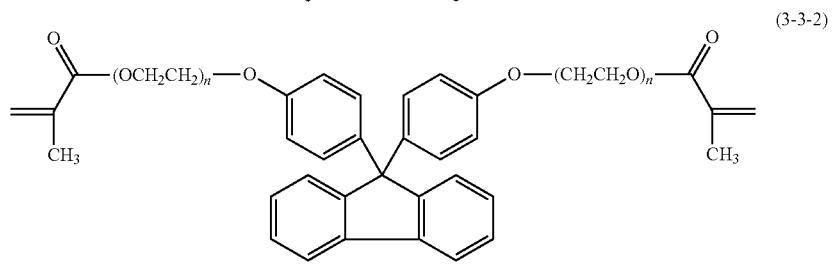
(3-3-2)
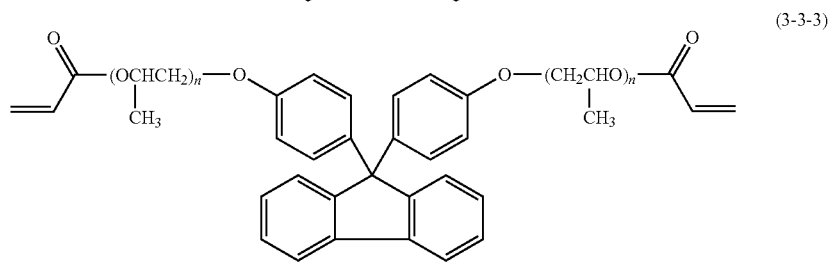
(3-3-3)
In the formulas, n is an integer from 1 to 3.
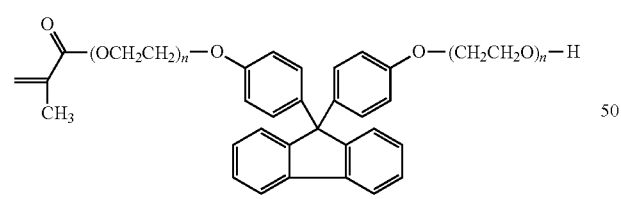
(3-4-1)
(3-4-2)
-continued
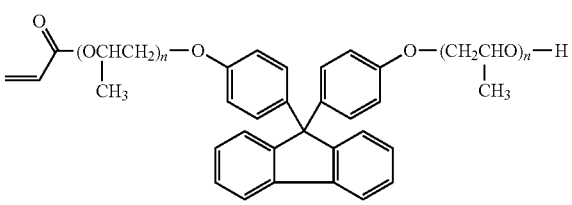
(3-4-3)
In the formulas, n is an integer from 0 to 2.
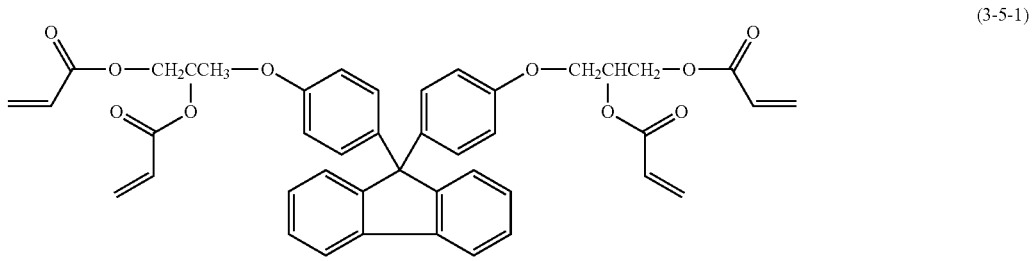
(3-5-1)

-continued
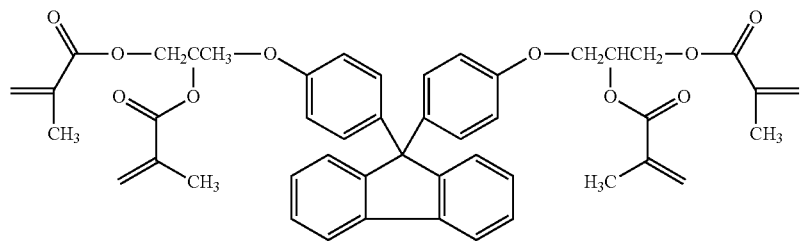
(3-5-2)
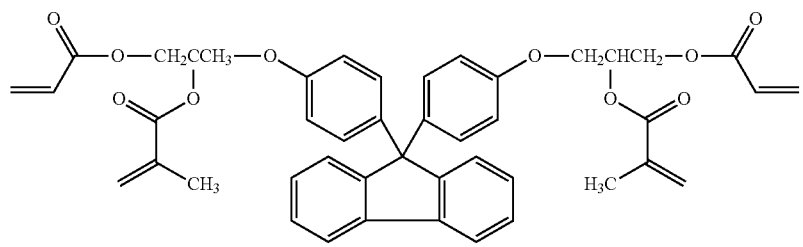
(3-5-3)
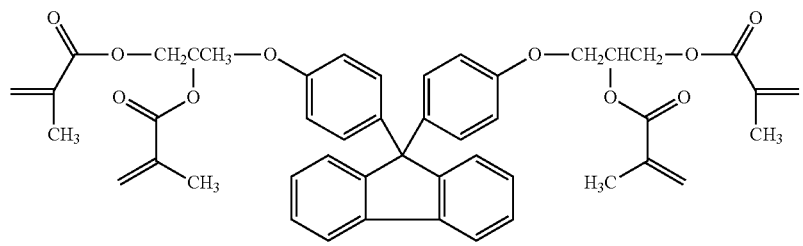
(3-5-4)
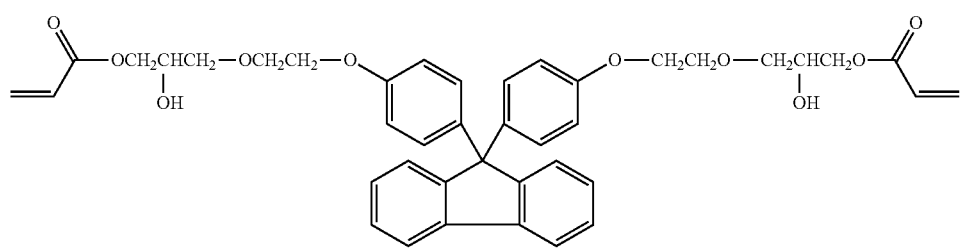
(3-6-1)
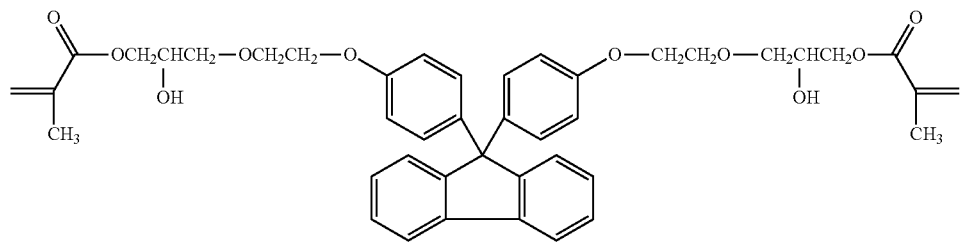
(3-6-2)
Specific examples of commercial items including compound (3-1-1), compound (3-2-1), compound (3-3-1) or compound (3-6-1) include OGSOL (registered trade name) EA-0250T, OGSOL EA-0500, OGSOL EA-1000, CA-0400, CA-0450T, ONF-1, BPEFA and GA-1000, made by Osaka Gas Chemicals Co., Ltd. The commercial items may be used.
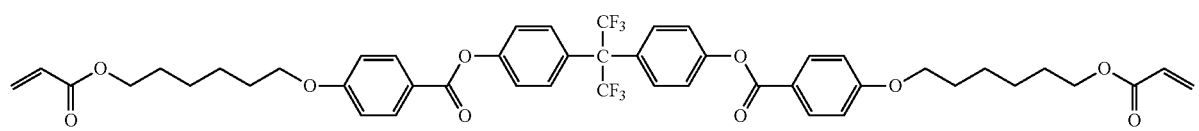
(4-1-1)

-continued
(4-1-2)
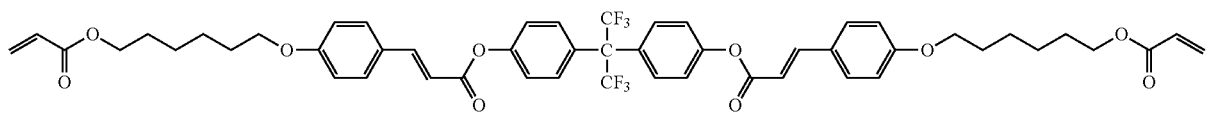
(4-1-3)
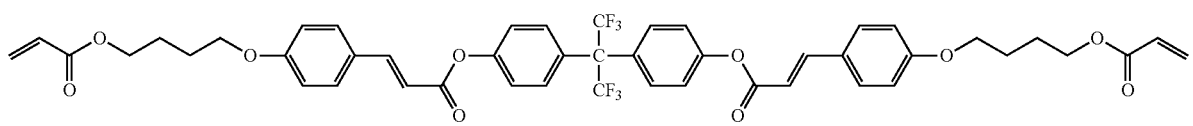
(4-1-4)
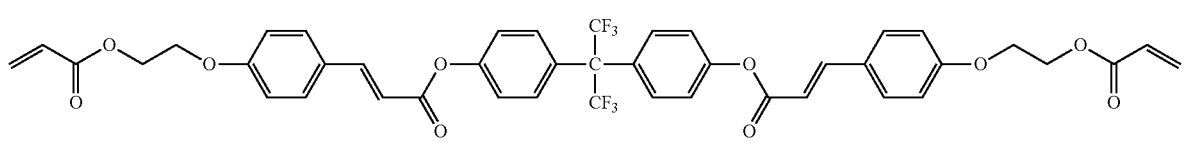
(4-1-5)
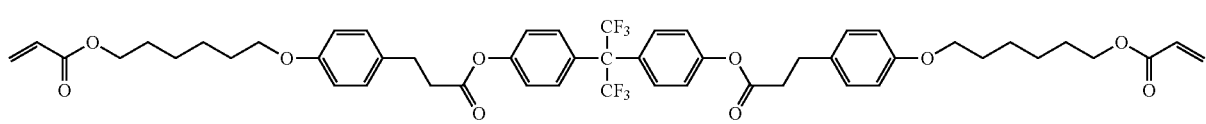
(4-1-6)
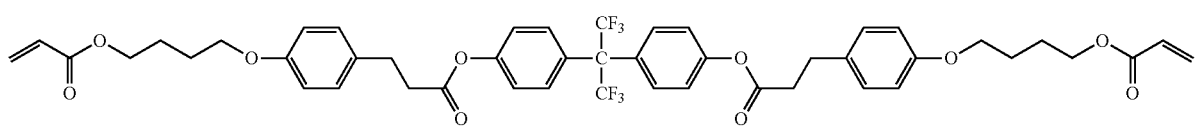
(4-1-7)
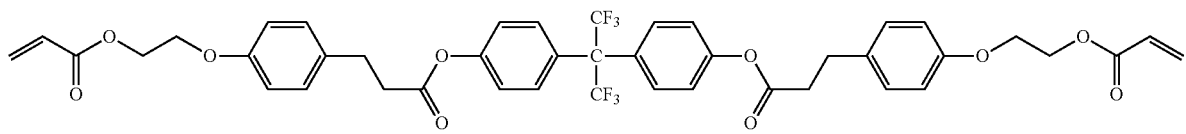
(4-1-8)
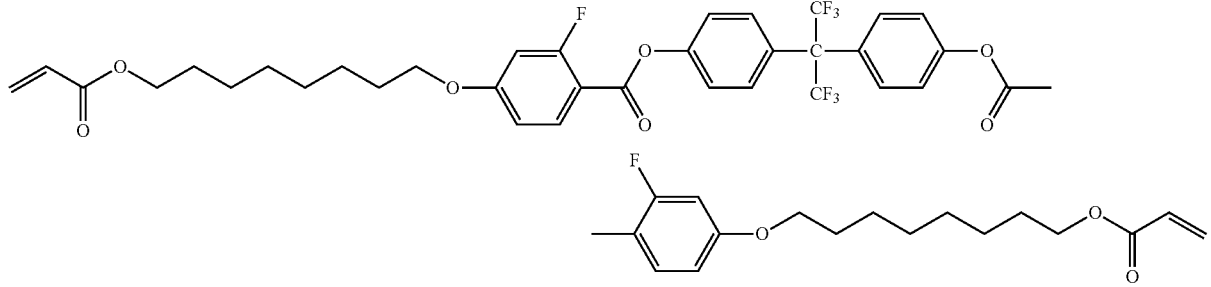
(4-1-9)
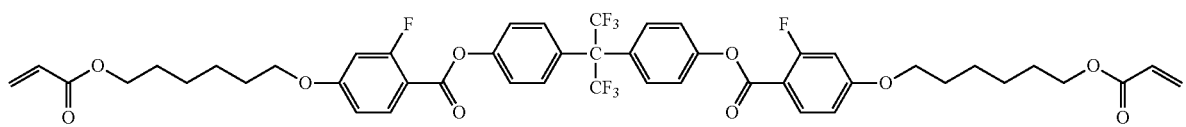
(4-1-10)
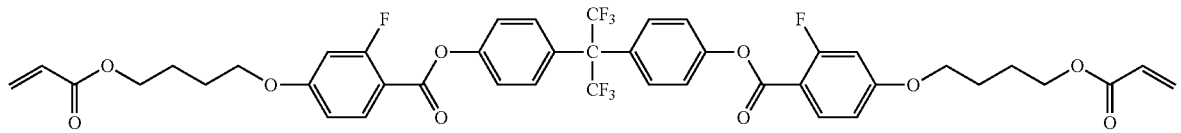

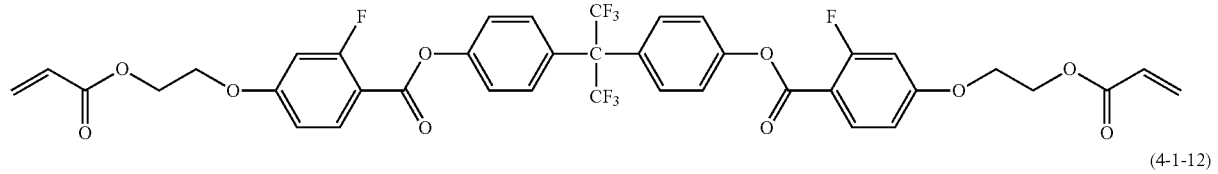
(4-1-11)
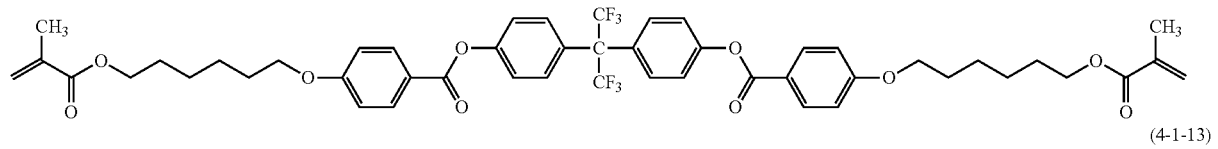
(4-1-12)
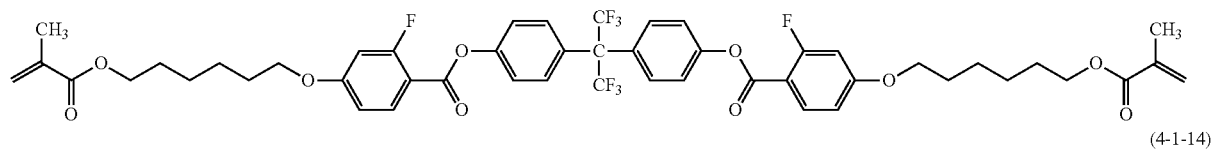
(4-1-13)
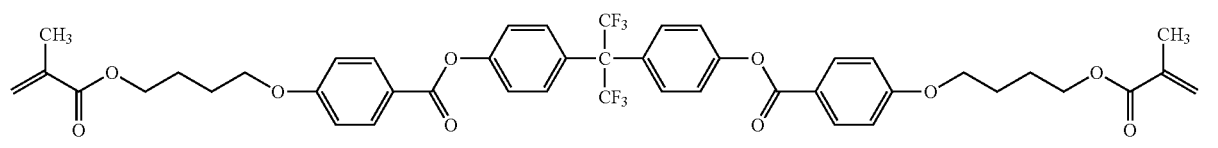
(4-1-14)
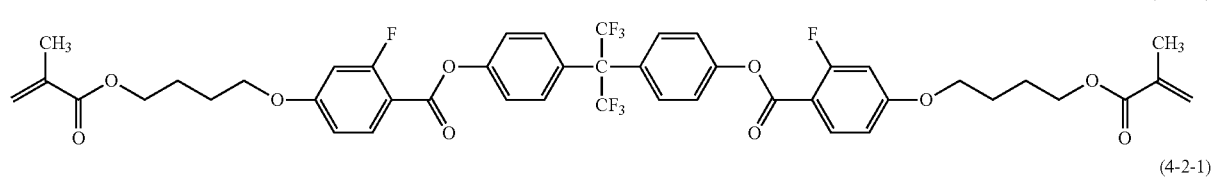
(4-1-15)
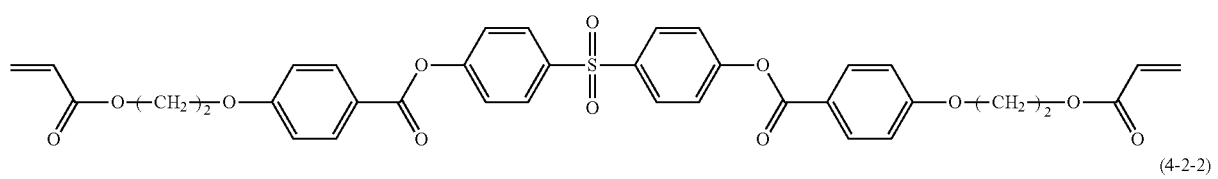
(4-2-1)
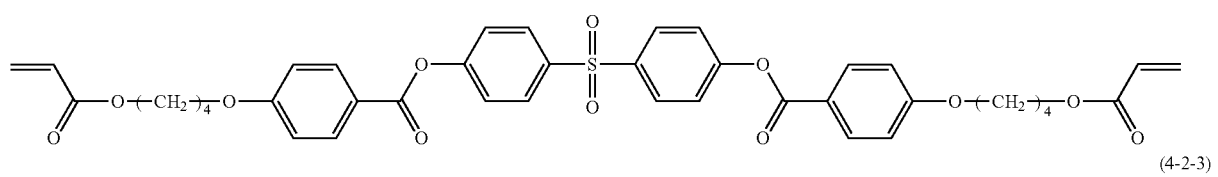
(4-2-2)
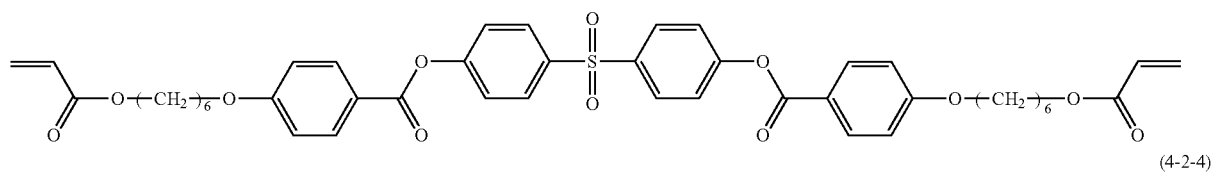
(4-2-3)
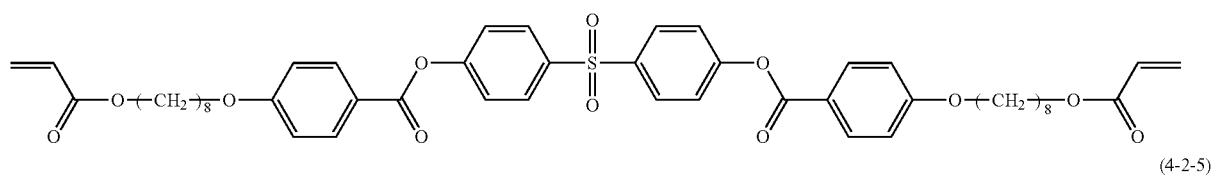
(4-2-4)
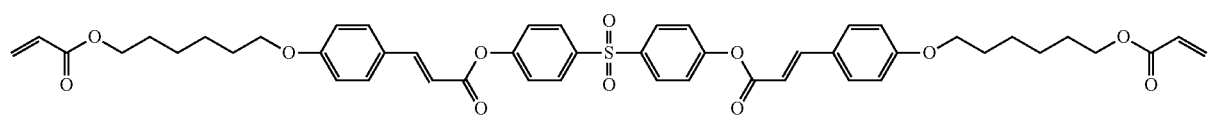
(4-2-5)

-continued
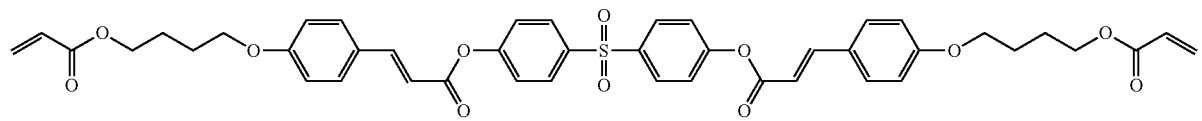
(4-2-6)
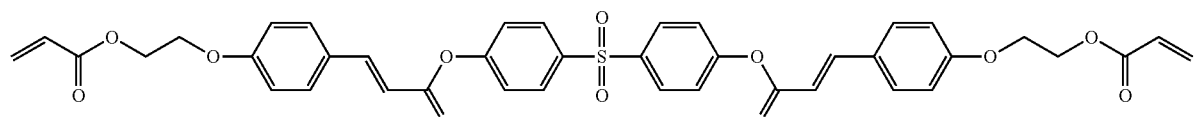
(4-2-7)
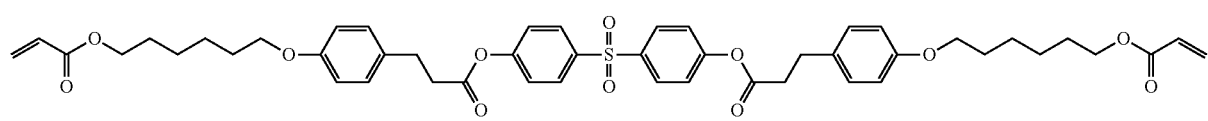
(4-2-8)
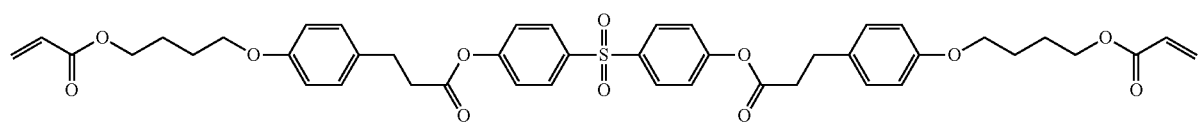
(4-2-9)
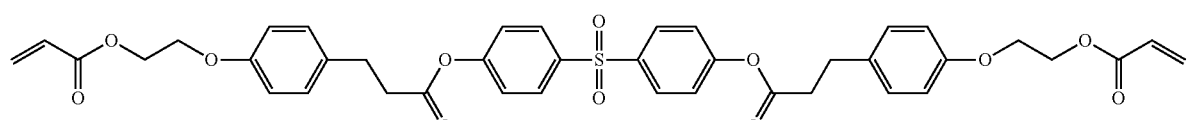
(4-2-10)
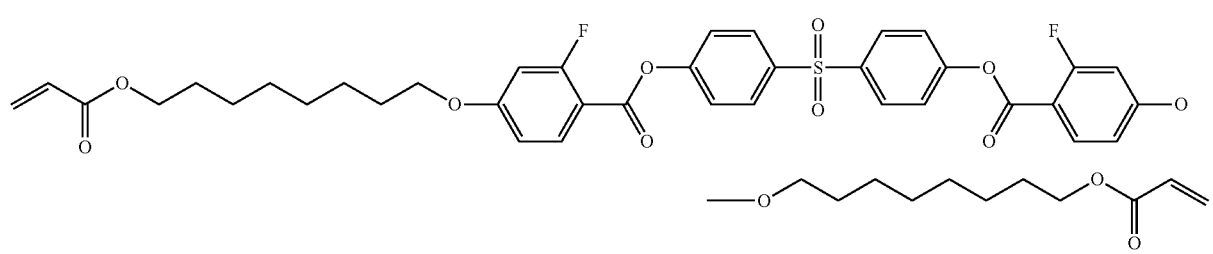
(4-2-11)
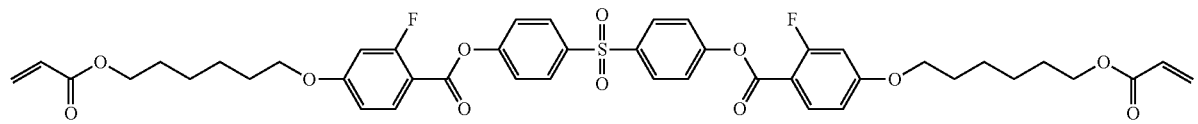
(4-2-12)
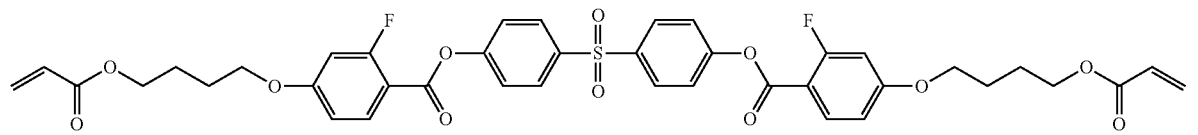
(4-2-13)
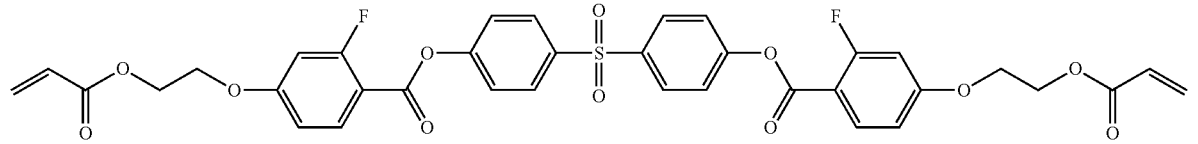
(4-2-14)

(4-2-15)

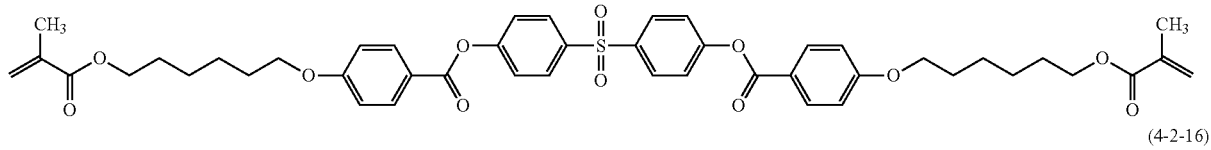

(4-2-16)

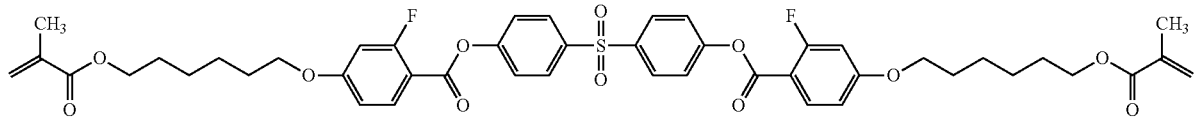

Compound (E) is the non-liquid crystalline compound having the functional group including the hydroxyl group, and having the acryloyl group or the methacryloyl group in one compound. The compounds may be commercial items. Preferred examples of compound (E) include butanediol monoacrylate, a reaction product between butyl glycidyl ether and (meth)acrylic acid (DENACOL (registered trade name) DA-151, made by Nagase & Co., Ltd.), 3-chloro-2-hydroxypropyl methacrylate, glycerol methacrylate (BLEMMER (registered trade name) GLM, made by NOF Corporation), glycerol acrylate and glycerol dimethacrylate (BLEMMER GMR series, made by NOF Corporation), glycerol triacrylate (EX-314, made by Nagase ChemteX Corporation), 2-hydroxyethyl acrylate (BHEA, made by Nippon Shokubai Co., Ltd.), 2-hydroxyethyl methacrylate (HEMA, made by Nippon Shokubai Co., Ltd.), 2-hydroxypropyl acrylate (HPMA, made by Nippon Shokubai Co., Ltd.), 2-hydroxypropyl methacrylate (HPMA, made by Nippon Shokubai Co., Ltd.), caprolactone-modified 2-hydroxyethyl acrylate, caprolactone-modified 2-hydroxyethyl methacrylate, phenoxyhydroxypropyl acrylate (M-600A, made by Kyoeisha Chemical Co., Ltd.), 2-hydroxy-3-acryloyloxypropyl methacrylate (G-201P, made by Kyoeisha Chemical Co., Ltd.), KAYARAD (registered trade name) R-167, made by Nippon Kayaku Co., Ltd., triglycerol diacrylate (Epoxy Ester 80MFA, made by Kyoeisha Chemical Co., Ltd.), pentaerythritol tri(meth)acrylate, dipentaerythritolmonohydroxy penta(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloyloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyethyl-1-yloxy)benzoic acid, 4-(3-acryloyloxy-n-prop-1-yloxy)benzoic acid, 4-(2-methacryloyloxyethyl-1-yloxy)benzoic acid, 4-(4-acryloyloxy-n-buty-1-yloxy)benzoic acid, 4-(6-acryloyloxy-n-hexy-1-yloxy)benzoic acid, 4-(6-acryloyloxy-n-hexy-1-yloxy)-2-methylbenzoic acid, 4-(6-methacryloyloxy-n-hexy-1-yloxy)benzoic acid, 4-(10-acryloyloxy-n-deci-1-yloxy)benzoic acid, 2-acryloyloxyethyl acid phosphate and 2-methacryloyloxyethyl acid phosphate.

Specific examples of polyethylene glycol monomethacrylate having a polymerization degree of 2 to 20 include, as exemplified in formula (5-1) below, BLEMMER PE-90 (n=2), PE-200 (n=4.5) and PE-350 (n=8), made by NOF Corporation. Here, the polymerization degree of polyethylene glycol monomethacrylate is further preferably 2 to 10. Then, n represents the mean constituent unit number.

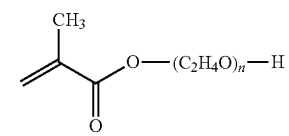
(5-1)

Specific examples of polyethylene glycol monoacrylate having a polymerization degree of 2 to 20 include, as exemplified in formula (5-2) below, BLEMMER AE-90 (n=2), AE-200 (n=4.5) and AE-400 (n=10), made by NOF Corporation. Here, the polymerization degree of polyethylene glycol monoacrylate is further preferably 2 to 10.

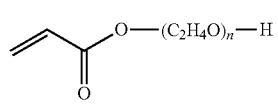
(5-2)

Specific examples of polypropylene glycol monomethacrylate having a polymerization degree of 2 to 20 include, as exemplified in formula (5-3) below, BLEMMER PP-1000 (n=4 to 6), PP-500 (n=9) and PP-800 (n=13), made by NOF Corporation. Here, the polymerization degree of polypropylene glycol monomethacrylate is further preferably 3 to 13.

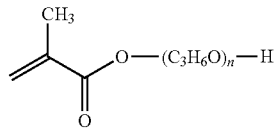
(5-3)

Specific examples of polypropylene glycol monoacrylate having a polymerization degree of 2 to 20 include, as exemplified in formula (5-4) below, BLEMMER AP-150 (n=3), AP-400 (n=6), AP-550 (n=9) and AP-800 (n=13), made by NOF Corporation. Here, the polymerization degree of polypropylene glycol monoacrylate is further preferably 3 to 13.

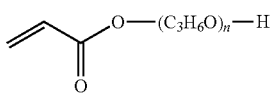
(5-4)

Specific examples of poly(ethylene glycol-propylene glycol)monomethacrylate include, as exemplified by formula (5-5) below, BLEMMER 50PEP-300, made by NOF Corporation. Here, ethylene or propylene that means R is incorporated by random copolymerization. The mean constituent unit number (m) of ethyleneoxy and propyleneoxy is 2.5 and 3.5, respectively. Then, m as described below also represents the mean constituent unit number of each alkylene.

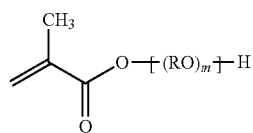
(5-5)

R: $C_2H_4$ or $C_3H_6$

Specific examples of polyethylene glycol-polypropylene glycol monomethacrylate include, as exemplified by formula (5-6) below, BLEMMER 70PEP-350B (m=5, n=2), made by NOF Corporation.

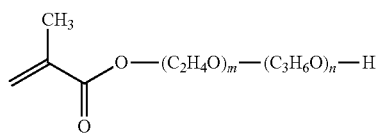
(5-6)

Specific examples of polyethylene glycol-polypropylene glycol monoacrylate include BLEMMER AEP series.

Specific examples of poly(ethylene glycol-tetramethylene glycol)monomethacrylate include, as exemplified by formula (5-7) below, BLEMMER 55PET-400, 30PET-800 and 55PET-800, made by NOF Corporation. Here, the polymerization degree further preferably 2 to 10. In the formula, ethylene or butylene that means R is incorporated by random copolymerization. The mean constituent unit number (m) of ethyleneoxy and butyleneoxy is 5 and 2 in 55PET-400, 6 and 10 in 30PET-800, and 10 and 5 in 55PET-800, respectively.

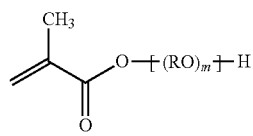
(5-7)

R: $C_2H_4$ or $C_4H_8$

Specific examples of poly(ethylene glycol-tetramethylene glycol)monoacrylate include BLEMMER AET series, made by NOF Corporation.

Specific examples of poly(propylene glycol-tetramethylene glycol)monomethacrylate include, as exemplified by formula (5-8) below, BLEMMER 30PPT-800, 50PPT-800 and 70PPT-800, made by NOF Corporation. Here, the polymerization degree is further preferably 3 to 10. In the formula, propyleneoxy or butyleneoxy that means R is incorporated by random copolymerization. The mean constituent unit number (m) of propylene and butylene is 4 and 8 in 30PPT-800, 7 and 6 in 50PPT-800, and 10 and 3 in 70PPT-800, respectively.

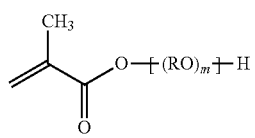
(5-8)

R: $C_3H_6$ or $C_4H_8$

Specific examples of poly(propylene glycol-tetramethylene glycol)monoacrylate include BLEMMER APT series, made by NOF Corporation.

Specific examples of propylene glycol polybutylene glycol (mono(meth)acrylate) include BLEMMER 10PPB-500B (n=6), made by NOF Corporation, as exemplified by formula (5-9) below, and 10APB-500B (n=6) as exemplified by formula (5-10) below. Here, the polymerization degree is further preferably 6.

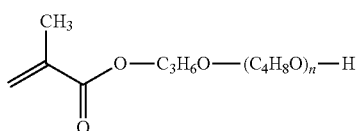
(5-9)

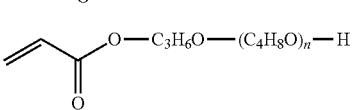
(5-10)

Compound (E) has a good compatibility with the polymerizable liquid crystal composition, and a low solvent damage on the support substrate in many cases. When improving compatibility, component (E) may be warmed upon mixing with the polymerizable liquid crystal compound. When component (E) has a good compatibility with the polymerizable liquid crystal composition, compound (E) has an effect of a solvent of the polymerizable liquid crystal composition. From a viewpoint of the effect of the solvent to the polymerizable liquid crystal composition, further preferred compound (E) include butanediol monoacrylate, a reaction product between butyl glycidyl ether and (meth)acrylic acid (DENACOL DA-151, made by Nagase & Co., Ltd.), 3-chloro-2-hydroxypropyl methacrylate, glycerol methacrylate (BLEMMER GLM, made by NOF Corporation), glycerol acrylate, glycerol dimethacrylate (BLEMMER GMR series, made by NOF Corporation), glycerol triacrylate (EX-314, made by Nagase ChemteX Corporation), 2-hydroxyethyl acrylate (BHEA, made by Nippon Shokubai Co., Ltd.), 2-hydroxyethyl methacrylate (HEMA, made by Nippon Shokubai Co., Ltd.), 2-hydroxypropyl acrylate (HPMA, made by Nippon Shokubai Co., Ltd.), 2-hydroxypropyl methacrylate (HPMA, made by Nippon Shokubai Co., Ltd.), caprolactone-modified 2-hydroxyethyl acrylate, caprolactone-modified 2-hydroxyethyl methacrylate, phenoxyhydroxypropyl acrylate (M-600A, made by Kyoeisha Chemical Co., Ltd.), 2-hydroxy-3-acryloyloxypropyl methacrylate (G-201P, made by Kyoeisha Chemical Co.) and KAYARAD R-167, made by Nippon Kayaku Co., Ltd.

Specific preferred examples of compound (E) having a carboxyl group are as described below, and may be commercial items.

Specific examples include 2-methacryloyloxyethyl succinate (LIGHT ESTER HO-MS (N), made by Kyoeisha Chemical Co., Ltd.), 2-methacryloyloxyethyl hexahydrophthalate (LIGHT ESTER HO-HH(N), made by Kyoeisha Chemical Co., Ltd.), 2-acryloyloxyethyl succinate (LIGHT ACRYLATE HOA-MS (N), made by Kyoeisha Chemical Co., Ltd.), 2-acryloyloxyethyl hexahydrophthalate (LIGHT ACRYLATE HOA-HH(N), made by Kyoeisha Chemical Co., Ltd.), 2-acryloyloxyethyl phthalate (LIGHT ACRYLATE HOA-MPL(N), made by Kyoeisha Chemical Co., Ltd.), 2-acryloyloxyethyl-2-hydroxyethyl-phthalate (LIGHT ACRYLATE HOA-MPE(N), made by Kyoeisha Chemical Co., Ltd.), 4-(2-acryloyloxyethyl-1-yloxy)benzoic acid (ST01630, made by Synthon Chemicals GmbH & Co. KG), 4-(3-acryloyloxy-n-prop-1-yloxy)benzoic acid (ST02453, made by Synthon Chemicals GmbH & Co. KG), 4-(2-methacryloyloxyethyl-1-yloxy)benzoic acid (ST01889, made by Synthon Chemicals GmbH & Co. KG), 4-(4-acryloyloxy-n-buty-1-yloxy)benzoic acid (ST01680, made by Synthon Chemicals GmbH & Co. KG), 4-(6-acryloyloxy-n-hexy-1-yloxy)benzoic acid (ST00902, made by Synthon Chemicals GmbH & Co. KG), 4-(6-acryloyloxy-n-hexy-1-yloxy)-2-methylbenzoic acid (ST03606, made by Synthon Chemicals GmbH & Co. KG), 4-(6-methacryloyloxy-n-hexy-1-yloxy) benzoic acid (ST01618, made by Synthon Chemicals GmbH & Co. KG) and 4-(10-acryloyloxy-n-deci-1-yloxy)benzoic acid (ST03604, made by Synthon Chemicals GmbH & Co. KG).

Specific preferred examples of compound (E) having a phosphate group are as described below, and may be commercial items.

Specific examples include 2-acryloyloxyethyl acid phosphate (LIGHT ACRYLATE P-1A(N), made by Kyoeisha Chemical Co., Ltd.), 2-methacryloyloxyethyl acid phosphate (LIGHT ESTER P-1M), made by Kyoeisha Chemical Co., Ltd.), LIGHT ESTER P-2M, made by Kyoeisha Chemical Co., Ltd. and KAYAMER (registered trade name) PM-2, made by Nippon Kayaku Co., Ltd.

Next, specific examples of other polymerizable compounds, additives and organic solvents are shown. Any other polymerizable compound described herein is a polymerizable compound having no hydroxyl group. The compounds may be commercial items. Examples of other polymerizable compounds having no hydroxyl group include a compound having one polymerizable group, a compound having two polymerizable groups and a compound having three or more polymerizable groups.

Examples of compounds having one polymerizable group but having no functional group including the hydroxyl group include styrene, nucleus-substituted styrene, acrylonitrile, vinyl chloride, vinylidene chloride, vinylpyridine, N-vinylpyrrolidone, vinylsulfonic acid, fatty acid vinyl ester (vinyl acetate), α,β-ethylenic unsaturated carboxylic acid (acrylic acid, methacrylic acid, maleic acid, fumaric acid and itaconic acid), alkyl ester of (meth)acrylic acid (the number of carbons of alkyl: 1 to 18), hydroxyalkyl ester of (meth)acrylic acid (the number of carbons of hydroxyalkyl: 1 to 18), aminoalkyl ester of (meth)acrylic acid (the number of carbons of aminoalkyl: 1 to 18), ether oxygen-containing alkyl ester of (meth)acrylic acid (the number of carbons of ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butyl-benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentanyloxylethyl (meth)acrylate, isobornyloxylethyl (meth)acrylate, isobornyl (meth)acrylate, adamanthyl (meth)acrylate, dimethyladamanthyl (meth) acrylate, dicyclopentanyl (meth)acrylate, dicyclopentenyl (meth)acrylate, polyethylene glycol mono(meth)acrylate having a polymerization degree of 1 to 100 in which a terminal is capped with an alkyl group having 1 to 6 carbons, polypropylene glycol mono(meth)acrylate having a polymerization degree of 2 to 20 in which a terminal is capped with an alkyl group having 1 to 6 carbons, and polyalkylene glycol (such as a copolymer of ethyleneoxide and propylene oxide) mono(meth)acrylate having a polymerization degree of 2 to 20 in which a terminal is capped with an alkyl group having 1 to 6 carbons.

Examples of compounds having two polymerizable groups but having no functional group including the hydroxyl group include 1,4-butanediol diacrylate, 1,6-hexanediol diacrylate, 1,9-nonanediol diacrylate, neopentyl glycol diacrylate, dimethyloltricyclodecane diacrylate, triethylene glycol diacrylate, dipropylene glycol diacrylate, tripropylene glycol diacrylate, tetraethylene glycol diacrylate, bisphenol A EO-added diacrylate, bisphenol A glycidyl diacrylate (BISCOAT V#700), polyethylene glycol diacrylate, and a methacrylate compound of the compounds described above. The compounds are suitable for further improving coating film-forming ability of a polymer.

Examples of compounds having three or more polymerizable groups but having no functional group including the hydroxyl group include pentaerythritol tri(meth)acrylate, trimethylolpropane tri(meth)acrylate, trimethylol EO-added tri (meth)acrylate, tris(meth)acryloyloxyethyl phosphate, tris ((meth)acryloyloxyethyl)isocyanurate, alkyl-modified dipentaerythritol tri(meth)acrylate, EO-modified trimethylolpropane tri(meth)acrylate, PO-modified trimethylolpropane tri(meth)acrylate, pentaerythritol tetra(meth)acrylate, alkyl-modified dipentaerythritol tetra(meth)acrylate, ditrimethylolpropane tetra(meth)acrylate, dipentaerythritol hexa (meth)acrylate, dipentaerythritolmonohydroxy penta(meth) acrylate, alkyl-modified dipentaerythritol penta(meth)acrylate, BISCOAT V#802 (the number of functional groups=8) and BISCOAT V#1000 (the number of functional groups=14 on average). "BISCOAT" is a trade name of products of Osaka Organic Chemical Industry Ltd. A compound having 16 or more functional groups can be obtained by using, as a raw material, Boltorn H20 (16 functions), Boltorn H30 (32 functions) and Boltorn H40 (64 functions), all being sold by Perstorp Specialty Chemicals AB, and acrylating the materials.

As the surfactant, various kinds of compounds can be used, such as a silicone-based, fluorine-based, polyether-based, acrylic acid copolymer-based or titanate-based compound, imidazoline, quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, amine lauryl sulfates, alkyl-substituted aromatic sulfonate, alkyl phosphate, an aliphatic or aromatic sulfonic acid-formalin condensate, lauryl amide propylbetaine, lauryl aminoacetic acid betaine, polyethylene glycol fatty acid esters, polyoxyethylene alkylamine, perfluoroalkyl sulfonate, perfluoroalkyl carboxylate, an oligomer having a perfluoroalkyl group and a hydrophilic group, an oligomer having a perfluoroalkyl group and a lipohilic group, urethane having a perfluoroalkyl group, polyester-modified polydimethylsiloxane having a hydroxyl group, polyester polyether-modified polydimethylsiloxane having a hydroxyl group, polyether-modified polydimethylsiloxane having a hydroxyl group, and polyester-modified polyalkyl siloxane. The surfactant is effective in facilitating application of the composition onto the support substrate, or the like. The surfactant may have a polymerizable group for uniting the composition with the polymerizable liquid crystal compound. Specific examples of the polymerizable groups to be introduced into the surfactant include a UV reactive functional group, and a functional group having a thermopolymerizability. From a viewpoint of reactivity with the polymerizable liquid crystal compound, the functional group of UV reaction type is preferred. A preferred ratio of the surfactant is, although the preferred range is different depending on kinds of surfactants and ratios of compositions, in the range of approximately 0.0001 to approximately 0.05, further preferably, in the range of approximately 0.001 to approximately 0.03, in a weight ratio based on the total weight of component (A), component (B) and component (D).

In order to optimize a rate of polymerization of the polymerizable liquid crystal composition, a publicly known photopolymerization initiator may be used. A preferred amount of addition of the photopolymerization initiator is in the range of approximately 0.0001 to approximately 0.20 in a weight ratio based on the total weight of component (A), component (B) and component (D). A further preferred weight ratio is in the range of approximately 0.001 to approximately 0.15. A still preferred weight ratio is in the range of approximately 0.01 to approximately 0.15. Examples of the photopolymerization initiators include 2-hydroxy-2-methyl-1-phenylpropane-1-one (DAROCURE (registered trade name) 1173), 1-hydroxycyclohexyl phenyl ketone, 2,2-dimethoxy-1,2-diphenylethane-1-one (IRGACURE (registered trade name) 651), 1-hydroxy-cyclohexyl-phenyl-ketone (IRGACURE 184), IRGACURE 127, IRGACURE 500 (a mixture of IRGACURE 184 and benzophenone), IRGACURE 2959, IRGACURE 907, IRGACURE 369, IRGACURE 379, IRGACURE 754, IRGACURE 1300, IRGACURE 819, IRGACURE 1700, IRGACURE 1800, IRGACURE 1850, IRGACURE 1870, DAROCURE 4265, DAROCURE MBF, DAROCURE TPO, IRGACURE 784, IRGACURE 754, IRGACURE OXE01 and IRGACURE OXE02. Both of DAROCURE and IRGACURE described above are names of commercial products sold by BASF Japan Ltd. A publicly known sensitizer (isopropyl thioxanthone, diethyl thioxanthone, ethyl-4-dimethylaminobenzoate (DAROCURE EDB), 2-ethylhexyl-4-dimethylaminobenzoate (DAROCURE EHA), or the like) may be added to the initiators.

Other examples of the photoradical polymerization initiators include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a benzophenone/Michler's ketone mixture, a hexaarylbiimidazole/mercaptobenzimidazole mixture, 1-(4-isopropylphenyl)-2-hydroxy-2-methylpropane-1-one, benzyldimethyl ketal, 2-methyl-1-[4-(methylthio)phenyl]-2-morpholinopropane-1-one, a 2,4-diethylxanthone/methyl p-dimethylaminobenzoate mixture, and a benzophenone/methyltriethanolamine mixture.

Mechanical characteristics of the polymer can be controlled by adding one kind of chain transfer agent or two or more kinds of chain transfer agents to the polymerizable liquid crystal composition. When the chain transfer agent is used, a length of a polymer chain or lengths of two crosslinked polymer chains in a polymer film can be controlled. The lengths can also be simultaneously controlled. If an amount of chain transfer agent is increased, the length of the polymer chain decreases. A preferred chain transfer agent is a thiol compound. Examples of monofunctional thiol include dodecanethiol and 2-ethylhexyl 3-mercaptopropionate. Examples of polyfunctional thiol include trimethylolpropanetris(3-mercaptopropionate), pentaerythritol tetrakis (3-mercaptopropionate), 1,4-bis(3-mercaptobutyryloxy) butane (KARENZ MT BD1), pentaerythritol tetrakis(3-mercaptobutyrate) (KARENZ MT PE1) and 1,3,5-tris(3-mercaptobutyloxyethyl)-1,3,5-triazine-2,4,6(1H, 3H, 5H)-trione (KARENZ MT NR1). "KARENZ" is a trade name of products of Showa Denko K. K.

A polymerization inhibitor can be added to the polymerizable liquid crystal composition in order to prevent polymerization start during storage. A publicly known polymerization inhibitor can be used, but preferred examples include 2,5-di (t-butyl)hydroxytoluene (BHT), hydroquinone, methyl blue, diphenyl picryl hydrazide (DPPH), benzothiazine, 4-nitrosodimethylaniline (NIDI) and o-hydroxybenzophenone.

An oxygen inhibitor can also be added in order to improve storage stability of the polymerizable liquid crystal composition. A radical generated in the composition reacts with oxygen in an atmosphere to yield a peroxide radical, and thus an unwanted reaction with the polymerizable compound is promoted. The oxygen inhibitor is preferably added in order to prevent the unwanted reaction. Examples of the oxygen inhibitors include phosphates.

In order to further improve weather resistance of the polymerizable liquid crystal composition, the ultraviolet light absorber, the light stabilizer (radical scavenger), the antioxidant or the like may be added. Example of the ultraviolet light absorbers include TINUVIN PS, TINUVIN P, TINUVIN 99-2, TINUVIN 109, TINUVIN 213, TINUVIN 234, TINUVIN 326, TINUVIN 328, TINUVIN 329, TINUVIN 384-2, TINUVIN 571, TINUVIN 900, TINUVIN 928, TINUVIN 1130, TINUVIN 400, TINUVIN 405, TINUVIN 460, TINUVIN 479, TINUVIN 5236, ADEKA STAB LA-32, ADEKA STAB LA-34, ADEKA STAB LA-36, ADEKA STAB LA-31, ADEKA STAB 1413 and ADEKA STAB LA-51. "TINUVIN (registered trade name)" is a trade name of products of Ciba Holding Incorporated, and a trade name of products of BASF Japan Ltd. Moreover, "ADEKA STAB (registered trade name)" is a trade name of products of ADEKA Corporation.

Examples of the light stabilizers include TINUVIN 111FDL, TINUVIN 123, TINUVIN 144, TINUVIN 152, TINUVIN 292, TINUVIN 622, TINUVIN 770, TINUVIN 765, TINUVIN 780, TINUVIN 905, TINUVIN 5100, TINUVIN 5050 and 5060, TINUVIN 5151, CHIMASSORB 119FL, CHIMASSORB 944FL, CHIMASSORB 944LD, ADEKA STAB LA-52, ADEKA STAB LA-57, ADEKA STAB LA-62, ADEKA STAB LA-67, ADEKA STAB LA-63P, ADEKA STAB LA-68LD, ADEKA STAB LA-77, ADEKA STAB LA-82, ADEKA STAB LA-87, CYASORB UV-3346 made by Cytec, Inc., and GOODRITE UV-3034 made by Goodrich Corporation. "CHIMASSORB (registered trade name)" is a registered trade name of products of Ciba Holding Incorporated, and a registered trade name of products of BASF Japan Ltd.

Examples of the antioxidants include ADEKA STAB AO-20, AO-30, AO-40, AO-50, AO-60 and AO-80, made by ADEKA Corporation, and SUMILIZER (registered trade name) BHT, SUMILIZER BBM-S and SUMILIZER GA-80, sold by Sumitomo Chemical Co., Ltd., and Irganox (registered trade name) 1076, Irganox 1010, Irganox 3114 and Irganox 245, sold by BASF Japan Ltd. The commercial items may be used.

A silane coupling agent may be further added to the polymerizable liquid crystal composition in order to control adhesion with the support substrate. Specific examples include vinyltrialkoxysilane, 3-aminopropyltrialkoxysilane, N-(2-aminoethyl)-3-aminopropyltrialkoxysilane, N-(1,3-dimethylbutylidene)-3-triethoxysilyl-1-propanamine, 3-triethoxysilyl-N-(1,3-dimethylbutylidene)-3-glycidoxypropyltrialkoxysilane, 3-chlorotrialkoxysilane and 3-methacryloxypropyltrialkoxysilane. Another example includes dialkoxymethylsilane in which one of alkoxy groups (three) is replaced by methyl in the compounds. A preferred silane coupling agent includes 3-aminopropyltriethoxysilane.

The dichroic dye or a fluorescent dye may be further added to the polymerizable liquid crystal composition in order to provide the composition with polarization characteristics or fluorescent characteristics. The dichroic dye preferably has (1) a high dichroic ratio, (2) a high absorption coefficient in a direction in parallel to the major axis of molecules or (3) a high compatibility or solubility with a polymerizable liquid crystal. For example, dyes such as anthraquinones or azos used in a liquid crystal display device according to a guest-host mode can be used alone or mixed. Moreover, the dichroic dye may have a polymerizable group. A preferred amount of addition of the dichroic dye is approximately 0.01 to approximately 0.50 in a weight ratio based on the total weight of component (A), component (B) and component (D). A further preferred weight ratio is in the range approximately 0.01 to approximately 0.40. A still further preferred weight ratio is in the range of approximately 0.01 to approximately 0.30. Specific examples of the dichroic dyes include SI-486, SI-426, SI-483, SI-412 and SI-428, sold by Mitsui Fine Chemical Inc. The commercial items may be used.

The polymerizable liquid crystal composition of the invention can be directly applied onto a support substrate surface. However, in order to facilitate coating, the polymerizable liquid crystal composition may be diluted with a solvent, as long as the solvent presumably does not corrode the support substrate. The solvents may be used alone or in combination by mixing two or more solvents. Examples of the solvents include an ester solvent, an amide solvent, an alcohol solvent, an ether solvent, glycol monoalkyl ether solvent, an aromatic hydrocarbon solvent, a halogenated aromatic hydrocarbon solvent, an aliphatic hydrocarbon solvent, a halogenated aliphatic hydrocarbon solvent and an alicyclic hydrocarbon solvent, a ketone solvent and an acetate solvent.

Preferred examples of the ester solvents include alkyl acetate (methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (methyl propionate, methyl 3-methoxypropionate, ethyl propionate, propyl propionate and butyl propionate), alkyl butyrate (methyl butyrate, ethyl butylate, butyl butyrate, isobutyl butyrate and propyl butyrate), dialkyl malonate (diethyl malonate), alkyl glycolate (methyl glycolate and ethyl glycolate), alkyl lactate (methyl lactate, ethyl lactate, isopropyl lactate, n-propyl lactate, butyl lactate and ethylhexyl lactate), monoacetin, γ-butyrolactone and γ-valerolactone.

Preferred examples of the amide solvents include N-methyl-2-pyrrolidone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

Preferred examples of the alcohol solvents include methanol, ethanol, 1-propanol, 2-propanol, 1-methoxy-2-propanol, t-butyl alcohol, sec-butyl alcohol, butanol, 2-ethyl butanol, n-hexanol, n-heptanol, n-octanol, 1-dodecanol, ethyl hexanol, 3,5,5-trimethyl hexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methyl cyclohexanol.

Preferred examples of the ether solvents include ethylene glycol dimethyl ether, diethylene glycol dimethyl ether, bis (2-propyl)ether, 1,4-dioxane and tetrahydrofuran (THF).

Preferred examples of the glycol monoalkyl ether solvents include ethylene glycol monoalkyl ether (ethylene glycol monomethyl ether and ethylene glycol monobutyl ether), diethylene glycol monoalkyl ether (diethylene glycol monoethyl ether), triethylene glycol monoalkyl ether, propylene glycol monoalkyl ether (propylene glycol monobutyl ether), dipropylene glycol monoalkyl ether (dipropylene glycol monomethyl ether), ethylene glycol monoalkyl ether acetate (ethylene glycol monobutyl ether acetate), diethylene glycol monoalkyl ether acetate (diethylene glycol monoethyl ether acetate), triethylene glycol monoalkyl ether acetate, propylene glycol monoalkyl ether acetate (propylene glycol monoethyl ether acetate, propylene glycol monoethyl ether acetate and propylene glycol monobutyl ether acetate), dipropylene glycol monoalkyl ether acetate (dipropylene glycol monomethyl ether acetate) and diethylene glycol methyl ethyl ether.

Preferred examples of the aromatic hydrocarbon solvents include benzene, toluene, xylene, anisole, p-cymene, mesitylene, ethylbenzene, diethylbenzene, i-propylbenzene, n-propylbenzene, t-butylbenzene, s-butylbenzene, n-butylbenzene and tetralin. Preferred examples of the halogenated aromatic hydrocarbon solvents include chlorobenzene. Preferred examples of the aliphatic hydrocarbon solvents include hexane and heptane. Preferred examples of the halogenated aliphatic hydrocarbon solvents include chloroform, dichloromethane, carbon tetrachloride, dichloroethane, trichloroethylene and tetrachloroethylene. Preferred examples of the alicyclic hydrocarbon solvents include cyclohexane and decalin.

Preferred examples of the ketone solvents include acetone, methyl ethyl ketone, methyl isobutyl ketone, cyclohexanone, cyclopentanone and methyl propyl ketone.

Preferred examples of the acetate solvents include ethylene glycol monomethyl ether acetate, propylene glycol monoethyl ether acetate, propylene glycol monoethyl ether acetate, methyl acetoacetate and 1-methoxy-2-propyl acetate.

From a viewpoint of solubility of the polymerizable liquid crystal compound, a use of the amide solvent, the aromatic hydrocarbon solvent or the ketone solvent is preferred, and when a boiling point of the solvent is taken into consideration, a combined use of the ester solvent, the alcohol solvent, the ether solvent and the glycol monoalkyl ether solvent is also preferred. Selection of the solvent is not particularly limited, but when a plastic substrate is used as the support substrate, a decrease in drying temperature, and prevention of the substrate from being corroded by the solvent are required in order to prevent deformation of the substrate. Solvents preferably used in such a case include an aromatic hydrocarbon solvent, a ketone solvent, an ester solvent, an ether solvent, an alcohol solvent, an acetate solvent and a glycol monoalkyl ether solvent.

A ratio of the solvent in a solution of the polymerizable liquid crystal composition is in the range of approximately 0 to approximately 95% based on the total weight of the solution. A lower limit of the range represents a numerical value in consideration of a case where the support substrate is subjected to corrosion with the solvent. Then, an upper limit of the range represents a numerical value in consideration of solution viscosity, solvent cost and productivity such as time and a quantity of heat upon evaporating the solvent. A preferred ratio is in the range of approximately 0 to approximately 90%. A further preferred ratio is in the range is approximately 0 to approximately 85%.

In the explanation below, a liquid crystal film of the invention obtained from the polymerizable liquid crystal composition may be occasionally referred simply as a liquid crystal film. The liquid crystal film can be formed as described below. First, a polymerizable liquid crystal composition or a solution thereof is applied onto a support substrate, heated and dried to form a paint film. Next, the paint film is irradiated with light to polymerize the polymerizable liquid crystal composition, and to immobilize nematic alignment that the composition in the paint film forms in a liquid crystal state. A support substrate that can be used includes glass and a plastic film. Examples of the plastic films include a film of polyimide, polyamideimide, polyamide, polyetherimide, polyether ether ketone, polyether ketone, polyketone sulfide, polyethersulfone, polysulfone, polyphenylene sulfide, polyphenylene oxide, polyethylene terephthalate, polybutyrene terephthalate, polyethylene naphthalate, polyacetal, polycarbonate, polyarylate, an acrylic resin, polyvinyl alcohol, polypropylene, cellulose, triacetylcellulose and a partially saponified material, an epoxy resin, a phenol resin and a cycloolefin resin.

Specific examples of the cycloolefin resins include a norbornene resin and a dicyclopentadiene resin, but are not limited thereto. In the resins, a resin having no unsaturated bond or a resin in which an unsaturated bond is hydrogenated is suitably used. Specific examples include a hydrogenated product of a ring-opening (co)polymer of one kind or two or more kinds of norbornene monomers, an addition (co)polymer of one kind or two or more kinds of norbornene monomers, an addition copolymer of a norbornene monomer and an olefin monomer (ethylene or α-olefin), an addition copolymer of a norbornene monomer and a cycloolefin monomer (cyclopentene, cyclooctane, 5,6-dihydrodicyclopentadiene) and a modified product thereof. Specific examples include ZEONEX (registered trade name), ZEONOR (registered trade name, made by Zeon Corporation), ARTON (made by JSR Corporation), TOPAS (registered trade name, made by Ticona GmbH), APEL (registered trade name, made by Mitsui Chemicals, Inc.), ESCENA (registered trade name, made by Sekisui Chemical Co., Ltd.) and OPTOREZ (made by Hitachi Chemical Co., Ltd.).

The plastic films may be uniaxially oriented or biaxially oriented. The plastic films may be subjected to surface treatment, such as hydrophilic treatment including corona treatment and plasma treatment, or hydrophobic treatment. A hydrophilic treatment method is not particularly limited, but corona treatment or plasma treatment is preferred, and a particularly preferred method includes plasma treatment. A method described in JP 2002-226616A, JP 2002-121648A or the like may be used for plasma treatment. In order to improve adhesion between the liquid crystal film and the plastic film, an anchor coat layer may be formed. Such an anchor coat layer may be formed using any of an inorganic material or an organic material without any problem, if the layer improves adhesion between the liquid crystal film and the plastic film. Moreover, the plastic film may be formed as a laminated film. In place of the plastic film, such a support substrate can also be used, as a metal substrate made from aluminum, iron or copper and having a slit-shaped groove on a surface, or a glass substrate made from alkaline glass, borosilicate glass or flint glass and subjected to etching processing on a surface in a slit shape.

Onto the support substrate such as the glass or the plastic film, physical or mechanical surface treatment by rubbing or the like may be applied prior to formation of the paint film of the polymerizable liquid crystal composition. When forming a homeotropically aligned polymerizable liquid crystal layer and liquid crystal film, the surface treatment by rubbing or the like is not applied in many cases, but rubbing treatment may be applied in view of preventing an alignment defect or the like. An arbitrary method can be employed as rubbing treatment. Such a method is ordinarily employed as a method for winding around a metallic roll a rubbing cloth made from a raw material such as rayon, cotton and polyamide, and moving the roll while rotating the roll in a state in contact with the support substrate or a polymer coating film, or a method for moving a support substrate side while fixing the roll. Rubbing treatment may be directly applied onto the support substrate, or a polymer coating film is arranged onto the support substrate in advance, and rubbing treatment is applied onto the polymer coating film. The rubbing treatment method is as described above. Depending on kinds of support substrates, alignment ability can also be provided by performing inclined deposition of silicon oxide on a surface of the support substrate.

Upon coating the polymerizable liquid crystal composition or the solution thereof, examples of coating methods for obtaining a uniform film thickness include a spin coating method, a microgravure coating method, a gravure coating method, a wire-bar coating method, a dip coating method, a spray coating method, a meniscus coating method and a die coating method. In particular, a wire-bar coating method or the like in which shear stress is applied to the liquid crystal composition during application may be applied when alignment of the liquid crystal composition is controlled without applying the surface treatment of the support substrate by rubbing or the like.

Upon preparing the solution of the polymerizable liquid crystal composition, compound (3) being component (C) of the polymerizable liquid crystal composition may be used after component (C) is diluted with a solvent in advance. Such a solvent is selected from solvents having capability of dissolving component (C), and further maintaining uniform alignment properties of a homeotropic alignment layer obtained from the polymerizable liquid crystal composition of the invention, and minimizing a solvent damage to the support substrate. Examples of such a solvent include the solvents to be used when preparing the solution of the polymerizable liquid crystal composition. Then, an amount of use of the solvent is also set within the range in which the uniform alignment properties of the polymerizable liquid crystal composition are maintained, and the solvent damage to the support substrate is minimized.

Upon coating the polymerizable liquid crystal composition or the solution according to the invention, when a solvent is included, the solvent is removed after application, and a polymerizable liquid crystal layer, more specifically a polymerizable liquid crystal composition layer having a uniform film thickness is formed on the support substrate. Conditions for removing the solvent are not particularly limited. The solvent may be substantially removed, and drying may be performed until flow properties of the paint film of the polymerizable liquid crystal composition disappear. The solvent can be removed utilizing air drying at room temperature, drying by means of a hot plate, drying in a drying oven, blowing of warm air or hot air, or the like. Depending on kinds of compounds or composition ratios to be used for the polymerizable liquid crystal composition, nematic alignment of the polymerizable liquid crystal composition in the paint film may be occasionally completed in a process for drying the paint film. Therefore, the paint film through a drying step can be provided in a polymerization step without passing through a heat treatment step as described later.

With regard to temperature and time upon applying heat treatment of the paint film, a wavelength of light to be used for irradiation with light, an amount of light irradiated from a light source, or the like, preferred ranges are different depending on kinds of compounds and composition ratios to be used for the polymerizable liquid crystal composition, presence or absence of addition of a photopolymerization initiator, and an amount of addition of the initiator, or the like. Therefore, conditions of the temperature and the time upon applying the heat treatment of the paint film, the wavelength of light to be used for irradiation with light, the amount of light irradiated from the light source, or the like as described later represent generalities persistently.

The heat treatment of the paint film is preferably applied under conditions in which the solvent is removed and the uniform alignment properties of the polymerizable liquid crystal are obtained. The heat treatment may be applied at a liquid crystal phase transition temperature of the polymerizable liquid crystal composition, or higher. One example of the heat treatment methods includes a method for warming the paint film to a temperature at which the polymerizable liquid crystal composition shows a nematic liquid crystal phase to form nematic alignment in the polymerizable liquid crystal composition in the paint film. Nematic alignment may be formed by changing temperatures of the paint film within the temperature range in which the polymerizable liquid crystal composition shows the nematic liquid crystal phase. According to the method, the nematic alignment is substantially completed in the paint film by warning the paint film to a high-temperature region of the temperature range, and subsequently further ordered alignment is formed by decreasing the temperature. In a case where any of the heat treatment methods described above is employed, a heat treatment temperature is in the range of approximately room temperature to approximately 120° C. A preferred temperature is in the range of approximately room temperature to approximately 100° C. A further preferred temperature is in the range of approximately room temperature to approximately 90° C. A still further preferred temperature is in the range of approximately room temperature to approximately 80° C. Heat treating time is in the range of approximately 5 seconds to approximately 2 hours. Preferred time is in the range of approximately 10 seconds to approximately 40 minutes. Further preferred time is in the range of approximately 20 seconds to approximately 20 minutes. In order to increase a temperature of the layer including the polymerizable liquid crystal composition to a predetermined temperature, the heat treating time is preferably set to approximately 5 seconds or more. In order to avoid a decrease in productivity, the heat treating time is preferably set within approximately 2 hours. Thus, the polymerizable liquid crystal layer of the invention is obtained.

A nematic alignment state of the polymerizable liquid crystal compound as formed in the polymerizable liquid crystal layer is immobilized by polymerizing the polymerizable liquid crystal compound by irradiation with light. A wavelength of light used for irradiation with light is not particularly limited. An electron beam, ultraviolet light, visible light, infrared light (heat rays) or the like can be utilized. Ultraviolet light or visible light may be ordinarily used. A range of the wavelength is approximately 150 to approximately 500 nanometers. A preferred range is approximately 250 to approximately 450 nanometers, and a further preferred range is approximately 300 to approximately 400 nanometers. Examples of the light sources include a low-pressure mercury lamp (a bactericidal lamp, a fluorescent chemical lamp, a black light), a high-pressure discharge lamp (a high-pressure mercury lamp, a metal halide lamp), and a short arc discharge lamp (an ultra-high pressure mercury lamp, a xenon lamp, a mercury-xenon lamp). Preferred examples of the light sources include a metal halide lamp, a xenon lamp, an ultra-high pressure mercury lamp and a high-pressure mercury lamp. A wavelength region of an irradiation light source may be selected by installing a filter or the like between the light source and the polymerizable liquid crystal layer, and passing only a specific wavelength region through the filter or the like. An amount of light irradiated from the light source is in the range of approximately 2 to approximately 5,000 mJ/cm². A preferred range of the amount of light is approximately 10 to approximately 3,000 mJ/cm², and a further preferred range is approximately 100 to approximately 2,000 m J/cm². Temperature conditions during irradiation with light are preferably set in a manner similar to the heat treatment temperature as described above. Moreover, an atmosphere of a polymerization environment may include any of a nitrogen atmosphere, an inert gas atmosphere and an air atmosphere, but from a viewpoint of improving hardening properties, a nitrogen atmosphere or an inert gas atmosphere is preferred.

When the polymerizable liquid crystal layer of the invention and the liquid crystal film obtained by polymerizing the polymerizable liquid crystal compound with light, heat or the like is used for various kinds of optical devices, or when the layer or the film is applied to the optical compensation device to be used for the liquid crystal display unit, control of distribution of tilted angles in a thickness direction becomes significantly important.

One of the methods for controlling the tilted angle includes a method for adjusting kinds or composition ratios of liquid crystal compounds to be used for the polymerizable liquid crystal composition. The tilted angle can also be controlled by adding any other component to the polymerizable liquid crystal compound. The tilted angle in the liquid crystal film can also be controlled by kinds of solvents or a solute concentration in the polymerizable liquid crystal composition, kinds of surfactants to be added as one of other components and an amount of addition, or the like. The tilted angle in the liquid crystal film can also be controlled by kinds or rubbing conditions of support substrates or polymer coating films, drying conditions or heat treatment conditions of the paint film of the polymerizable liquid crystal composition, or the like. Furthermore, an irradiation atmosphere or temperature during irradiation in a photopolymerization step after alignment, or the like also influences the tilted angle in the liquid crystal film. More specifically, almost all of conditions in processes for manufacturing the liquid crystal film may be considered to influence the tilted angle in any way. Therefore, an arbitrary tilted angle can be formed by optimizing the polymerizable liquid crystal composition and also appropriately selecting terms and conditions of processes for manufacturing the liquid crystal film.

In homeotropic alignment, the tilted angles are uniformly distributed in the range of approximately 85 degrees to approximately 90 degrees from a substrate interface to a free interface. The alignment state is obtained by forming onto the support substrate surface the paint film of the polymerizable liquid crystal composition of the invention to which component (C) is added. In order to obtain the uniform homeotropic alignment in the invention, as described above, a ratio of use of component (C) is preferably adjusted in the range of approximately 0.01 to approximately 0.20, in a weight ratio based on the total weight of component (A), component (B) and component (D). A further preferred ratio is in the range of approximately 0.03 to approximately 0.15. Preferred examples of compound (3) include compound (3-1-1) (n=1 or 2), compound (3-2-1) (n=1 to 3), compound (3-2-2) (n=1 to 3), compound (3-3-1) (n=1 or 2) and compound (3-6-1).

In order to obtain the uniform homeotropic alignment, a plurality of kinds of compound (3) being component (C) may be simultaneously used. Component (C) can be directly added to the polymerizable liquid crystal composition or after component (C) is diluted with a solvent or the like. Moreover, depending on kinds of polymerizable liquid crystal compounds, or composition formulations of the polymerizable liquid crystal composition, formation of the uniform homeotropic alignment may be occasionally hard even according to the method described above. In such a case, homogeneous alignment properties or tilted alignment properties are considered to be strong. Therefore, the uniform homeotropic alignment is obtained by optimization such as increasing an amount of addition of component (C) or decreasing the polymerizable liquid crystal compound to a minimum amount of the compound required. If a surface of the support substrate has polarity by hydrophilic treatment or the like in such homeotropic alignment, further uniform homeotropic alignment can be obtained. Moreover, even if the surface treatment by rubbing or the like is not applied, such further uniform homeotropic alignment can be obtained.

On the other hand, when a homeotropic alignment agent is formed on the support substrate, specific examples include utilization of a silane coupling agent such as octadecyltriethoxysilane, lecithin, a chromium complex, a polyimide alignment film for homeotropic alignment, a calcinated film a polyamic acid alignment film at a low temperature (lower than 180° C.), a calcinated film of the polyamic acid alignment film at a high temperature (180° C. or higher) or a water-soluble silsesquioxane film. Furthermore, the tilted angle can be controlled by using an electric field, a magnetic field or the like.

Uniformity of each of alignment embodiments described above in the liquid crystal film may be occasionally improved by appropriately selecting a structure of the polymerizable liquid crystal compound to be used. In the invention, the uniformity is recognized to be stably obtained when a monofunctional polymerizable liquid crystal compound has cyano at a mesogen terminal group. Among the types of compounds, preferred compounds include compound (2-1-2), compound (2-1-3), compound (2-1-4), compound (2-1-5), compound (2-1-8) and compound (2-1-9).

With regard to a thickness of the liquid crystal film, a suitable thickness is different depending on retardation or birefringence of the liquid crystal film, according to a target device. Therefore, although the range cannot be strictly determined, a preferred thickness of the liquid crystal film is in the range of approximately 0.05 to approximately 50 micrometers. Then, a further preferred thickness is in the range of approximately 0.1 to approximately 20 micrometers, and a still further preferred thickness is in the range of approximately 0.5 to approximately 10 micrometers. A preferred haze value of the liquid crystal film is in the range of approximately 1.5% or less, and preferred transmittance is in the range of approximately 80% or more. A further preferred haze value is in the range of approximately 1.0% or less, and further preferred transmittance is in the range of approximately 95% or more. Transmittance preferably satisfies the conditions in a visible light region.

The liquid crystal film is effective as an optical compensation device to be applied to the liquid crystal display device (in particular, an active matrix mode and passive matrix mode liquid crystal display device). Examples of modes of the liquid crystal display device suitable for using the liquid crystal film as an optical compensation film include an in-plane switching (IPS) mode, an optically compensated birefringence (OCB) mode, a twisted nematic (TN) mode, a super-twisted nematic (STN) mode, an electrically controlled birefringence (ECB) mode, a deformation of aligned phases (DAP) mode, a color super homeotropic (CSH) mode, a vertically aligned nematic/vertically aligned cholesteric (VAN/VAC) mode, an optical modal interference (OMI) mode and a super birefringence effect (SBE) mode. Furthermore, the liquid crystal film can also be used as a phase retarder for a display device for a guest-host mode, a ferroelectric mode, an antiferroelectric mode, or the like. In addition, optimum values of parameters such as a distribution of tilted angles in a thickness direction, or a thickness required for the liquid crystal film are different depending on kinds of devices because the optimum values strongly depend on kinds of liquid crystal display devices to be compensated, and optical parameters thereof.

The liquid crystal film can also be used as an optical device integrated with the polarizing plate or the like, and in the case, the liquid crystal film is arranged outside the liquid crystal cell. However, the liquid crystal film as the optical compensation device can also be arranged inside the liquid crystal cell due to no elution or only a small elution of an impurity to a liquid crystal filled in the cell. For example, if a method disclosed in JP 2005-1652338 A is applied, a liquid crystal display composition in which an optical compensation layer is formed on a color filter can be obtained. A liquid crystal film to which the dichroic dye is added has polarization characteristics. Therefore, for example, if a method disclosed in JP 2005-215335 A is applied, the liquid crystal film can be used as a visible angle control member.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereinafter, the invention will be explained in detail by way of Examples, but the invention is not limited to the Examples. Evaluation methods in Examples will be shown below.

Polymerization Conditions

Under a nitrogen atmosphere, irradiation was made for 30 seconds by using light having intensity of 30 mW/cm$^2$ (365 nm) using a 250 W ultra-high pressure mercury lamp (made by Ushio Inc.) at room temperature.

Confirmation of a Liquid Crystal Alignment State

When a substrate with a liquid crystal film obtained is interposed between two polarizing plates arranged in a crossed nicol configuration, and if the substrate was confirmed to be in a dark field when observed from a front side, and to be in a bright field when observed from four directions, a liquid crystal was judged to be in homeotropic alignment because an alignment vector of a liquid crystal compound shows to be perpendicular to a glass substrate. With regard to uniformity of homeotropic alignment, when two polarizing plates were arranged in a crossed nicol state, a substrate with a liquid crystal film was put between the plates, and observed from a front side, a case where no light escape originating in an alignment defect of a liquid crystal was confirmed (dark field) was described as a state of uniform alignment. As the support substrate, a plastic film was used. Then, the plastic film was obtained by forming a paint film of a polymerizable liquid crystal composition onto the support substrate to allow alignment, and polymerization was performed under the polymerization conditions described above.

Compounds used in Examples are shown below.

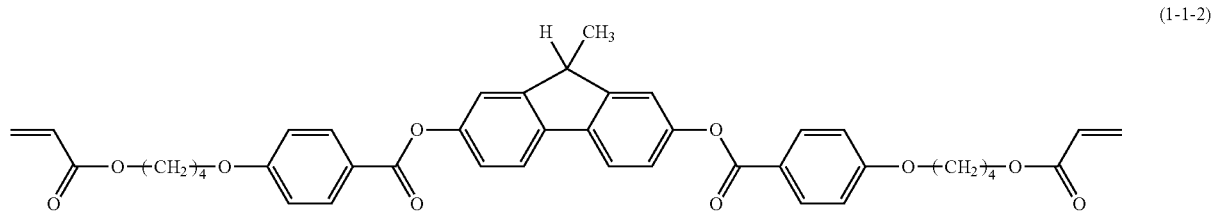
(1-1-2)

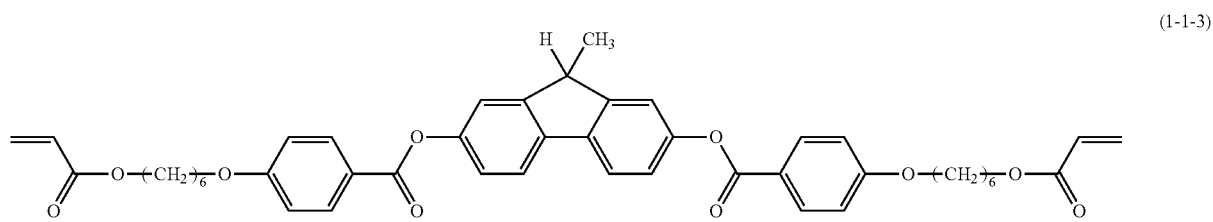
(1-1-3)

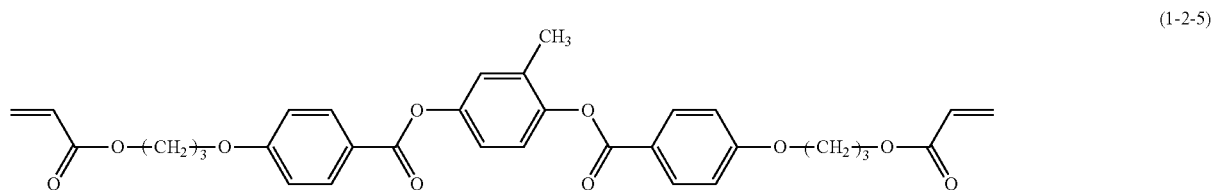
(1-2-5)

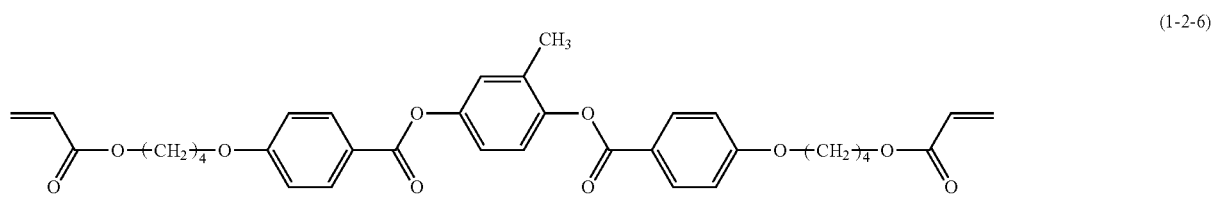
(1-2-6)

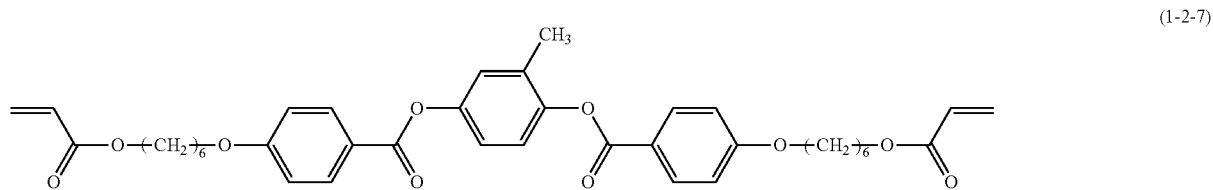
(1-2-7)

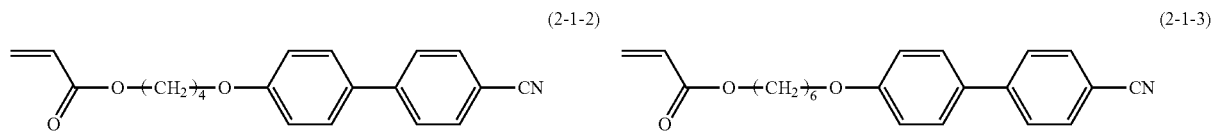
(2-1-2)   (2-1-3)

As compound (3), compounds as described below were used.

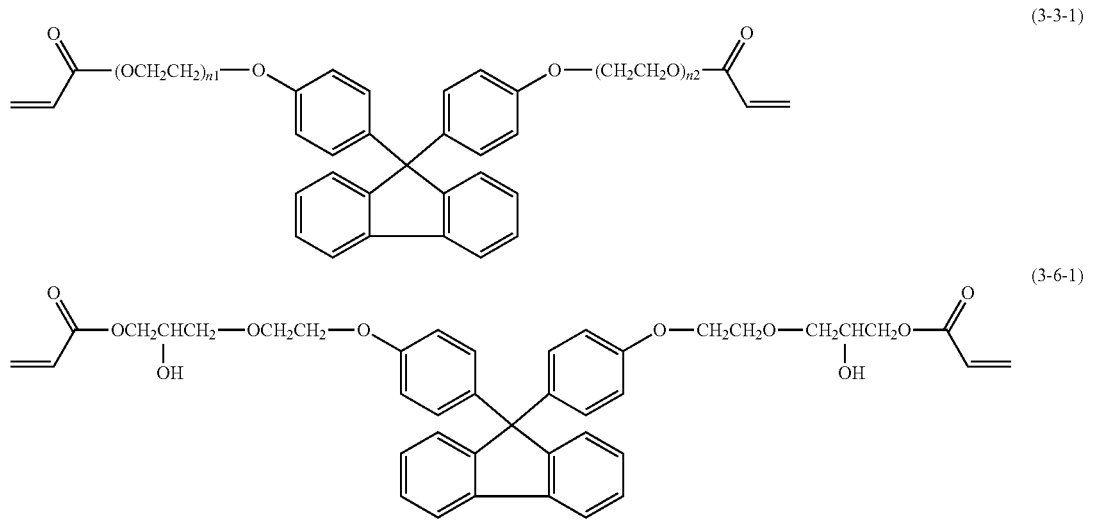

Compound (1-1-2) and (1-1-3) were prepared by the method described in JP 2003-238491 A (JP 4036076 B).

As compound (1-2-5), ST03021 made by Synthon Chemicals GmbH & Co. KG was used.

Compounds (1-2-6) and (1-2-7) were prepared in a manner similar to the operations described in Makromol. Chem., 190, 3201-3215 (1998).

Compounds (2-1-2) and (2-1-3) were prepared in a manner similar to the operations described in Macromolecules, 26, 6132-6134 (1993).

As compound (3-3-1), OGSOL (registered trade name) EA-0500 (n1+n2=5) and EA-0200 (n1+n2=2) were used, and as compound (3-6-1), ONF-1 was used.

Moreover, GA-1000 was used as a compound having a diepoxyacrylate moiety. Any of the compounds is a commercial item made by Osaka Gas Chemicals Co., Ltd.

Example 1

Preparation of Polymerizable Liquid Crystal Composition (1)

Compound (1-1-3), compound (1-2-7) and compound (2-1-3) were mixed at a weight ratio of compound (1-1-3):compound (1-2-7):compound (2-1-3)=33:33:34. The mixture was designated as MIX1. To the MIX1, GA-1000 at a weight ratio of 0.10, 2-hydroxyethyl methacrylate at a weight ratio of 2.00, and a polymerization initiator IRGACURE (registered trade name) 907 at a weight ratio of 0.06 were added, and the mixture was designated as polymerizable liquid crystal composition (1). Here, MIX1, various kinds of additives, and 2-hydroxyethyl methacrylate were uniformly compatibilized to form a liquid state.

As a support substrate, a film (thickness: 10 micrometers) of cycloolefin resin (ARTON (a registered trade name, made by JSR Corporation)) was used. On the support substrate, polymerizable liquid crystal composition (1) was applied according to spin coating, the support substrate was heated at 80° C. for 1 minute, and cooled at room temperature for 1 minute to uniformize alignment. A paint film obtained was polymerized by irradiation with ultraviolet light in atmospheric air, and thus a liquid crystal film was obtained. The liquid crystal film was in homeotropic alignment because the substrate was in a dark field when observed from a front side, and in a bright field when observed from four directions, under a polarizing plate crossed nicol configuration. Moreover, even when the substrate was observed from a front side, no light escape was observed and the substrate was in a dark field, and therefore uniform alignment was yielded.

Example 2

When a polymerizable liquid crystal film was prepared and alignment was evaluated in a manner similar to the operations in Example 1 except that compound (1-1-2), compound (1-2-6) and compound (2-1-3) were mixed at a weight ratio of compound (1-1-2):compound (1-2-6):compound (2-1-3)=33:33:34, the polymerizable liquid crystal film is found to be in uniform homeotropic alignment.

Example 3

When a polymerizable liquid crystal film was prepared and alignment was evaluated in a manner similar to the operations in Example 1 except that compound (1-1-3), compound (1-2-5) and compound (2-1-2) were mixed at a weight ratio of compound (1-1-3):compound (1-2-5):compound (2-1-2)=33:33:34, the polymerizable liquid crystal film is found to be in uniform homeotropic alignment.

Example 4

When a polymerizable liquid crystal film was prepared and alignment was evaluated in a manner similar to the operations in Example 1 except that EA-0200 was used in place of GA-1000 described in Example 1, the polymerizable liquid crystal film is found to be in uniform homeotropic alignment.

Example 5

When a polymerizable liquid crystal film was prepared and alignment was evaluated in a manner similar to the operations in Example 1 except that EA-0500 was used in place of GA-1000 described in Example 1, the polymerizable liquid crystal film is found to be in uniform homeotropic alignment.

Example 6

When a polymerizable liquid crystal film was prepared and alignment was evaluated in a manner similar to the operations in Example 1 except that compound (3-6-1) was used in place of GA-1000 described in Example 1, the polymerizable liquid crystal film is found to be in uniform homeotropic alignment.

Example 7

When a polymerizable liquid crystal film was prepared and alignment was evaluated in a manner similar to the operations in Example 1 except that compound (1-1-3) and compound (2-1-3) were mixed at a weight ratio of compound (1-1-3):compound (2-1-3) 65:35, the polymerizable liquid crystal film is found to be in uniform homeotropic alignment.

Example 8

Compound (1-1-3) and compound (2-1-3) were mixed at a weight ratio of compound (1-1-3):compound (2-1-3)=65:35. The mixture was designated as MIX2. To the MIX2, GA-1000 at a weight ratio of 0.10, 2-acryloyloxyethyl succinate (LIGHT ACRYLATE HOA-MS (N), made by Kyoeisha Chemical Co., Ltd.) at a weight ratio of 0.10, a polymerization initiator IRGACURE (registered trade name) 907 at a weight ratio of 0.05 and cyclohexanone at a weight ratio of 3.00 were added, and the mixture was designated as polymerizable liquid crystal composition (2). Here, MIX2, various kinds of additives, and 2-hydroxyethyl succinate were uniformly compatibilized to form a liquid state.

As a support substrate, a film (thickness: 60 micrometers) of cycloolefin resin (ZEONOR (registered trade name), made by Zeon Corporation)) as being subjected to corona treatment (contact angle of pure water: 45°) was used. On the support substrate, polymerizable liquid crystal composition (2) was applied according to spin coating, the support substrate was heated at 80° C. for 1 minute, and cooled at room temperature for 1 minute to uniformize alignment. A paint film obtained was polymerized by irradiation with ultraviolet light in atmospheric air, and thus a liquid crystal film was obtained. The liquid crystal film was in homeotropic alignment because the substrate was in a dark field when observed from a front side, and in a bright field when observed from four directions, under a polarizing plate crossed nicol configuration. Moreover, even when the substrate was observed from a front side, no light escape was observed and the substrate was in a dark field, and therefore the polymerizable liquid crystal film was in uniform homeotropic alignment. Next, when the polymerizable liquid crystal film obtained was incised in a cross cut with a cutter, and adhesion was evaluated by adhering Scotch tape to the polymerizable liquid crystal film and peeling the tape from the film, no peeling of the polymerizable liquid crystal film from the support substrate was observed, and adhesion is found to be favorable.

Example 9

When a polymerizable liquid crystal film was prepared and alignment was evaluated in a manner similar to the operations in Example 8 except that glycerol methacrylate (BLEMMER (registered trade name) GLM, made by NOF Corporation) was used in place of 2-acryloyloxyethyl succinate described in Example 8, the polymerizable liquid crystal film is found to be in uniform homeotropic alignment. Moreover, adhesion with the support substrate was also favorable.

Example 10

When a polymerizable liquid crystal film was prepared and alignment was evaluated in a manner similar to the operations in Example 8 except that 2-acryloyloxyethyl acid phosphate (LIGHT ACRYLATE P-1A(N), made by Kyoeisha Chemical Co., Ltd.) was used in place of 2-acryloyloxyethyl succinnate described in Example 8, the polymerizable liquid crystal film is found to be in uniform homeotropic alignment. Moreover, adhesion with the support substrate was also favorable.

Example 11

When a polymerizable liquid crystal film was prepared and alignment was evaluated in a manner similar to the operations in Example 8 except that 4-(6-acryloyloxy-n-hexy-1-yloxy) benzoic acid (ST00902, made by Synthon Chemicals GmbH & Co. KG) was used in place of 2-acryloyloxyethyl succinnate described in Example 8, the polymerizable liquid crystal film is found to be in uniform homeotropic alignment. Moreover, adhesion with the support substrate was also favorable.

Comparative Example 1

Preparation of a polymerizable liquid crystal film was tried in a manner similar to the operations in Example 1 except that cyclopentanone being an ordinary organic solvent was used in place of 2-hydroxyethyl methacrylate in MIX1 described in Example 1, but a support substrate was dissolved by cyclopentanone, and thus evaluation was difficult.

Comparative Example 2

Preparation of a polymerizable liquid crystal film was tried in a manner similar to the operations in Example 1 except that 2-propanol being an ordinary organic solvent was used in place of 2-hydroxyethyl methacrylate in MIX1 described in Example 1, but a polymerizable liquid crystal compound precipitated without being compatibilized due to poor compatibility with 2-propanol, and thus evaluation was difficult.

Comparative Example 3

Preparation of a polymerizable liquid crystal film was tried in a manner similar to the operations in Example 1 except that 1,6-hexanediol diacrylate being a bifunctional monomer having no hydroxyl group was used in place of 2-hydroxyethyl methacrylate in MIX1 described in Example 1, but a support substrate was dissolved by 1,6-hexanediol diacrylate, and thus evaluation was difficult.

Comparative Example 4

Preparation of a polymerizable liquid crystal film was tried in a manner similar to the operations in Example 1 except that benzyl methacrylate being a monofunctional monomer having no hydroxyl group was used in place of 2-hydroxyethyl methacrylate in MIX1 described in Example 1, but a support substrate was dissolved, and thus evaluation was difficult.

Comparative Example 5

A polymerizable liquid crystal film was prepared in a manner similar to the operations in Example 8 except that compound (E) having a functional group including a hydroxyl group was not used in polymerizable liquid crystal composition (2) described in Example 8. A support substrate was dissolved, and thus evaluation was difficult. When alignment was evaluated, the polymerizable liquid crystal film was in uniform homeotropic alignment, but adhesion with the support substrate was not good because peeling was confirmed.

The results in Examples and Comparative Examples as described above show that, with regard to the liquid crystal film obtained from the polymerizable liquid crystal composition of the invention, even if the support substrate has a significantly low solvent resistance, the support substrate was not damaged, and a liquid crystal film having uniform homeotropic alignment is obtained. Moreover, when the compound having the functional group including the hydroxyl group is added, adhesion with the support substrate is found to be improved.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

When a polymerizable liquid crystal composition of the invention is used, a support substrate is not damaged even if the support substrate has a low solvent resistance, and an excellent liquid crystal film having uniform homeotropic alignment properties can be obtained. Moreover, adhesion of the liquid crystal film with the support substrate is also improved.

What is claimed is:

1. A polymerizable liquid crystal composition comprising:

component (A) which is at least one compound selected from the group of compounds represented by each of formula (1-1), formula (1-2) and formula (1-3), component (B) which is at least one compound selected from the group of compounds represented by each of formula (2-1), formula (2-2) and formula (2-3), component (C) which is at least one compound selected from the group of compounds represented by each of formula (3-1) to formula (3-6), component (E) which is a non-liquid crystalline polymerizable compound having a functional group including a hydroxyl group, and having an acryloyl group or a methacryloyl group in one molecule, and optionally comprising component (D) which is at least one compound selected from the group of compounds represented by each of formula (4-1) and formula (4-2):

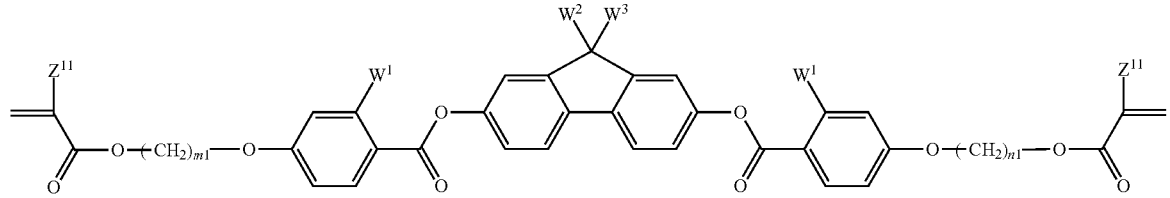
(1-1)

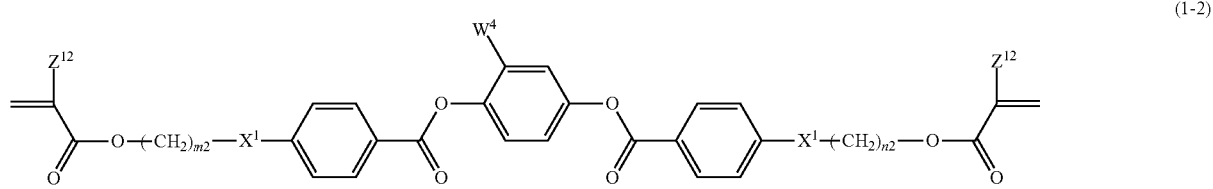
(1-2)

(a)

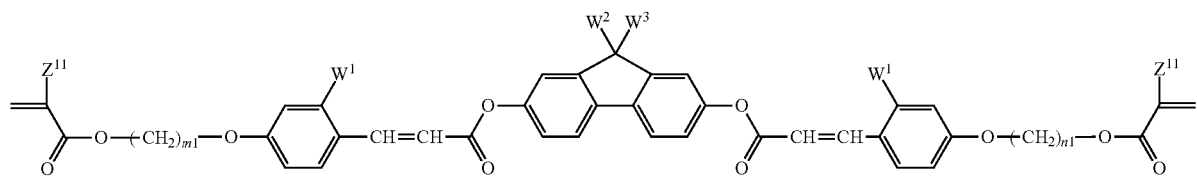
(1-3)

wherein, $Z^{11}$ is independently hydrogen, fluorine, methyl or trifluoromethyl; $W^1$ is independently hydrogen or fluorine; $W^2$ and $W^3$ are independently hydrogen or methyl; $Z^{12}$ is independently hydrogen, fluorine, methyl or trifluoromethyl; $W^4$ is hydrogen, methyl, straight-chain alkyl having 1 to 7 carbons, branched alkyl having 1 to 7 carbons, alkoxycarbonyl (—COOR$^a$; wherein R$^a$ is straight-chain alkyl having 1 to 7 carbons) or alkylcarbonyl (—COR$^b$; wherein R$^b$ is straight-chain alkyl having 1 to 15 carbons); $X^1$ is independently —O— or a group represented by formula (a); and m1, m2, n1 and n2 are independently an integer from 2 to 15;

-continued

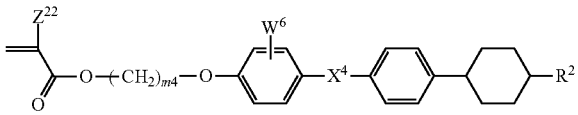
(2-3)

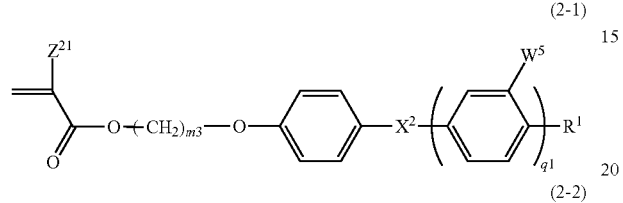
(2-1)

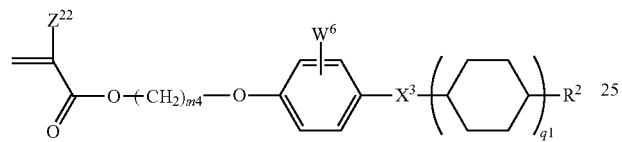
(2-2)

wherein, $Z^{21}$ is hydrogen or methyl; $R^1$ is cyano, trifluoromethoxy, alkyl having 1 to 10 carbons or alkoxy having 1 to 10 carbons; $W^5$ is hydrogen or fluorine; $X^2$ is a single bond, —COO— or —OCO—; m3 is an integer from 2 to 15; $Z^{22}$ is hydrogen or methyl; m4 is an integer from 2 to 15; $W^6$ is hydrogen, fluorine or methoxy; $X^3$ is a single bond, —COO—, —OCO—, —CH$_2$CH$_2$—COO— or —CH═CH—COO—, q1 is 1 or 2, and $R^2$ is alkyl having 1 to 10 carbons; and $X^4$ is —COO—, —OCO—, —CH$_2$CH$_2$—COO— or —CH═CH—COO—;

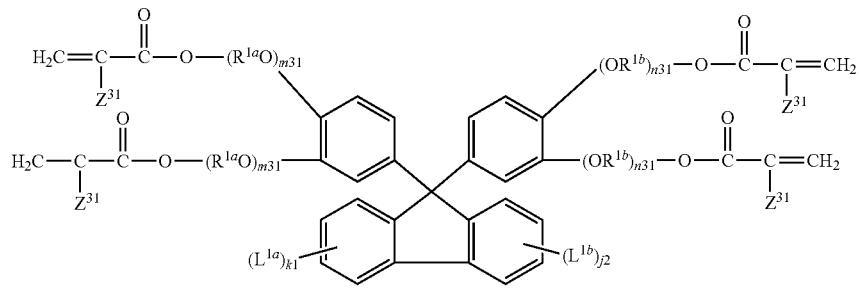
(3-1)

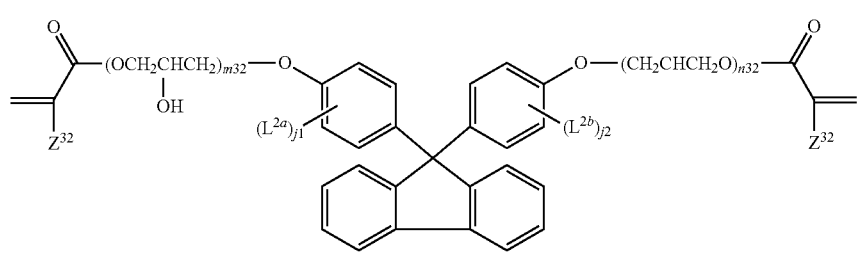
(3-2)

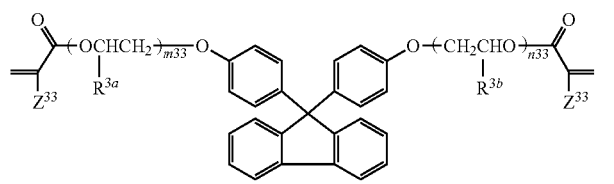
(3-3)

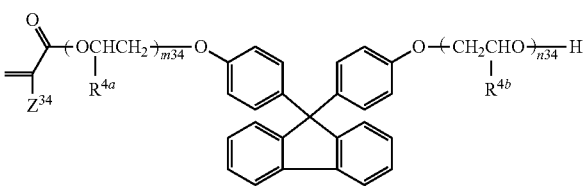
(3-4)

-continued

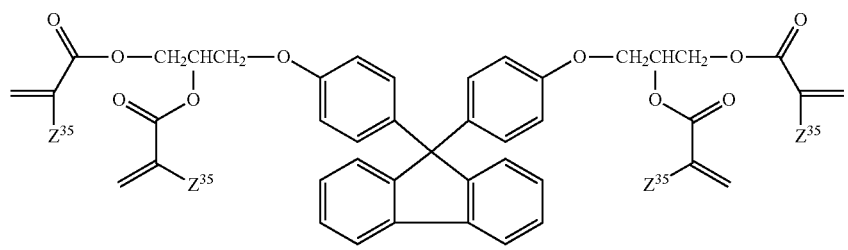

(3-5)

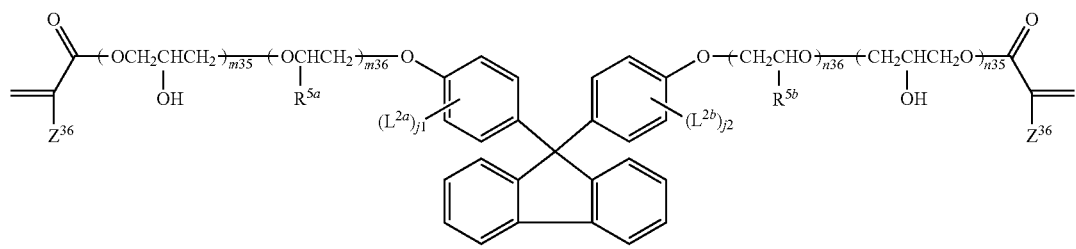

(3-6)

wherein, in formula (3-1), $L^{1a}$ and $L^{1b}$ are independently alkyl having 1 to 4 carbons; $R^{1a}$ and $R^{1b}$ are independently alkylene having 2 to 4 carbons; $Z^{31}$ is independently hydrogen or methyl; k1 and k2 are independently an integer from 0 to 4; and m31 and n31 are independently an integer from 0 to 6;

in formula (3-2), $Z^{32}$ is independently hydrogen or methyl; m32 and n32 are independently an integer from 1 to 3; $L^{2a}$ and $L^{2b}$ are independently alkyl having 1 to 6 carbons, phenyl or fluorine; and j1 and j2 are independently an integer from 0 to 4;

in formula (3-3), $Z^{33}$ is independently hydrogen or methyl; $R^{3a}$ and $R^{3b}$ are independently hydrogen, methyl or ethyl; and m33 and n33 are independently an integer from 0 to 3;

in formula (3-4), $Z^{34}$ is hydrogen or methyl; $R^{4a}$ and $R^{4b}$ are independently hydrogen or alkyl having 1 to 6 carbons; and m34 and n34 are independently an integer from 0 to 10;

in formula (3-5), $Z^{35}$ is independently hydrogen or methyl; and in formula (3-6), $Z^{36}$ is independently hydrogen or methyl; $R^{5a}$ and $R^{5b}$ are independently hydrogen or alkyl having 1 to 6 carbons; $L^{2a}$ and $L^{2b}$ are independently alkyl having 1 to 6 carbons, phenyl or fluorine; j1 and j2 are independently an integer from 0 to 4; m35 and n35 are independently an integer from 1 to 3; and m36 and n36 are independently an integer from 1 to 3;

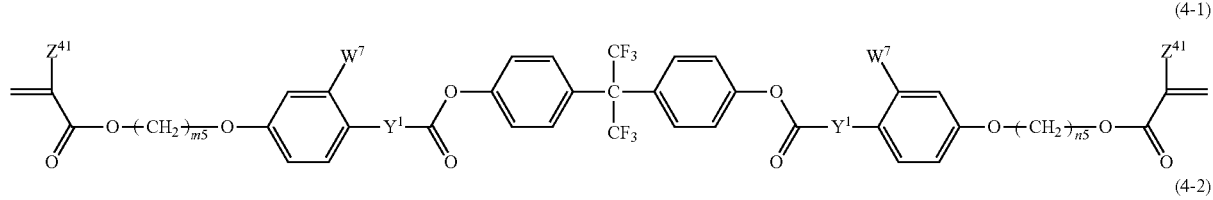

(4-1)

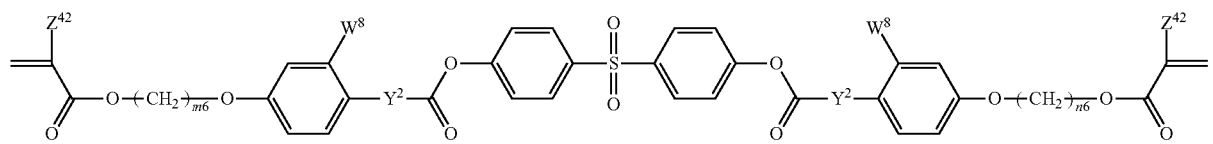

(4-2)

wherein, $Z^{41}$ and $Z^{42}$ are independently hydrogen or methyl; $Y^1$ and $Y^2$ are independently a single bond, $-(CH_2)_2-$ or $-CH=CH-$; $W^7$ and $W^8$ are independently hydrogen or fluorine; and m5, m6, n5 and n6 are independently an integer from 2 to 15; and wherein component (E) is butanediol monoacrylate, a reaction product between butyl glycidyl ether and (meth)acrylic acid, 3-chloro-2-hydroxypropyl methacrylate, glycerol methacrylate, glycerol acrylate, glycerol dimethacrylate, glycerol triacrylate, 2-hydroxyethyl acrylate, 2-hydroxyethyl methacrylate, 2-hydroxypropyl acrylate, 2-hydroxypropyl methacrylate, caprolactone-modified 2-hydroxyethyl acrylate, caprolactone-modified 2-hydroxyethyl methacrylate, phenoxyhydroxypropyl acrylate, 2-hydroxy-3-acryloyloxypropyl methacrylate, bispropenoic acid [1,6-hexanediylbis[oxy(2-hydroxy-3,1-propanediyl)]]ester, triglycerol diacrylate, pentaerythritol tri(meth)acrylate, dipentaerythritolmonohydroxy penta(meth)acrylate, polyethylene glycol mono(meth)acrylate having a polymerization degree of 2 to 20, polypropylene glycol mono(meth)acrylate having a polymerization degree of 2 to 20, poly(ethylene glycol-propylene glycol)mono (meth)acrylate, polyethylene glycol-polypropylene glycol mono(meth)acrylate, poly(ethylene glycol-tetramethylene glycol)mono(meth)acrylate, poly(propylene optionally comprising component (D) which is at least one compound selected from the group of compounds represented by each of formula (4-1) and formula (4-2);

(1-1)

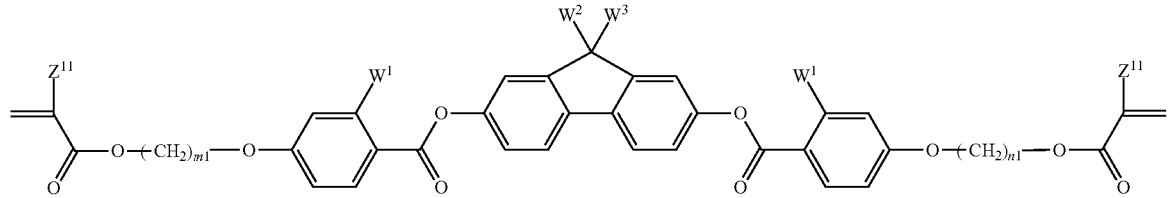

(1-2)

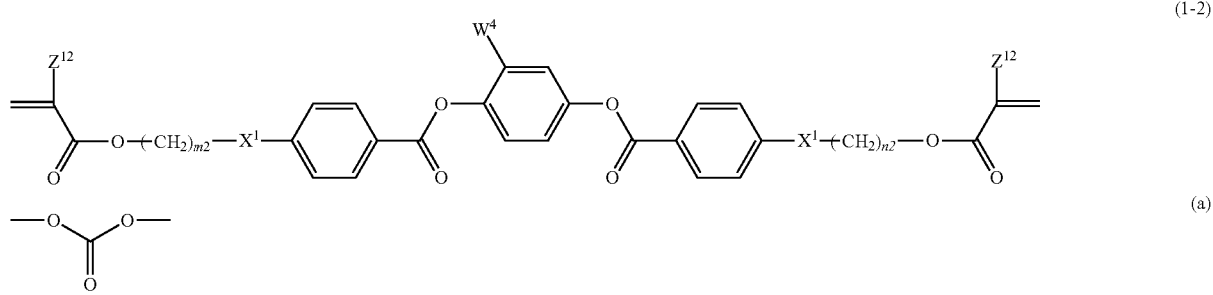

(a)

glycol-tetramethylene glycol)mono(meth)acrylate, propylene glycol polybutylene glycol mono(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloyloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyethy-1-yloxy)benzoic acid, 4-(3-acryloyloxy-n-prop-1-yloxy)benzoic acid, 4-(2-methacryloyloxyethy-1-yloxy)benzoic acid, 4-(4-acryloyloxy-n-buty-1-yloxy)benzoic acid, 4-(6-acryloyloxy-n-hexy-1-yloxy)benzoic acid, 4-(6-acryloyloxy-n-hexy-1-yloxy)-2-methylbenzoic acid, 4-(6-methacryloyloxy-n-hexy-1-yloxy)benzoic acid, 4-(10-acryloyloxy-n-deci-1-yloxy)benzoic acid, 2-acryloyloxyethyl acid phosphate and 2-methacryloyloxyethyl acid phosphate.

2. A polymerizable liquid crystal composition comprising:

component (A) which is at least one compound selected from the group of compounds represented by each of formula (1-1) and formula (1-2), component (B) which is at least one compound selected from the group of compounds represented by each of formula (2-1) and formula (2-2), component (C) which is at least one compound selected from the group of compounds represented by each of formula (3-1) to formula (3-6), component (E) which is a non-liquid crystalline polymerizable compound having a functional group including a hydroxyl group, and having an acryloyl group or a methacryloyl group in one molecule, and wherein, $Z^{11}$ is independently hydrogen, fluorine, methyl or trifluoromethyl; $W^1$ is independently hydrogen or fluorine; $W^2$ and $W^3$ are independently hydrogen or methyl; $Z^{12}$ is independently hydrogen, fluorine, methyl or trifluoromethyl; $W^4$ is hydrogen or methyl; $X^1$ is independently —O— or a group represented by formula (a); and m1, m2, n1 and n2 are independently an integer from 2 to 15;

(2-1)

(2-2)

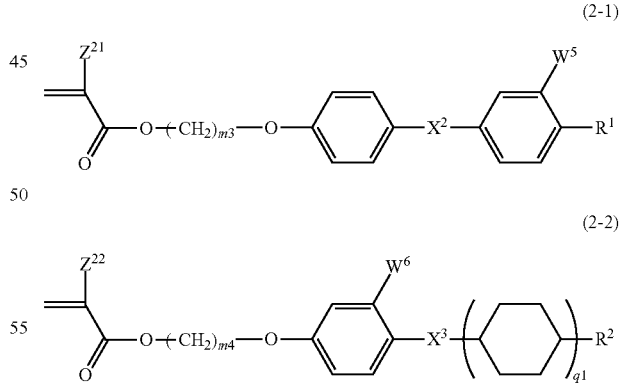

wherein, $Z^{21}$ is hydrogen or methyl; $R^1$ is cyano, trifluoromethoxy, alkyl having 1 to 10 carbons or alkoxy having 1 to 10 carbons; $W^5$ is hydrogen or fluorine; $X^2$ is a single bond, —COO— or —OCO—; m3 is an integer from 2 to 15; $Z^{22}$ is hydrogen or methyl; m4 is an integer from 2 to 15; $W^6$ is hydrogen or fluorine; and $X^3$ is a single bond, —COO—, —OCO—, —CH$_2$CH$_2$—COO— or —CH=CH—COO—, q1 is 1 or 2, and $R^2$ is alkyl having 1 to 10 carbons;

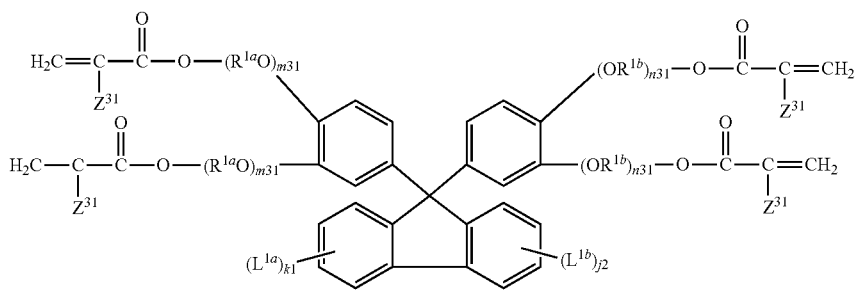
(3-1)

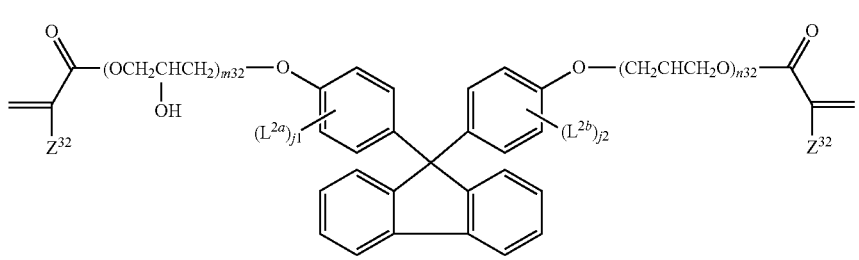
(3-2)

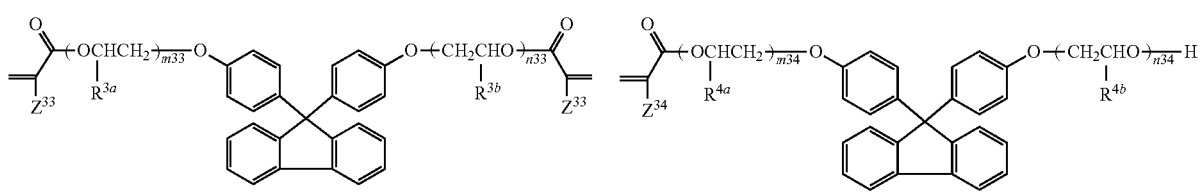
(3-3)        (3-4)

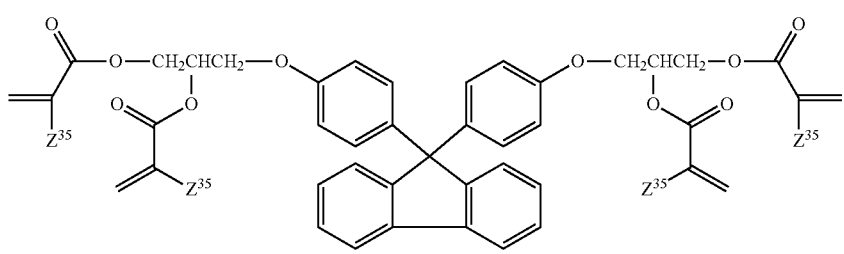
(3-5)

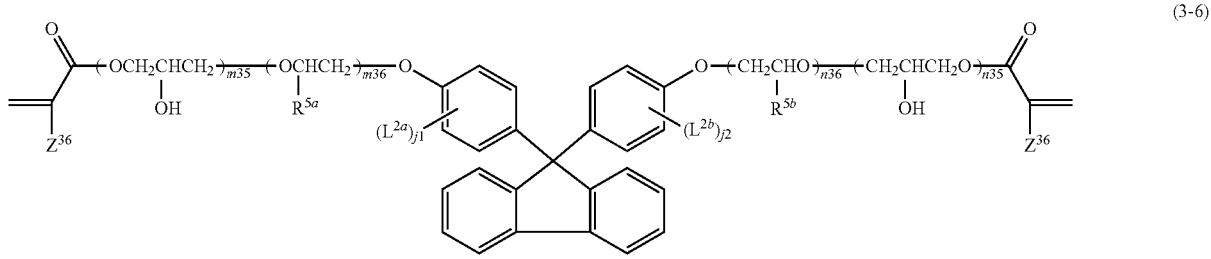
(3-6)

wherein, in formula (3-1), $L^{1a}$ and $L^{1b}$ are independently alkyl having 1 to 4 carbons; $R^{1a}$ and $R^{1b}$ are independently alkylene having 2 to 4 carbons; $Z^{31}$ is independently hydrogen or methyl; k1 and k2 are independently an integer from 0 to 4; and m31 and n31 are independently an integer from 0 to 6;

in formula (3-2), $Z^{32}$ is independently hydrogen or methyl; m32 and n32 are independently an integer from 1 to 3; $L^{2a}$ and $L^{2b}$ are independently alkyl having 1 to 6 carbons, phenyl or fluorine; and j1 and j2 are independently an integer from 0 to 4;

in formula (3-3), $Z^{33}$ is independently hydrogen or methyl; $R^{3a}$ and $R^{3b}$ are independently hydrogen, methyl or ethyl; and m33 and n33 are independently an integer from 0 to 3;

in formula (3-4), $Z^{34}$ is hydrogen or methyl; $R^{4a}$ and $R^{4b}$ are independently hydrogen or alkyl having 1 to 6 carbons; and m34 and n34 are independently an integer from 0 to 10;

in formula (3-5), $Z^{35}$ is independently hydrogen or methyl; and in formula (3-6), $Z^{36}$ is independently hydrogen or methyl; $R^{5a}$ and $R^{5b}$ are independently hydrogen or alkyl having 1 to 6 carbons; $L^{2a}$ and $L^{2b}$ are independently alkyl having 1 to 6 carbons, phenyl or fluorine; j1 and j2 are independently an integer from 0 to 4; m35 and n35 are independently an integer from 1 to 3; and m36 and n36 are independently an integer from 1 to 3;

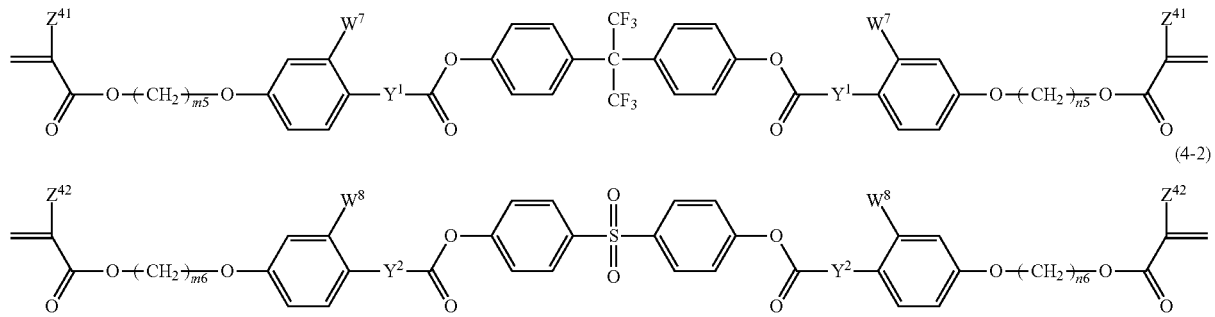

wherein, $Z^{41}$ and $Z^{42}$ are independently hydrogen or methyl; $Y^1$ and $Y^2$ are independently a single bond, —$(CH_2)_2$— or —CH=CH—; $W^7$ and $W^8$ are independently hydrogen or fluorine; and m5, m6, n5 and n6 are independently an integer from 2 to 15; and wherein component (E) is butanediol monoacrylate, a reaction product between butyl glycidyl ether and (meth) acrylic acid, 3-chloro-2-hydroxypropyl methacrylate, glycerol methacrylate, glycerol acrylate, glycerol dimethacrylate, glycerol triacrylate, 2-hydroxyethyl acrylate, 2-hydroxyethyl methacrylate, 2-hydroxypropyl acrylate, 2-hydroxypropyl methacrylate, caprolactone-modified 2-hydroxyethyl acrylate, caprolactone-modified 2-hydroxyethyl methacrylate, phenoxyhydroxypropyl acrylate, 2-hydroxy-3-acryloyloxypropyl methacrylate, bispropenoic acid [1,6-hexanediylbis[oxy(2-hydroxy-3,1-propanediyl)]]ester, triglycerol diacrylate, pentaerythritol tri(meth)acrylate, dipentaerythritolmonohydroxy penta(meth)acrylate, polyethylene glycol mono(meth)acrylate having a polymerization degree of 2 to 20, polypropylene glycol mono(meth)acrylate having a polymerization degree of 2 to 20, poly(ethylene glycol-propylene glycol)mono (meth)acrylate, polyethylene glycol-polypropylene glycol mono(meth)acrylate, poly(ethylene glycol-tetramethylene glycol)mono(meth)acrylate, poly(propylene glycol-tetramethylene glycol)mono(meth)acrylate, propylene glycol polybutylene glycol mono(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloyloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyethy-1-yloxy)benzoic acid, 4-(3-acryloyloxy-n-prop-1-yloxy)benzoic acid, 4-(2-methacryloyloxyethy-1-yloxy)benzoic acid, 4-(4-acryloyloxy-n-buty-1-yloxy)benzoic acid, 4-(6-acryloyloxy-n-hexy-1-yloxy) benzoic acid, 4-(6-acryloyloxy-n-hexy-1-yloxy)-2-methylbenzoic acid, 4-(6-methacryloyloxy-n-hexy-1-yloxy)benzoic acid, 4-(10-acryloyloxy-n-deci-1-yloxy) benzoic acid, 2-acryloyloxyethyl acid phosphate and 2-methacryloyloxyethyl acid phosphate.

3. The polymerizable liquid crystal composition according to claim 1, wherein component (E) is butanediol monoacrylate, a reaction product between butyl glycidyl ether and (meth)acrylic acid, 3-chloro-2-hydroxypropyl methacrylate, glycerol methacrylate, glycerol acrylate, glycerol dimethacrylate, glycerol triacrylate, 2-hydroxyethyl acrylate, 2-hydroxyethyl methacrylate, 2-hydroxypropyl acrylate, 2-hydroxypropyl methacrylate, caprolactone-modified 2-hydroxyethyl acrylate, caprolactone-modified 2-hydroxyethyl methacrylate, phenoxyhydroxypropyl acrylate, 2-hydroxy-3-acryloyloxypropyl methacrylate or bispropenoic acid [1,6-hexanediylbis[oxy(2-hydroxy-3,1-propanediyl)]]ester.

4. The polymerizable liquid crystal composition according to claim 1, wherein, in formula (1-1), formula (1-2) and formula (1-3), $Z^{11}$ is independently hydrogen, fluorine, methyl or trifluoromethyl; $Z^{12}$ is independently hydrogen, fluorine, methyl or trifluoromethyl; $W^1$ is hydrogen; $W^2$ is hydrogen; $W^3$ is methyl; $W^4$ is hydrogen, methyl, straight-chain alkyl having 1 to 7 carbons, tert-butyl, alkoxycarbonyl (—COOR$^a$; wherein R$^a$ is straight-chain alkyl having 1 to 7 carbons) or alkylcarbonyl (—COR$^b$; wherein R$^b$ is straight-chain alkyl having 1 to 15 carbons); $X^1$ is independently —O— or a group represented by formula (a); and m1, m2, n1 and n2 are independently an integer from 2 to 10;

in formula (2-1), formula (2-2) and formula (2-3), $Z^{21}$ is hydrogen or methyl; $R^1$ is cyano, alkyl having 1 to 8 carbons or alkoxy having 1 to 8 carbons; $W^5$ is hydrogen; $X^2$ is a single bond, —COO— or —OCO—; m3 is an integer from 2 to 10; $Z^{22}$ is hydrogen or methyl; m4 is an integer from 2 to 10; $X^3$ is a single bond, —COO—, —OCO— or —CH$_2$CH$_2$—COO—, q1 is 1 or 2, and $R^2$ is alkyl having 1 to 10 carbons; $X^4$ is —COO—, —OCO—, —CH$_2$CH$_2$—COO— or —CH=CH—COO—; and $W^6$ is hydrogen, fluorine or methoxy;

in formula (3-1), k1 and k2 are each 0; $R^{1a}$ and $R^{1b}$ are independently alkylene having 2 to 4 carbons; $Z^{31}$ is independently hydrogen or methyl; and m31 and n31 are independently an integer from 0 to 6;

in formula (3-2), $Z^{32}$ is independently hydrogen or methyl; m32 and n32 are independently an integer from 1 to 3; $L^{2a}$ and $L^{2b}$ are independently methyl, phenyl or fluorine; and j1 and j2 are independently an integer from 0 to 4;

in formula (3-3), $Z^{33}$ is independently hydrogen or methyl; $R^{3a}$ and $R^{3b}$ are independently hydrogen, methyl or ethyl; and m33 and n33 are independently an integer from 0 to 3;

in formula (3-4), $Z^{34}$ is hydrogen or methyl; $R^{4a}$ and $R^{4b}$ are independently hydrogen or alkyl having 1 to 6 carbons; and m34 and n34 are independently an integer from 0 to 10:

in formula (3-5), $Z^{35}$ is independently hydrogen or methyl and in formula (3-6), $Z^{36}$ is independently hydrogen or methyl; $R^{5a}$ and $R^{5b}$ are each hydrogen; m35 and n35 are independently an integer from 1 to 3; m36 and n36 are independently an integer from 1 to 3; and j1 and j2 are each 0; and component (A) is in the range of 25 to 97% by weight, component (B) is in the range of 3 to 75% by weight, and component (D) is in the range of 0 to 25% by weight, in a ratio based on the total weight of component (A), component (B) and component (D), and component (C) is in the range of 0.01 to 0.20, and component (E) is in the range of 0.01 to 6.00, in a weight ratio based on the total weight of component (A), component (B) and component (D).

5. The polymerizable liquid crystal composition according to claim 1, wherein, in formula (1-1), formula (1-2) and formula (1-3), $Z^{11}$ is independently hydrogen or methyl; $Z^{12}$ is independently hydrogen, fluorine, methyl or trifluoromethyl; $W^1$ is hydrogen; $W^2$ is hydrogen;

$W^3$ is methyl; $W^4$ is hydrogen, methyl, tert-butyl, straight-chain alkyl having 1 to 7 carbons, alkoxycarbonyl (—COOR$^a$; wherein R$^a$ is straight-chain alkyl having 1 to 7 carbons) or alkylcarbonyl (—COR$^b$; wherein R$^b$ is straight-chain alkyl having 1 to 7 carbons); $X^1$ is independently —O— or a group represented by formula (a); and m1, m2, n1 and n2 are independently an integer from 2 to 10;

in formula (2-1), formula (2-2) and formula (2-3), $Z^{21}$ is hydrogen or methyl; $R^1$ is cyano, alkyl having 1 to 8 carbons or alkoxy having 1 to 8 carbons; $W^5$ is hydrogen; $X^2$ is single bond, —COO— or —OCO—; m3 is an integer from 2 to 10; $Z^{22}$ is hydrogen or methyl; m4 is an integer from 2 to 10; $X^3$ is a single bond, —COO—, —OCO— or —CH$_2$CH$_2$—COO—, q1 is 1 or 2, and $R^2$ is alkyl having 1 to 10 carbons; $X^4$ is —COO—, —OCO—, —CH$_2$CH$_2$—COO— or —CH=CH—COO—; and $W^6$ is hydrogen, fluorine or methoxy;

in formula (3-1), k1 and k2 are each 0; $R^{1a}$ and $R^{1b}$ are independently alkylene having 2 to 4 carbons; $Z^{31}$ is hydrogen; and m31 and n31 are independently an integer from 0 to 6;

in formula (3-2), $Z^{32}$ is hydrogen; m32 and n32 are independently an integer from 1 to 3; $L^{2a}$ and $L^{2b}$ are independently methyl or phenyl; and j1 and j2 are independently an integer from 0 to 2;

in formula (3-3), $Z^{33}$ is hydrogen; $R^{3a}$ and $R^{3b}$ are hydrogen; and m33 and n33 are independently an integer from 0 to 3;

in formula (3-4), $Z^{34}$ is hydrogen; $R^{4a}$ and $R^{4b}$ are each hydrogen; and m34 and n34 are independently an integer from 0 to 10;

in formula (3-5), $Z^{35}$ is hydrogen; and in formula (3-6), $Z^{36}$ is hydrogen; $R^{5a}$ and $R^{5b}$ are each hydrogen; m35 and n35 are independently an integer from 1 to 3; m36 and n36 are independently an integer from 1 to 3; and j1 and j2 are each 0; and component (A) is in the range of 35 to 97% by weight, component (B) is in the range of 3 to 65% by weight, and component (D) is in the range of 0 to 20% by weight, in a ratio based on the total weight of component (A), component (B) and component (D), and component (C) is in the range of 0.01 to 0.20 and component (E) is in the range of 0.01 to 4.00, in a weight ratio based on the total weight of component (A), component (B) and component (D).

6. A polymerizable liquid crystal layer, obtained by directly applying the polymerizable liquid crystal composition according to claim 1 onto a support substrate.

7. The polymerizable liquid crystal layer according to claim 6, wherein the support substrate is a glass substrate or a plastic substrate.

8. The polymerizable liquid crystal layer according to claim 6, wherein a surface of the support substrate is subjected to rubbing treatment, corona treatment or plasma treatment.

9. The polymerizable liquid crystal layer according to claim 6, wherein an alignment state of a liquid crystal compound in the polymerizable liquid crystal layer includes homeotropic alignment.

10. A liquid crystal film, obtained by polymerizing the polymerizable liquid crystal layer according to claim 6.

11. An optical compensation device having the liquid crystal film according to claim 10.

12. An optical device having the liquid crystal film according to claim 10 and a polarizing plate.

13. A liquid crystal display unit having the optical compensation device according to claim 11 on an inner surface or an external surface of a liquid crystal cell.

14. A liquid crystal display unit having the optical device according to claim 12 on an external surface of a liquid crystal cell.

* * * * *